United States Patent [19]

Fechalos et al.

[11] Patent Number: 4,613,730
[45] Date of Patent: Sep. 23, 1986

[54] ELECTRONIC TELEPHONE WITH FEATURE ACCESS AND SPEED DIALING INCLUDING LOOP BREAKS

[75] Inventors: William A. Fechalos, Naperville; Satyan G. Pitroda, Villa Park, both of Ill.

[73] Assignee: Rockwell International Corp., El Segundo, Calif.

[21] Appl. No.: 188,676

[22] Filed: Sep. 19, 1980

[51] Int. Cl.[4] .............................................. H04M 1/00
[52] U.S. Cl. ................................ 179/81 R; 179/84 R; 179/90 B; 179/18 AD
[58] Field of Search ............. 179/81 R, 18 AD, 90 B, 179/90 BD, 18 FA, 100 R, 1 HS, 18 B

[56] References Cited

U.S. PATENT DOCUMENTS

| | | | |
|---|---|---|---|
| 3,932,709 | 1/1976 | Hoff et al. | 179/90 B |
| 4,086,440 | 4/1978 | Hurle | 179/84 R |
| 4,198,547 | 4/1980 | Ferraro | 179/81 R |
| 4,251,693 | 2/1981 | Christiansen | 179/84 R |

OTHER PUBLICATIONS

"Electronic Business Telephone", *GTE Automatic Electric Journal*, pp. 34–40, Kopec and Lind, Mar. 1980.

*Primary Examiner*—Gerald L. Brigance
*Attorney, Agent, or Firm*—C. B. Patti; V. Lawrence Sewell; H. Fredrick Hamann

[57] ABSTRACT

Automated telephones with electronic circuits for outputting dial digit sequences respectively corresponding to different ones of a plurality of user's switches when each switch is momentarily actuated. The circuits permit speed dialing of (i) directory numbers, (ii) tandem sequences for accessing outside centers and specific line numbers, and (iii) access or feature codes. The apparatus is characterized especially by devices to create automatically loop breaks to simulate either a hook flash or a re-seize on-hook condition in certain circumstances and despite the fact that the telephone remains off-hook. By simple wire connections between a master or "secretary's" telephone and each of the member's phone sets within a limited group, intelligence signals are interchanged to provide "key line group" action without an elaborate, separate "control box" and even though each telephone of the group is served by the central system only via its own two-wire line.

15 Claims, 20 Drawing Figures

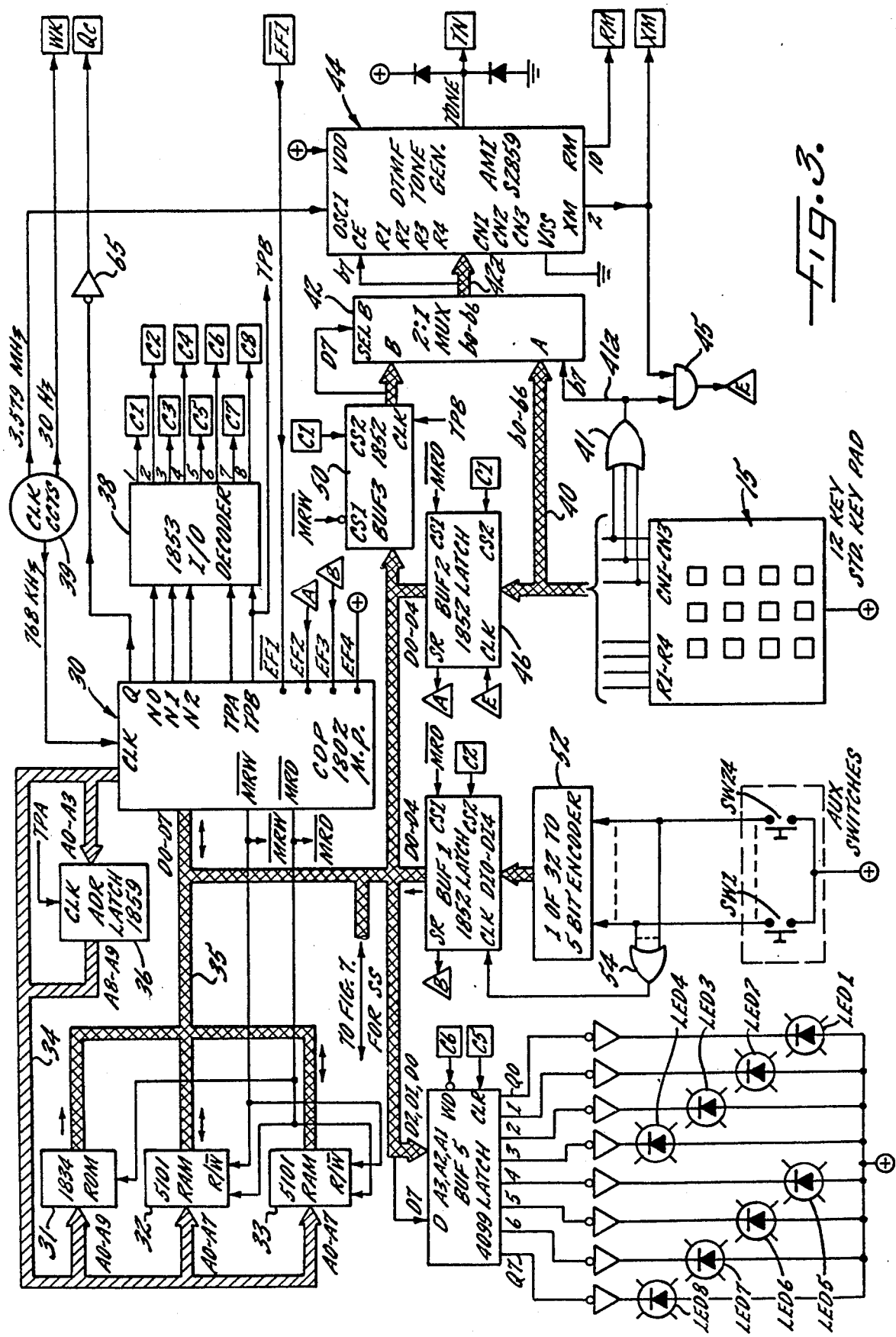

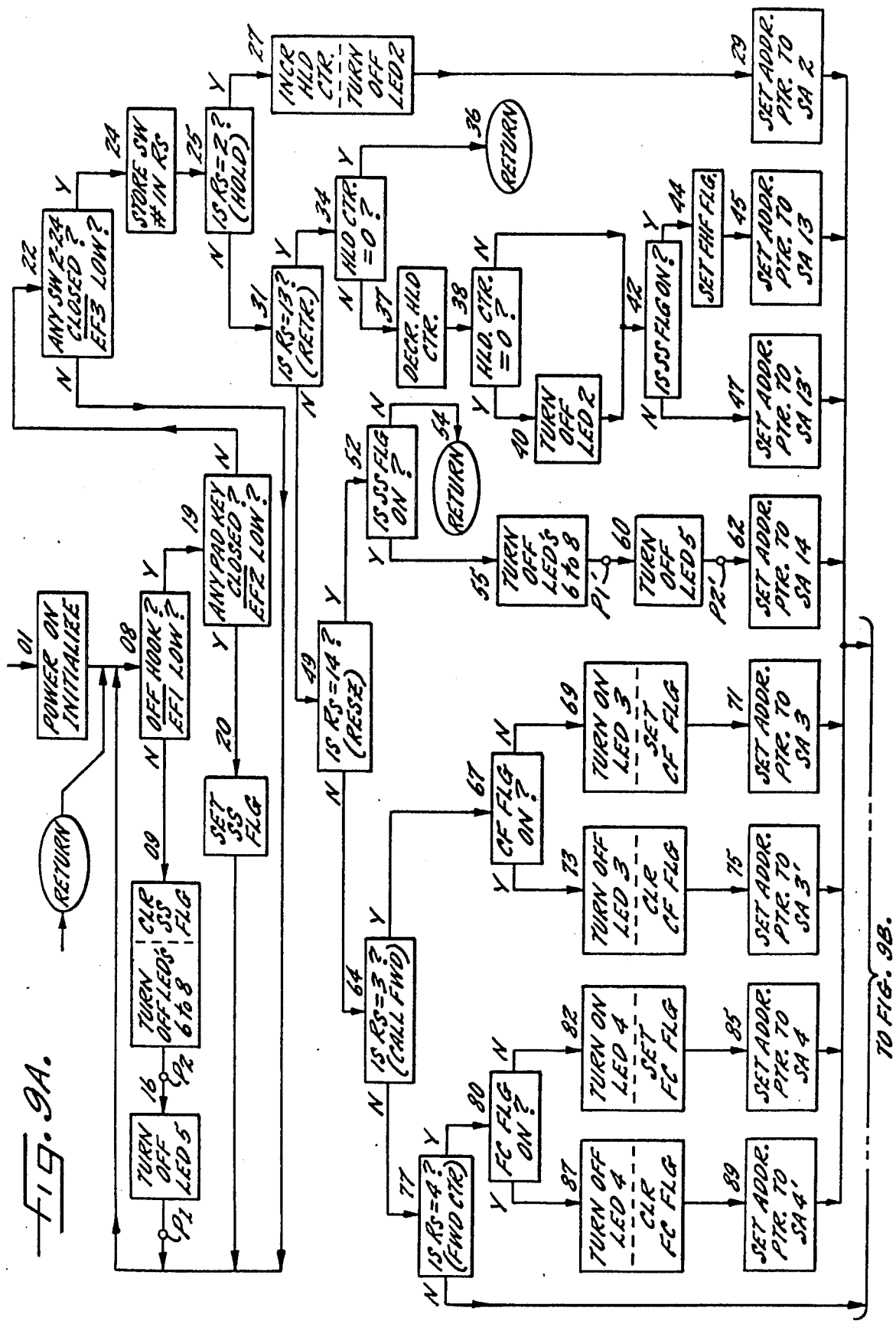

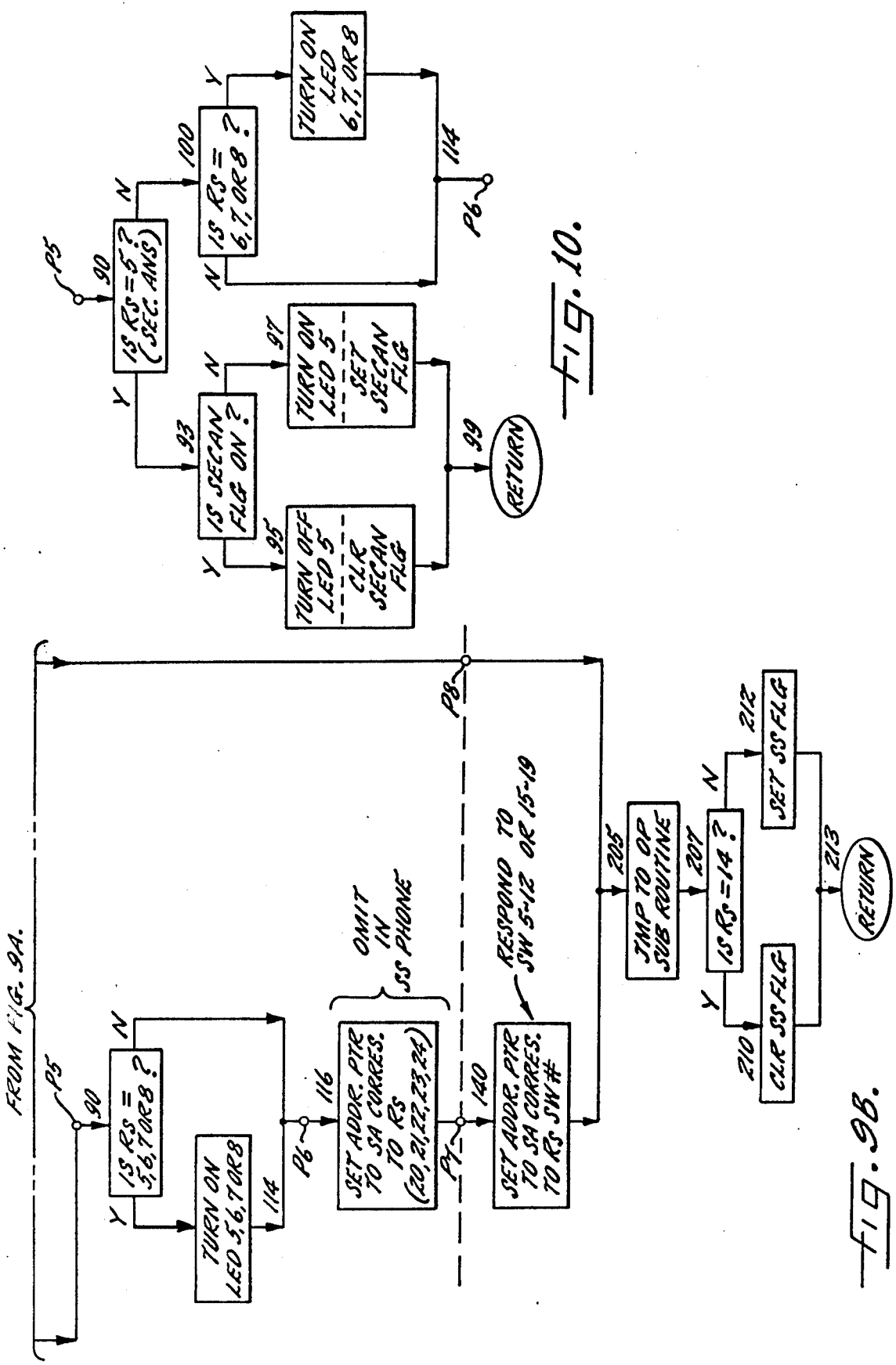

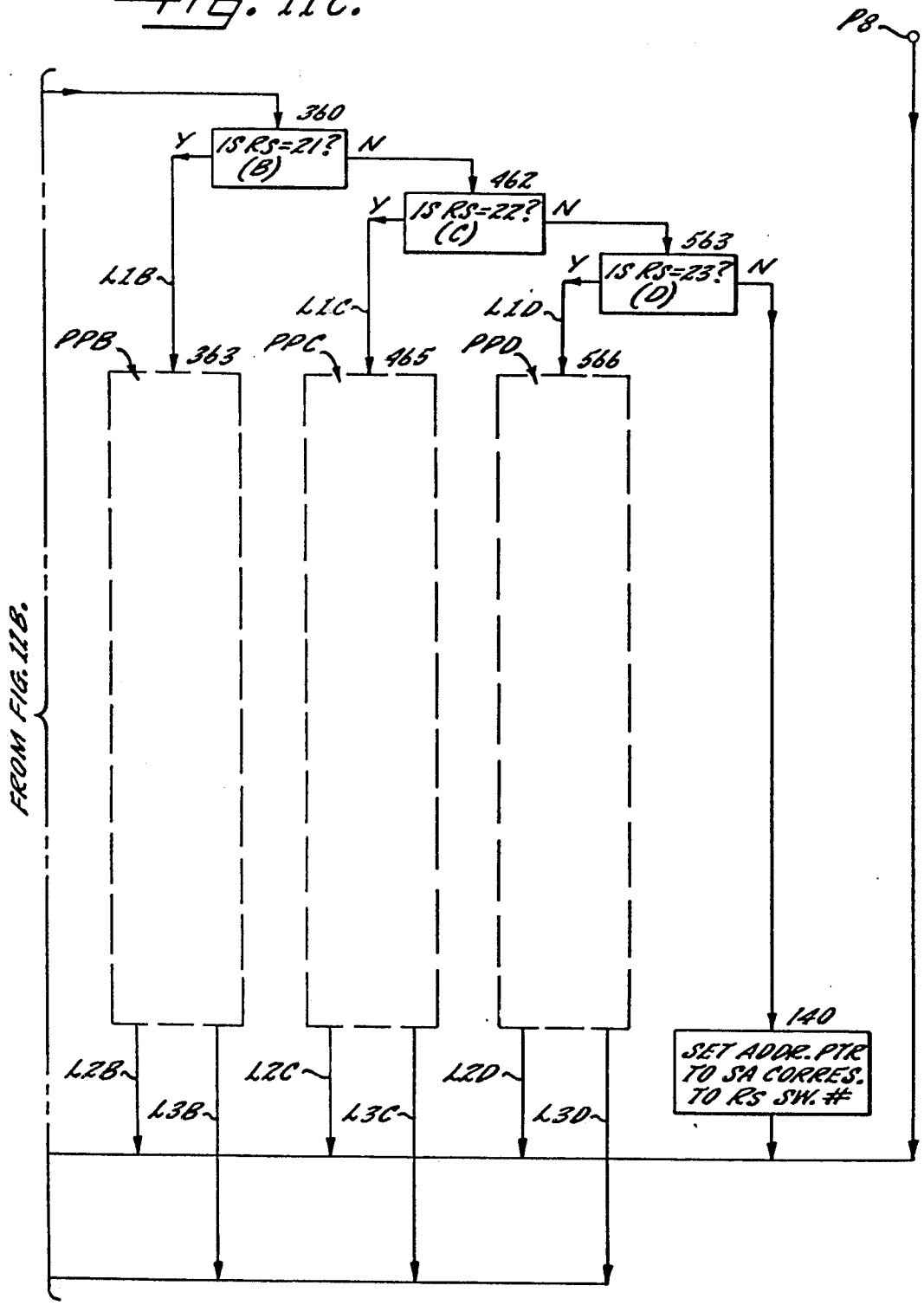

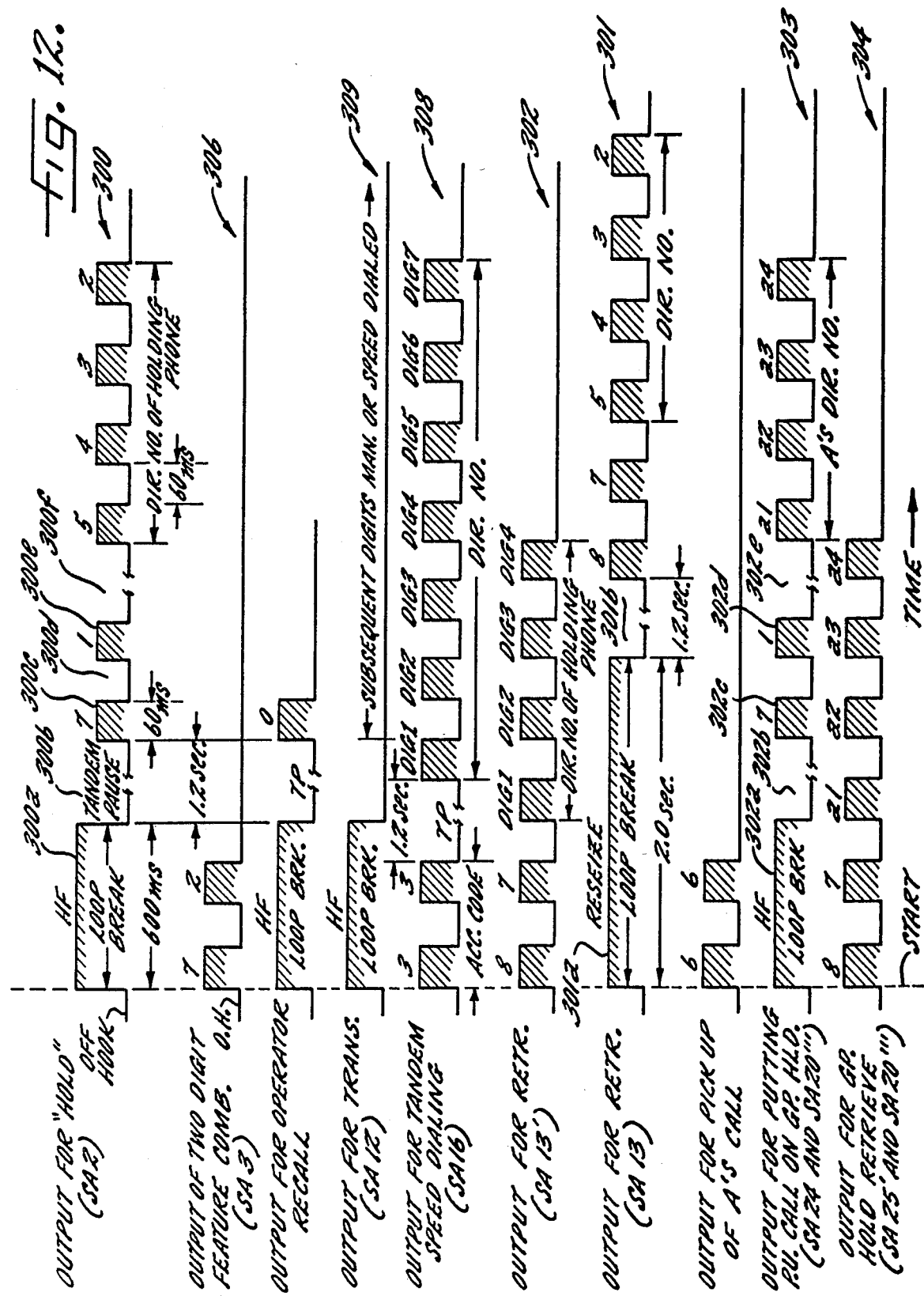

ELECTRONIC TELEPHONE WITH FEATURE ACCESS AND SPEED DIALING INCLUDING LOOP BREAKS

BACKGROUND OF THE INVENTION

The present invention relates in general to telephones and in particular to telephones intended for connection to a central switching system (CO or PABX) capable of responding to DTMF dial signals and loop breaks to execute special features or functions in addition to conventional directory number and tandem trunk dialing. More specifically, the invention relates to what are known as "electronic telephones" of the sort which can perform speed dialing and "last number dialed" operations, and brings improvements to the capabilities of such telephones.

It is known in the art to incorporate integrated circuit chips, including microprocessors with ROM and RAM, into telephone sets (or accessories which plug into such sets) in order to "automate" certain operations and provide user convenience. The most popular of these state-of-the-art telephones permit directory numbers to be written into memory and subsequently speed-dialed out in response to actuation of a single switch which starts a process of reading the successive dial digit values from memory. Others provide a "last number dialed" feature by which the digit values punched into a dialing key pad are written to memory, remembered, and subsequently reproduced on the phone line in response to actuation of a single switch. This is employed to "re-dial" after the user has attempted to dial another phone and received a busy signal.

As large, medium and small PABX systems (and even central office systems) have developed—with stored program control and digital switching—many special features or functions have become rather common. As only a few examples, those working in the industry are familiar with such features as "camp on", "call pick-up", "executive override", "hold and retrieve". Generally stated, these features are practiced by the user of a given telephone set by keying a certain combination of dial digit values called access codes or feature codes. These frequently require, however, that the user remember (or refer to a list) of such codes, and that he operate his hook switch at various points to signal a hook flash or a reseizure.

SUMMARY OF THE INVENTION

It is the general aim of the present invention to provide an electronic telephone which greatly simplifies carrying out special features in cooperation with known and available modern central systems (CO or PABX-)—overcoming the present frequent user's complaint that manual execution of the proper key and hook sequences is "too complicated".

A more specific object of the invention is to do away with the need for the user of a telephone to remember the various dial digit sequences—and the need for a user to create interspersed hook-flash or reseize conditions by manual hook switch actuation—in employing his telephone to the full advantage of the several features which are available to him.

Another object of the invention is to create a telephone which not only outputs a unique digit sequence when a particular one of several feature keys is actuated, but which also creates a simulated on-hook condition, recognizable by the central system as a hook flash or a reseizure, at appropriate steps in the sequence—and despite the fact that the telephone remains off-hook. This obviates need for the user to worry about manually depressing his hook switch and his concern as to how long he should hold it down.

It is a related object to provide a telephone which, in cooperation with a known and available central system, permits a user to transfer a call simply by depressing a "transfer" switch briefly and without critical timing, followed by conventional or speed dialing of the transferee directory number.

More specifically, it is also an object to make possible such transfer to a predesignated directory number in response to a single actuation of a single switch.

In another vein, it is an object of the invention to provide an automatic telephone wherein actuation of a single user's switch will cause outputting on the line either a preassigned dial digit sequence, or a simulated on-hook condition followed by such digit sequence, depending upon whether the telephone is freshly off-hook or has been off-hook and engaged in other functions. A notable example to be described is retrieving a call previously placed on hold without going on-hook at the end of an intervening conversation with a second person.

Still further it is an object of the invention to provide improved control or status signaling between the master (secretary's) phone and each of the member's (executive's) phones in a "group", characterized in that two or more signals may be sent in opposite directions (from master to member or member to master) over a single connecting wire extending between them.

A related object is to provide master-member's telephone interaction in a group having each phone connected to a central system only via its own conventional two-wire line, and wherein status and/or control signals are sent between the master and any member via one or two wires.

Further, it is an object to provide a telephone group including at least one master (secretary's) set and one member's (executive's) set, wherein the member's set may be selectively conditioned to omit any response to the first few incoming ring signals, with such ring signals being heard distinctively at the master set where the call may be picked up.

Another object of the invention is to provide such a telephone group wherein the master (secretary's) set has a push button switch for each member's set, provision for indicating when a member's set is ringing, and the ability to output the proper dial signals to pick up a call ringing at a given member's set merely by single actuation of the corresponding member switch.

Related to the foregoing paragraph, it is still another object to provide such a telephone group in which the user (secretary) at the master set may put a call, picked up after ringing at a given member's set, in hold tagged to the given member's directory line—and simply by a single actuation of a single "group hold" switch. The "holding" of a call in the central system with tagging to a particular directory number (usually the phone set which first received the call) is termed "coded call hold" in the industry; merely for brevity and convenience in the present specification, the term "group hold" is here used as a synonym for "coded call hold" with respect to the placing of calls, originally incoming to a member's set and picked up at the master set in the group, into a holding status.

Still related to the foregoing, it is an object to provide such a telephone group in which the user (secretary) at the master set may retrieve a call (originally picked up as incoming to a given member's set and placed in group hold) back to the master set—simply by a single actuation of the corresponding member's switch.

It is another related object to provide such a telephone group wherein a given member receives an indication at his phone informing him when the master (secretary) set has (i) a call picked up from his line and/or (ii) placed a call picked up from his line into group hold.

A specific objective of the invention is the provision of such a telephone group wherein a member (usually an executive) may call the master (usually attended by a secretary) simply by actuation of a single feature switch, the call being put up through the central system, while the secretary is alerted to the origin of the call by distinctive signaling routed over a single wire link running between the member and master sets.

These and other objects and advantages will become apparent as the following description proceeds with reference to the accompanying drawings.

BRIEF DESCRIPTION OF THE DRAWINGS

FIG. 3 is a block and line diagram illustrating the organization of the electronic circuitry within an electronic phone embodying the features of the present invention.

FIGS. 9A and 9B (collectively called FIG. 9), when joined along the indicated junction line, constitute a flow chart illustrating the sequences of operations carried out according to the steps of a master program, stored in the memory of and executed by the microprocessor of FIG. 3.

FIG. 10 is a fragmentary flow chart illustrating program modifications for member's sets within a group, as contrasted to the basic and secretary's phone sets.

FIGS. 11A, 11B and 11C (collectively called FIG. 11), when joined along the indicated junction lines, constitute a flow chart illustrating the sequences of operations performed (in addition to those of FIG. 9) according to a master program stored in the secretary's set, as contrasted to the basic or member's sets.

FIG. 12 is a timing diagram illustrating generally the nature of typical successive dial signal sequences applied to the two-wire line of a telephone set under various conditions by the improved phone sets embodying the present invention.

In addition to the drawings, Tables I through XI appear at the end of the specification, for convenient reference by the reader, to aid in the following description which, at various points, directs attention to them and identifies their contents.

While the invention has been illustrated and will be described with reference to a particular and exemplary embodiment, there is no intention that it thus be limited to such detail. On the contrary, it is intended here to cover all modifications, alternatives and equivalents falling within the spirit and scope of the appended claims.

DETAILED DESCRIPTION OF EXEMPLARY EMBODIMENT

Figure 1:
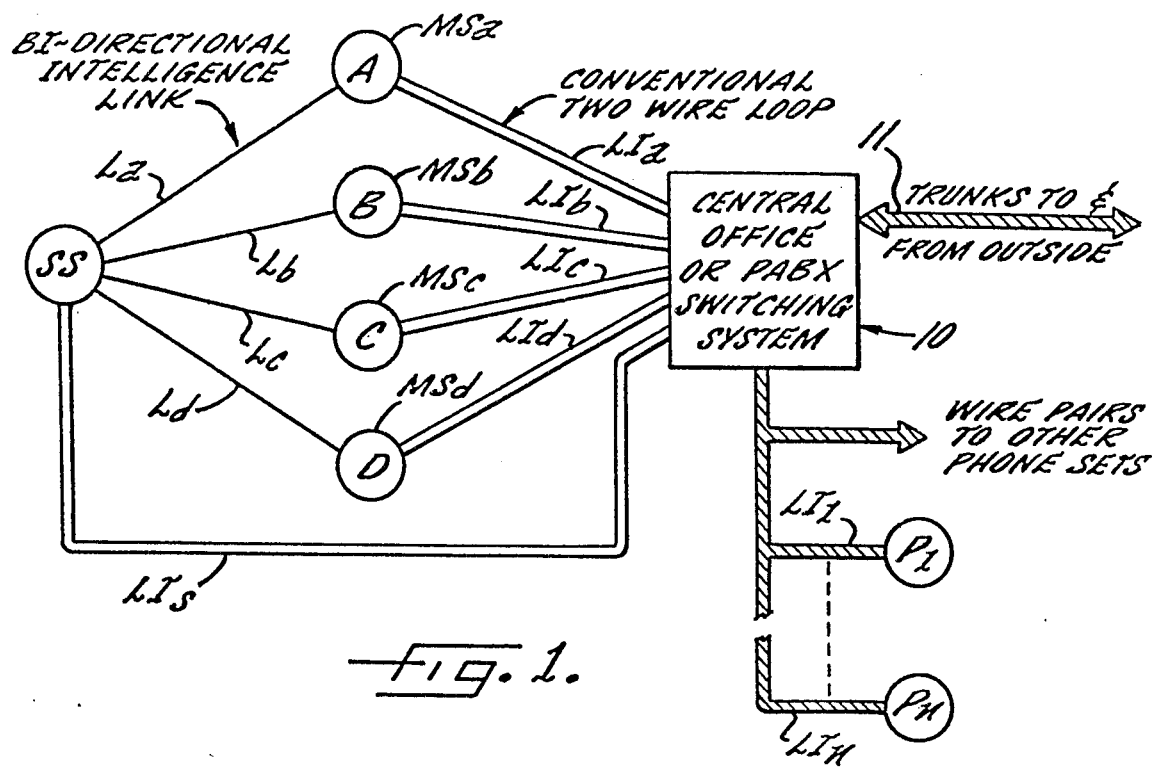
FIG. 1 is a diagrammatic representation of a plurality of telephone sets served via their respective two-wire lines from a central office or PABX, five of the illustrated sets serving as a limited master/member group.

By way of introduction and to lay the background environment, FIG. 1 illustrates a plurality of telephone sets each served via a two-wire line from a central switching system 10. That system may be either a central office or a PABX, but it accommodates various "features" of the sort known in the industry and readily available in almost all modern digital, stored program systems. To name but two features as examples, "camp on" and "call forwarding" may be accomplished by a given telephone set if and after it outputs to the central system a correspondingly unique one or two digit feature or access number. Typical of many commercially available central switching systems is the product currently being sold by Wescom Switching, Inc. of Downers Grove, Ill. under the designation "580 DSS". Because those skilled in the art are familiar with the organization and the operation of such digital switching systems and their "feature" capabilities, it will be unnecessary to repeat here the details of the system organization and operation.

Briefly, however, the central system 10 has trunks 11 leading to and from the outside and by which "local community", long distance, and overseas calls may be made. The central system 10 serves a large plurality of telephones, most of which are illustrated as circular symbols representing basic phone sets $BP_1$ through $BP_n$, each having its own two-wire line $LI_1$ through $LI_n$ and its own directory number. Many of the telephones may be associated into "groups" with each group being constituted by two or more telephone sets. FIG. 1 shows a typical group of five interacting telephone sets including four member's sets A, B, C, D and a master set SS. Because it is frequently the practice in offices to have a plurality of executives assisted in the answering of incoming calls by one receptionist or secretary, the sets A, B, C, D will here sometimes be denominated as "executive's sets" and the master set will be called the "secretary's set" SS. Such names are not to be construed as limiting in view of the fact that the particular relationship of the people respectively using the individual phones within a group is not critical. The group sets A, B, C, D, SS are respectively connected to the central system 10 by two-wire lines $LI_a$, $LI_b$, $LI_c$, $LI_d$, $LI_s$. Each set has its own directory number and is capable of operating autonomously in the normal fashion of a basic phone BP. It is to be noted that the group sets A–D and SS do not have plural two-wire lines leading to or from the central system, nor do they have any separate control wires to exchange control or status signals with the central system. Despite this fact, the member's sets A, B, C, D are able to coact with the secretary's set SS in a fashion approximating and indeed exceeding the capabilities of what have been known as "key line groups" wherein each phone set had connected to it a plurality of two-wire lines. The coaction between the group sets here illustrated is achieved, as described hereinafter, largely through the central system 10 and with the aid of bidirectional intelligence links $L_a$–$L_d$ extending from the secretary's set SS to each of the sets A–D. As explained more fully below, each of those links is preferably constituted by two wires of small gauge, easily installable in an office suite or at a cluster of desks because, generally speaking, they are of considerably shorter length than the two-wire lines which lead back to the central system.

For ready reference, Table I lists definitions of certain acronyms and symbols to be employed in this specification as representing certain signals or elements. That table may be referred to if the reader needs to refresh his recollection, from time to time, as to the meanings of various symbols.

The present invention contemplates three "models" or "types" of telephones, all of which have common or generic improvements to be described more fully below. All three types possess, to a large extent, the same hardware and electronic circuits. Each of the three types differs only in a few details from the others. For brevity herein, a telephone not associated with a "group" and capable of improved interaction to the central system 10 will be called a "basic phone" BP; those phones of that type are represented at $BP_1$ through $BP_n$ in FIG. 1. The second type is the executive or member's phone within a group, and each of these phones will be designated as a "member's set" MS. Four member's sets $MS_a$ through $MS_d$ are shown at A through D in FIG. 1. The third type is called a "master" or "secretary's phone set" SS, and it differs from the others in interacting with member's sets for call processing, e.g., assisting in responding to incoming calls by picking up such calls, placing them optionally on hold, retrieving them, and transferring them—all as more fully explained hereinafter.

Figure 2:
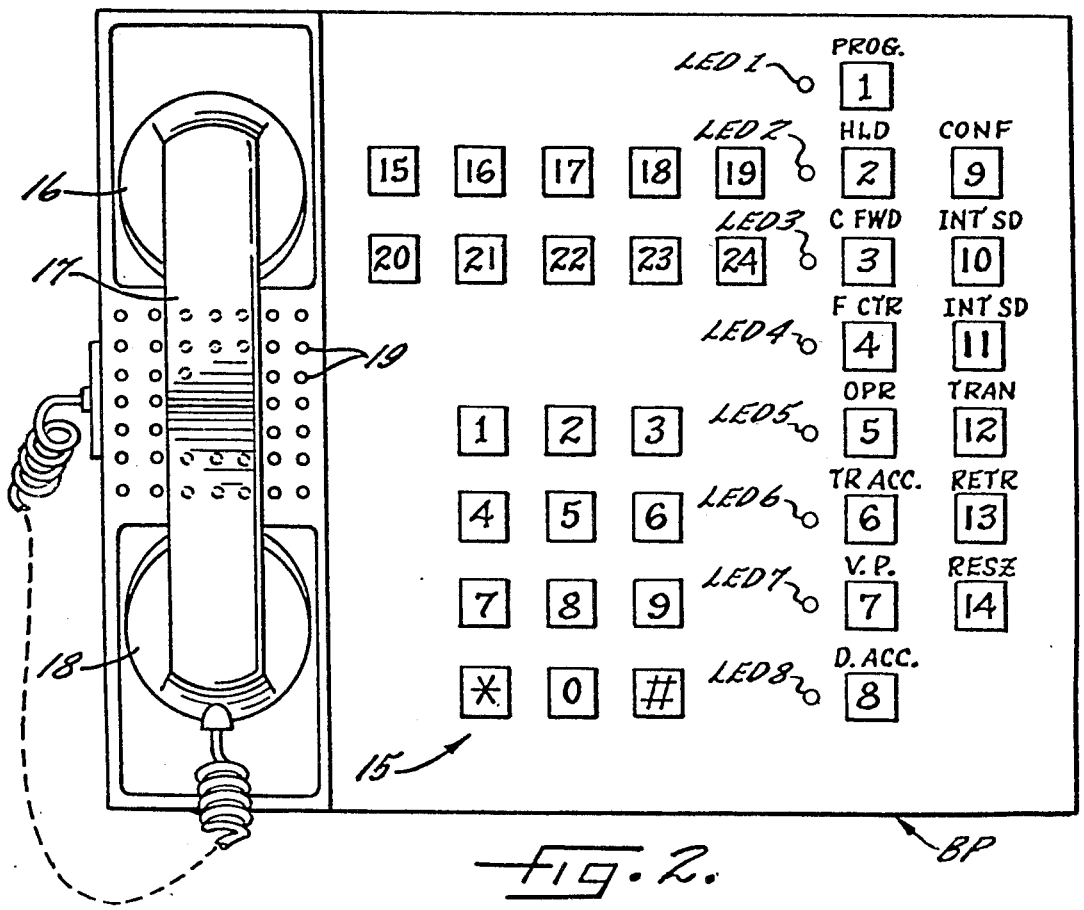
FIG. 2 is a simplified illustration of an electronic telephone set embodying features of the invention and illustrating the numbers and functions assigned, by way of example, to each of a plurality of manually actuatable feature push button switches.

FIG. 2 illustrates a basic phone PB and many of its aspects which are common to the MS and SS sets. All three types of those telephone sets are constructed with the usual hook switch (not visible in FIG. 2) and a hand piece 17 comprising the usual audio receiver (ear phone) 16 and transmitter (microphone) 18. The interior of the telephone set housing contains circuitry for connecting the receiver and transmitter to tip and ring leads through a standard network which is modified slightly as explained more fully below. All three types of phone sets also include a "ringer" (so-called because all older telephones employed bells for ringing in response to incoming ring signals) which is an electronic sounding device for outputting aural indications from a small loud speaker through apertures 19 (FIG. 2). Moreover, all three types of phone sets are "feature phones" in that they include a large plurality of manually actuatable auxiliary push-button switches over and beyond the conventional twelve-switch key pad for standard DTMF ("touch tone") dialing. As will become apparent, the extra switches are employed for outputting feature or access codes (different combinations of sequential dial tone signals) to the central system, or for speed dialing output of preassigned directory numbers and tandem dial digit sequences.

ARBITRARILY CHOSEN EXEMPLARY SWITCH ASSIGNMENTS

1. For the Basic Phone

In FIG. 2 the standard dialing key pad is illustrated at 15 with twelve switches labeled 1–9, 0, # and *. Actuation of any one of those switches will cause output of a corresponding two-frequency tone on the tip and the ring leads of the telephone set—the frequencies conforming to now-familiar industry standards. In well known fashion, the central system 10 includes discriminators or decoders for identifying the value of each dialed digit signal from the dual frequency which it contains.

Two columns of push-button switches (here arbitrarily called SW1 through SW14) are shown in FIG. 2 as typical for carrying out the "feature" functions in a basic phone BP. A greater or lesser number of the feature switches may be employed, but the fourteen here shown will suffice for purposes of description. And merely as arbitrarily chosen examples, the feature or function assigned to each of the fourteen switches are those labeled in FIG. 2 and set out in the third column of Table II. Further, while the dial digit "number" for each feature (which will be recognized by the central system) may differ specifically in different installations, Table III sets out those respectively different successive digit sequences for each of the features here chosen as exemplary for purposes of full description.

From FIG. 2 and Tables II and III, it may be seen that switch SW1 is employed in the basic set BP to place the apparatus of that set in a "storage mode". If the switch SW1 is first momentarily depressed, the circuitry within the basic phone BP is conditioned so that subsequent actuation of other switches will store multi-bit words in certain READ/WRITE memory (RAM) locations, whereby the digit sequences later to be outputted may be programmed initially for each individual set at the time of its installation. This procedure of storing multi-bit words which represent successive individual digit sequences later to be outputted is per se well known in the telephone art. In the interest of brevity, the present application will neither disclose nor claim the apparatus by which particular digits of different sequences are initially stored in RAM memory. Rather, it will be assumed that such storage has already been accomplished so that a memory contains the desired digit values for a plurality of sequences, as more fully described below. Thus, for purposes of this application switch SW1 need not receive further attention.

Momentary pushing of the switch SW2 (FIG. 2) is intended to cause outputting, on the two-wire line of that set, a sequence of signals which will be recognized by the central system 10 as a HOLD code, and the response to which will be the placing of a currently-connected call into hold status within the central system. As shown in Table III, the HOLD code (to be outputted when the switch SW2 is actuated) is a hook flash HF followed by the digits 71, with these being followed by dddd, i.e., four digits, which in their values constitute the directory number for the phone set which is placing the call on hold. The "hold" feature may be implemented in a normal fashion such that the central system responds to a simple two digit code to place a call on hold when the switch SW2 is actuated; and responds to a two digit "retrieve" code to return the call to the holding set. In that case, the digits dddd would not be signaled. It is for exemplary purposes of description assumed here, however, that the central system has coded call hold (CCH) capabilities by which a call placed on hold with tagging to a given directory number may be retrieved at the same or any other telephone set by the latter outputting a retrieve code plus the directory number so tagged. The HOLD switch SW2 is thus assumed to permit performance of a CCH type hold function. This differs from the "group hold" function discussed more fully below with reference to SS type sets.

Switch SW3 in FIG. 2 is assigned to the Call Forward feature. With the basic phone set off-hook, actuation of this switch causes outputting of the unique feature code "72" (Table III). Thereafter, the user of the basic phone dials in, on the key pad 15, the directory number xxxx of the set to which his calls are to be forwarded. Once the central system receives this intelligence, it will automatically forward calls, but the call forward status may be cancelled by again actuating the switch SW3 and in these circumstances the basic set will output the digit code "73" (Table III) which cancels the Call Fwd. status.

Switch SW4 in FIG. 2 is assigned to the "Forward Control" (sometimes called Patient Call Diversion in hospital telephone systems) feature and it is intended, when actuated, to output the digits "74" to set up that forward control status. The user then conventionally dials the directory number xxxx of the station whose incoming calls are to be diverted (forwarded) to the user's set. Thereafter, if switch SW3 is again actuated, the forward control status will be cancelled by the outputting of the digit code "75" to the central system.

Switch SW5 in FIG. 2 is associated with the "Operator Recall" function as indicated in Tables II and III. Depression of this switch will cause outputting of signals which are recognizable as a hook flash followed by the digit 0. The central system 10 will respond to this sequence by connecting the set to a central attendant or operator.

The switch SW6 is assigned to the function of obtaining access to an outgoing trunk. When it is depressed, a two-digit dial signal sequence "88" will be outputted (as shown in Table III).

Switch SW7 in FIG. 2 is assigned to the Voice Page feature. When it is actuated, an access code "76" will be sent out in the form of a two-digit dial signal sequence (Table III). Once the central system 10 has responded to that particular access code, the user of the telephone may transmit, through the central system, voice messages to loud speakers distributed at predetermined locations.

Switch SW8 is assigned to the Dictation Access function. Its depression will result in outputting of the two digit signals "77", and the central system 10 will respond by connecting the originating phone set to dictation equipment so that the user may record dictation to be subsequently transcribed by the stenographic staff.

Switch SW9 is assigned to the "Conference Access" feature whose unique combination is assumed to be "78" (Table III). If the user of a basic phone set depresses switch SW9 momentarily while connected in a call to or from a second party, the outputting of the digit signals "78" will condition the central system 10 such that the user may then dial the directory number of a third party to be brought into a conference. In consequence, the central system 10 connects the three parties into a three-way conference. The four digits xxxx associated with the conference access code in Table III are intended to indicate that the user, either by conventional or speed dialing, outputs the directory number of the third party after he has gained conference access by the outputting of the digits "78".

Switches SW10 and SW11 (FIG. 2 and Table II) are assigned to the function of speed dialing two respective internal directory numbers dddd which have been previously stored in RAM. It is assumed, merely by way of example, that the central system 10 operates with four digit directory numbers for the several "inside" telephones which it serves.

The switch SW12 in FIG. 2 is a "Transfer" switch. In accordance with a feature of the present invention to be more fully described, when this switch is actuated, a simulated on-hook condition is produced in the phone set BP for a predetermined time interval, and despite the fact that the set remains off-hook. Such a hook flash is recognized by the central system 10 as the prefix for a transferring operation. After that hook flash has been created, the user simply dials (conventionally through the key pad 15 or by speed dialing) the four digits xxxx constituting the directory number for the desired transferee station. Thereupon the central system takes the call from the transferor phone and connects it to the transferee phone, assuming that the transferee answers after ringing.

The switch SW13 is assigned to the Retrieve function. When it is actuated the unique digit signals "87" are sent out. Pursuant to the above-described arbitrary assumption that the HOLD switch SW2 produces a CCH code followed by "tagging" directory number digits, the four digits dddd are then sent automatically, constituting the directory number of the user's own set. The central system 10 responds by reconnecting the holding call to the user's phone set.

The switch SW14 is assigned to the "Reseize" function. Its actuation will result (according to one aspect of the present invention) in creating a simulated 2.0 second loop break so that the central system sees the phone set as being on-hook for two seconds despite the fact that the hand set remains physically off-hook. Thus, the user, when engaged a call which he wishes to terminate, may simply hit the switch SW14 (rather than holding down his hook switch) in order to reseize a register in the central system 10 and then dial another call or function.

The switches numbered SW15 through SW24 in FIG. 2 are intended to serve as auxiliary switches for speed dialing of previously stored dial digit combinations constituting directory numbers of individuals who are frequently called by the user, or sequences of trunk access codes and outside tandem and/or directory number combinations which the user frequently desires to contact. This will be more fully explained as the description proceeds below. For the present it may be assumed that the ten switches SW15 through SW24 in FIG. 2 are reserved for speed dialing.

FOR A GROUP MEMBER'S SET

Figure 2A:
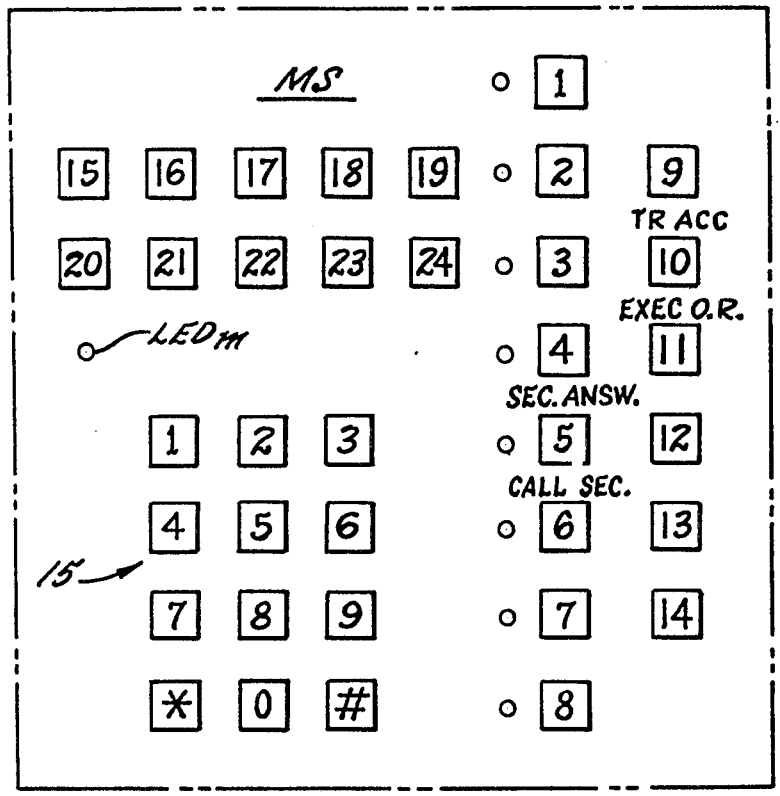
FIGS. 2A and 2B are similar to FIG. 2 but illustrate typical and arbitarily selected button and light assignments for (i) a member's phone set employed in a limited group and (ii) a master or secretary's phone set in such group.

Each member's set MS (represented at A–D in FIG. 1) is equipped with the same quantity and layout of switches illustrated in FIG. 2 for a basic phone BP, but the assignment of functions to the different switches may differ considerably. Merely as an example, FIG. 2A illustrates switch assignments for member's phone sets A, B, C, D—to the extent that the assignments differ from those described by way of example for a basic phone. Specifically, and as indicated in FIG. 2A, this difference in assignments involves the switches SW5, SW6, SW11 and SW12. These differing assignments are indicated in the fifth column of Table II and the corresponding digit combinations assigned thereto are set out in Table III.

In FIG. 2A, switch SW5 is assigned to a "Secretary Answer" function. When this switch is momentarily actuated, an executive conditions his phone so that it will not ring, for the first several ring signals, when an incoming call arrives. In this circumstance, the secretary phone set SS will receive a distinctive ring indication, and the secretary may pick up and answer the incoming call. Depression of the switch SW5 sends no output signals to the central system 10 but merely sets up the "secretary's answer" status in the executive's set and the secretary's set.

The "Call Secretary" function is associated with the switch SW6 in FIG. 2A and Tables II and III. This switch permits an executive to speed dial the secretary through the central system 10. Its actuation results in outputting of four dial digit signals ssss which constitute the secretary's directory number. In addition, and in the manner to be explained, the secretary will receive distinctive signaling so that she knows the executive is calling her and that she should give special attention to the call which is ringing at her set.

In the member's set MS illustrated by FIG. 2A, the trunk access code (associated with SW6 in a BP, FIG. 2) is assigned to the switch SW10. Because the switch SW6 is devoted in a set MS to the "Call Secretary" function, trunk access is gained by use of the switch SW10.

Further and as indicated in FIG. 2A and Tables II and III, each member's set MS has its switch SW11 assigned to the "Executive Override" feature (as contrasted to an internal speed dial function for the basic set BP). When the user of a member's set MS depresses the switch SW11 after dialing another phone and receiving a busy signal, his telephone set will outpulse the distinctive dial digit combination "79" which the central system 10 will recognize and thereafter connect the executive into a conference with the busy set.

Other than the above differences, each executive or member's set is equipped with push-button switches which are assigned to the same exemplary features or functions described above with respect to the basic phone BP in FIG. 2. Thus, the member's sets MS all include a standard manual dialing key pad 15, and ten switches designated SW15–SW24 which are assigned to speed dialing functions.

FOR THE MASTER SET SS

Figure 2B:
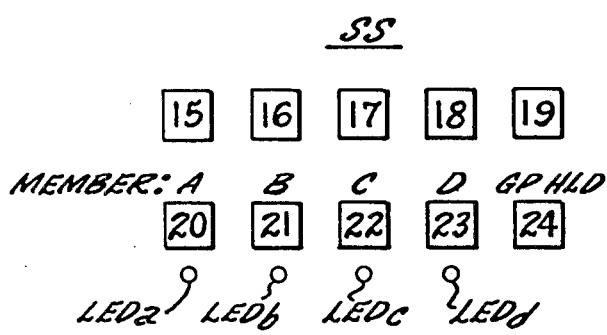

Turning next to FIG. 2B and Table I, it may be noted at the outset that all of the switches on the master secretary's set SS are identical in their numbering and their assignments to those of a basic phone BP (FIG. 2), except that switches SW20 through SW24 are assigned to participate in group phone interactions.

Specifically, the switches SW20–SW23 in SS phones are reserved for interaction with the member's sets A, B, C, D, respectively. The switch SW24 is reserved for actuation when a call incoming to one of the member's sets has been picked up by the secretary and she desires to place that call in "group hold".

In accordance with an important advantage of the present invention, actuation of one of the switches SW20–SW23 results in different operations under different conditions or status. For example, if a call is ringing at Mr. A's telephone, the secretary will be apprised of this by signaling over the link $L_a$ (FIG. 1) in a manner to be described. She may "pick up" that call to A simply by momentarily depressing Mr. A's switch, i.e., SW20, which causes outputting of signals "66" (Table III) to make the central system re-route A's caller to the secretary's line. When she is talking with Mr. A's caller whom she has "picked up", she will be apprised that she has a call in pick-up by distinctive signaling (PU Blinking) at her set in the fashion to be described below. In this circumstance, if she then pushes the group hold switch SW24, her set will output to the central system 10 a sequence of signals and digits which will cause the central unit to place that picked up call on hold tagged to Mr. A's directory number. On the other hand, if she has a caller to Mr. A picked up, momentary depression of Mr. A's switch SW20 will output signals to the central system which will cause the latter to transfer the call back to Mr. A's phone (this being desirable when the secretary has observed that Mr. A has returned to his office). Still further, if the secretary has picked up a call incoming to Mr. A's phone, and subsequently placed that call in "group hold", she will be apprised (by HLD' Blinking of $LED_a$) that a call is on hold for Mr. A. Under this condition, if the secretary momentarily depresses Mr. A's switch SW20, her set will automatically output on her line $LI_s$ a sequence of signals for a "group retrieve" function; the central system 10 will respond to this by restoring Mr. A's caller from group hold to the secretary's line and thus again placing that caller in "picked up" status so that the secretary may talk with him.

Each of these broadly-stated operations will be treated in greater detail below, and they are possible with the other member's sets B, C, D through actuation of the corresponding switches SW21, SW22, SW23. Thus, the secretary has the ability to assist all four executives in her group because she can intercept their calls, place them on hold, retrieve them, and transfer them. Further, and as will be explained below, if any executive's set is idle and not ringing, the secretary may speed dial any one of the four executives as a consequence of pressing the corresponding one of her four switches labeled A, B, C, D in FIG. 2B.

VISUAL INDICATORS

For status signaling, the basic phone BP (FIG. 2) includes eight visual indicators respectively associated in physical location with the push buttons for switches SW1 through SW8. While these visual indicators may be any suitable type of lamp (such as incandescent or gas discharge lamps) they preferably are constituted by individual light emitting diodes (LED's). Also, while the eight respective LED's here labeled LED1 through LED8 may be located beneath a translucent plastic push button associated with the respective switches SW1 through SW8, they are here shown as a matter of convenient choice as associated in physical location by close spacing on the right of their respective switches. Generally stated, each LED is energized to indicate that the feature of its corresponding switch has been enabled. Thus, in the basic phone BP illustrated in FIG. 2, if the switch SW2 has been actuated to place a call on hold, the indicator LED2 is energized to apprise the user that he may and should retrieve that call after taking care of other business. In a similar fashion, when switch SW3 has been actuated to enable call forwarding of calls incoming to the basic phone BP, the indicator LED3 is energized; and when the call forward status is cancelled by a second actuation of the switch SW3, then LED3 is deenergized. LED 4 is controlled in a similar manner with respect to the forward control switch SW4. On the other hand, LED5, LED6, LED7 and LED8 are controlled such that they are energized when their respective corresponding switches are actuated, and they are deenergized when the basic phone BP is restored to an on-hook condition. The several LED's in FIG. 2 thus apprise the user of the phone set about the status of the feature or function which he is utilizing.

With regard to a member's set MS treated in FIG. 2A, LED 5 is excited when the "secretary answer" switch SW5 is depressed momentarily to initiate that status; and it is deenergized when the same switch is later depressed a second time to cancel the "secretary answer" status. LED6 in the set MS (FIG. 2A) is energized when switch SW6 is depressed to initiate a call to the secretary; and it is deenergized when that set MS restores to an on-hook condition.

In addition to LED1 through LED8 associated with push-button switches SW1 through SW8 in the member's sets MS (FIG. 2A), each of those member's sets includes a special status LED here denominated $LED_m$. This is controlled in a manner and for purposes set out below so that user of the set may be apprised of action which the secretary has taken or is taking.

The secretary's set (FIG. 2B) has eight indicators LED1 through LED8 associated with its switches SW1 through SW8, and they are controlled in the same fashion described above for the basic phone BP. In addition, however, the secretary's set has four visual indicators $LED_a$ through $LED_d$ associated with the switches SW20 through SW23 assigned to the member's sets A, B, C, D. As explained below, these four special indicators $LED_a$ through $LED_d$ in the secretary's set are controlled with distinctive blinking or flashing rates so as to visually signal the user of that set with regard to the status of calls which are ringing at a member's set, have been picked up from a member's set, or have been placed in group hold.

In the description which follows, the control of the visual indicator LED1 will not be treated since it is associated with the set-up function of storing dial digit codes into memory of a micro-computer system associated with each telephone set. That "programming" of digit sequences for subsequent outputting is per se well known in the art, and in the interest of brevity is not treated here.

THE ELECTRONIC CIRCUITS—IN GENERAL

In the preferred and exemplary embodiment of the present invention, the apparatus for producing the advantageous operations briefly noted above is constituted by a programmed microcomputer which includes a microprocessor, READ/WRITE memory (RAM), and a read-only memory (ROM) for storing the master program of instructions. The RAM is utilized to store groups of dial digit signal codes assigned to various ones of the switches, and to participate in data processing or logic operations. With the availability of modern integrated circuit chips, it is entirely practical to locate not only (i) the microcomputer circuitry, but also (ii) the network interfacing to the tip and ring leads and (iii) an electronic ringer circuit (with its small loud speaker), within the cabinet of a multi-button telephone set such as that shown in FIG. 2.

Figure 4A:
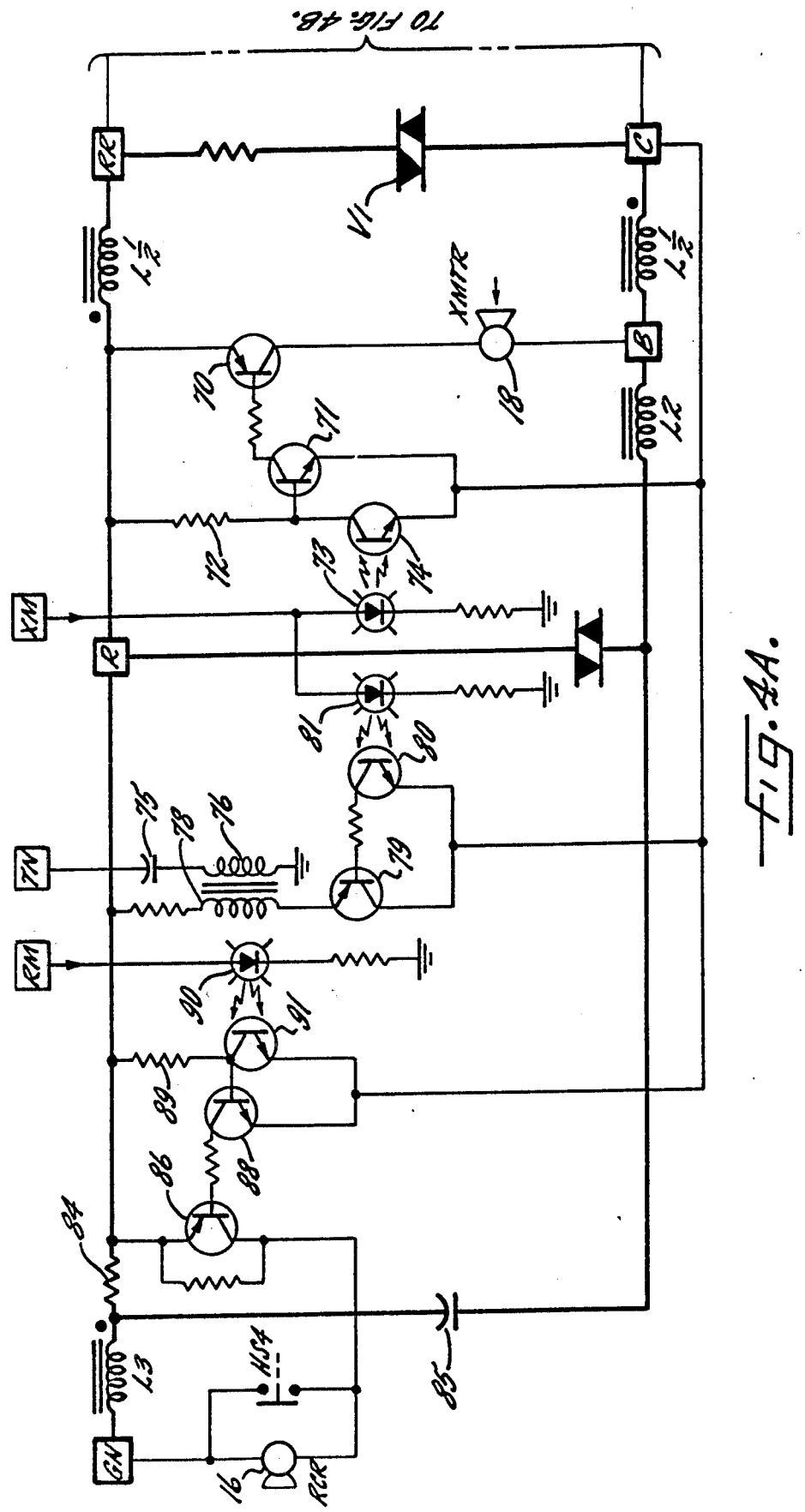
FIGS. 4A and 4B (collectively called FIG. 4), when joined along the indicated junction line, form a schematic circuit diagram of a conventional hybrid network employed in each of the telephone sets with modifications added thereto in the practice of the present invention, including the circuitry for sounding ring signals arriving at tip and ring terminals.
Figure 4B:
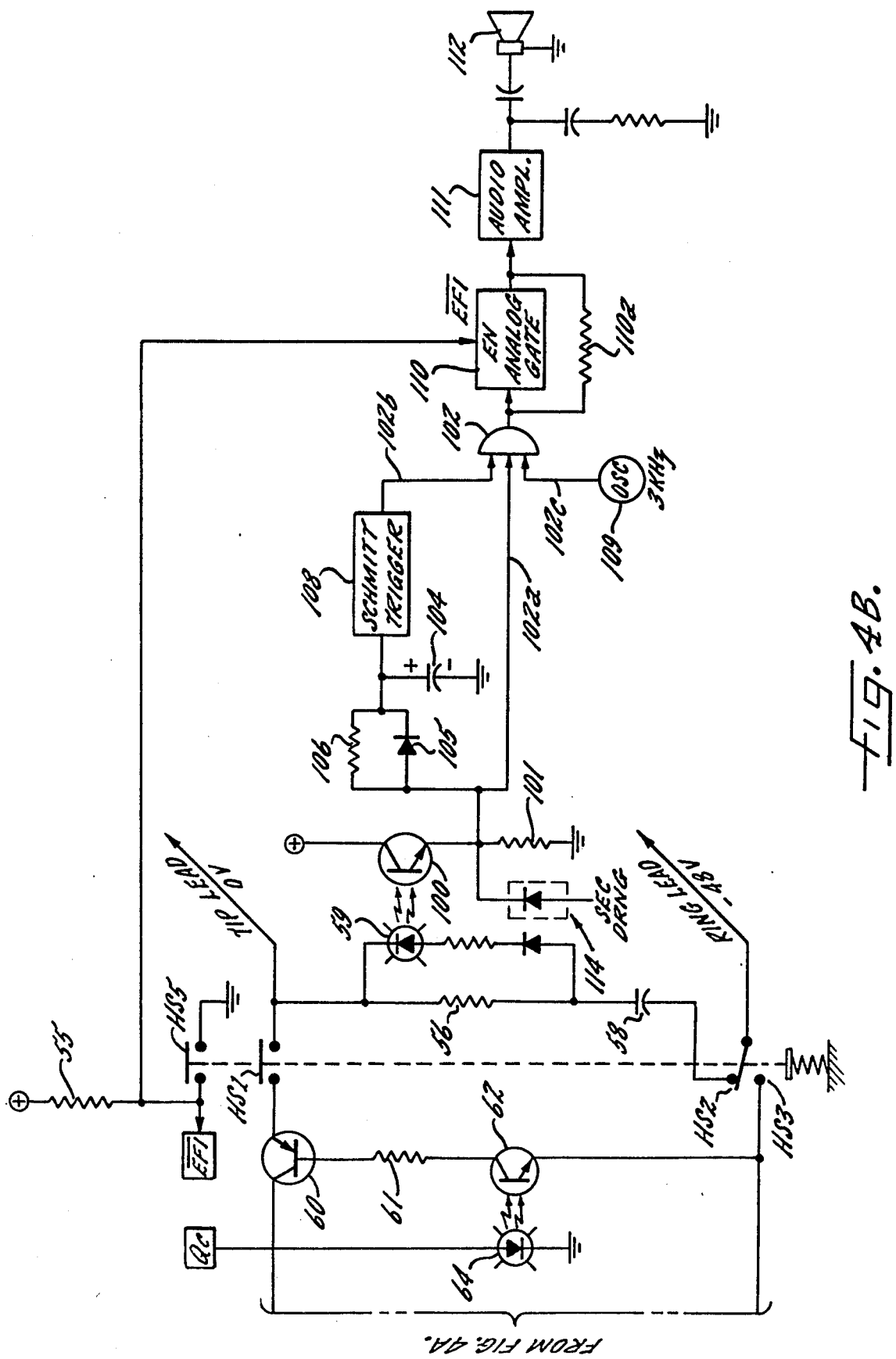
Figure 5:
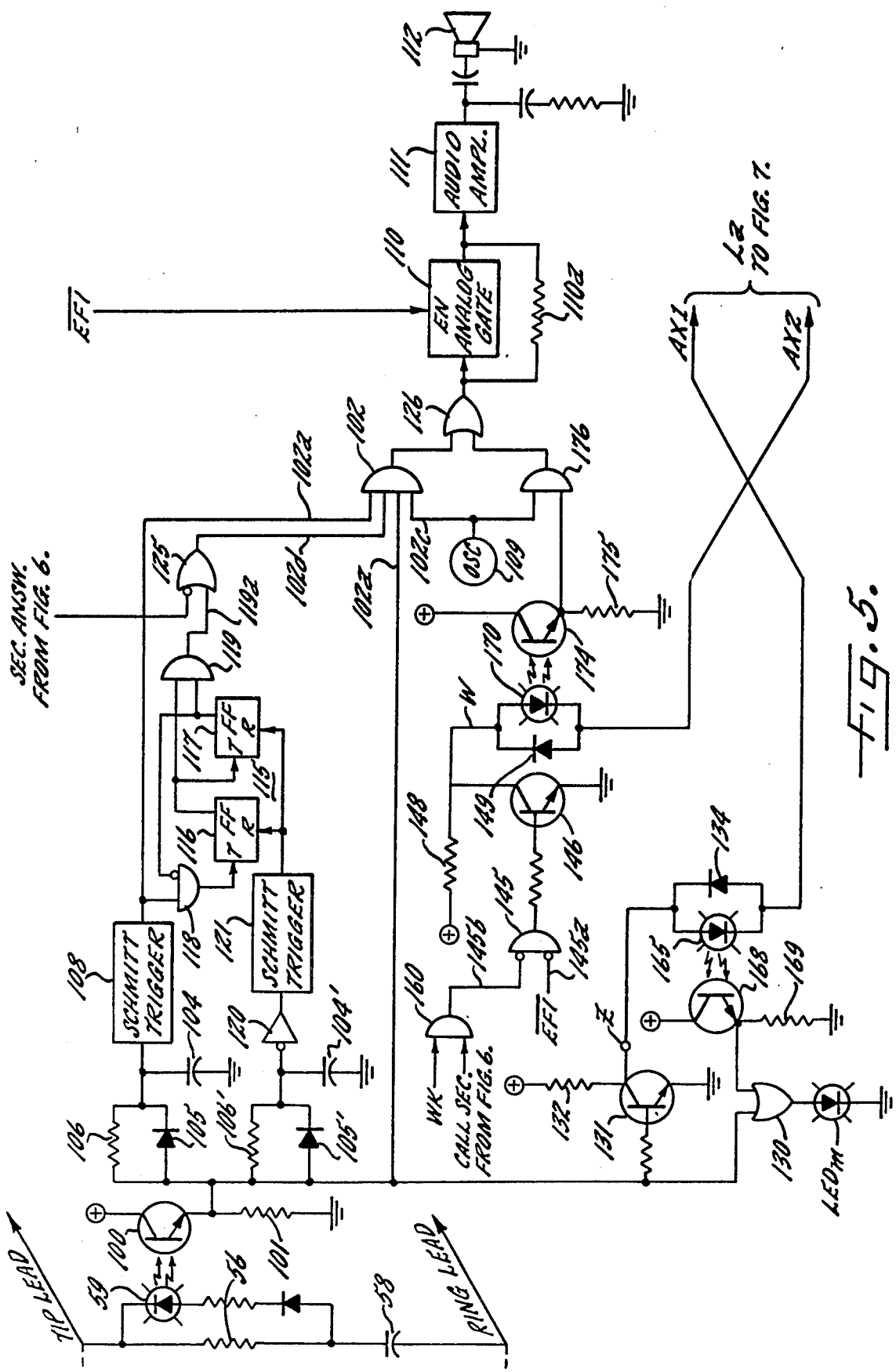
FIG. 5 corresponds to a portion of FIG. 4 but illustrates additional circuitry incorporated into those particular sets to be used by members of a defined group.
Figure 6:
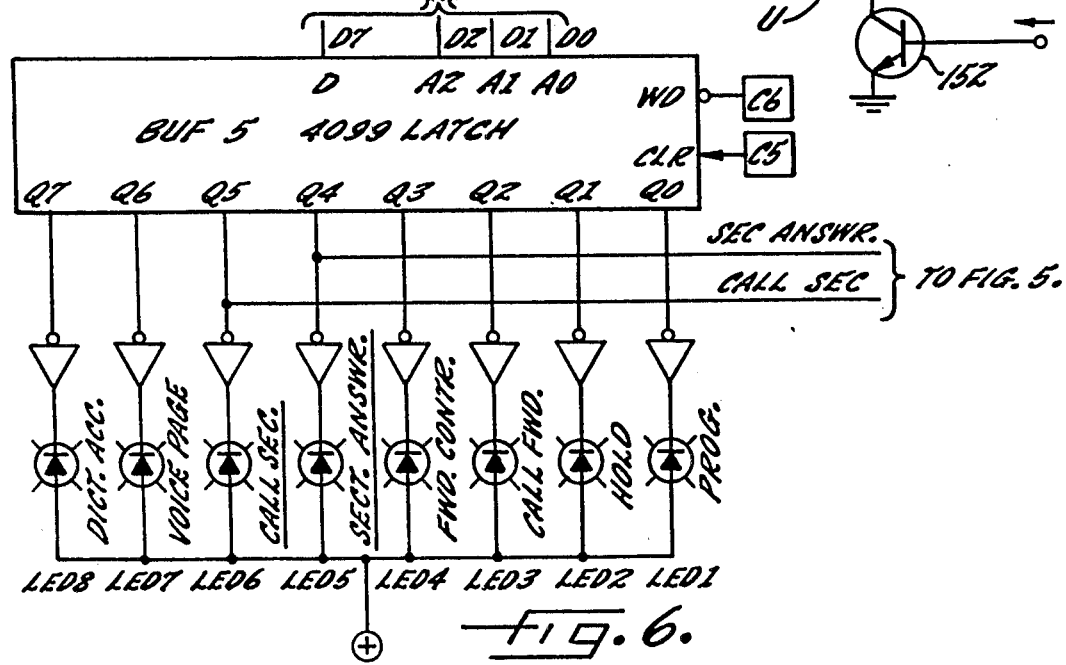
FIG. 6 illustrates modified assignments for visual signaling devices in a group member's telephone set, as contrasted to the assignments in a basic or master set.
Figure 7A:
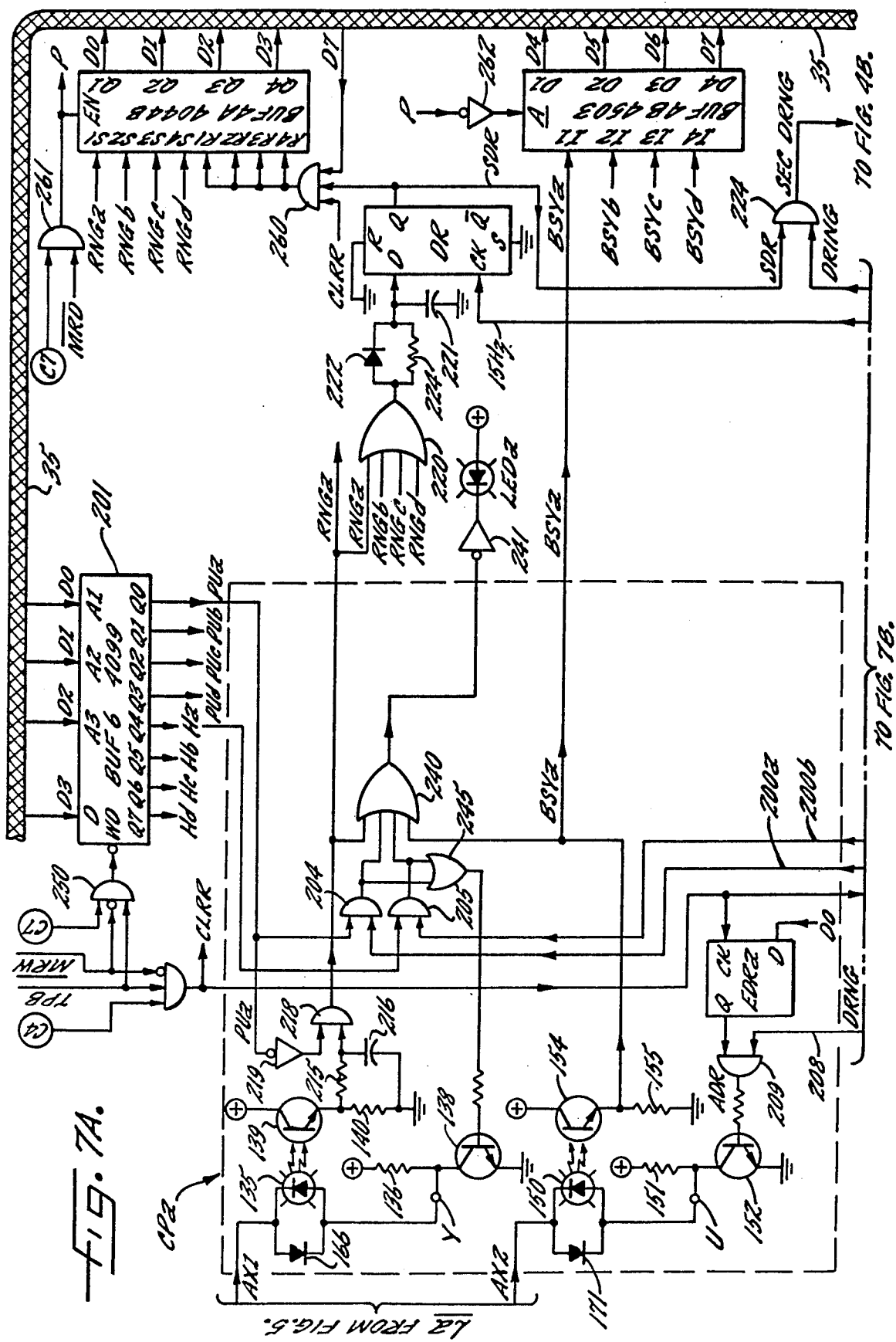
FIGS. 7A and 7B (collectively called FIG. 7), when joined along the indicated junction line, constitute a schematic circuit diagram illustrating special signaling and status circuitry which is incorporated into the master or secretary's set of a defined telephone group.
Figure 7B:
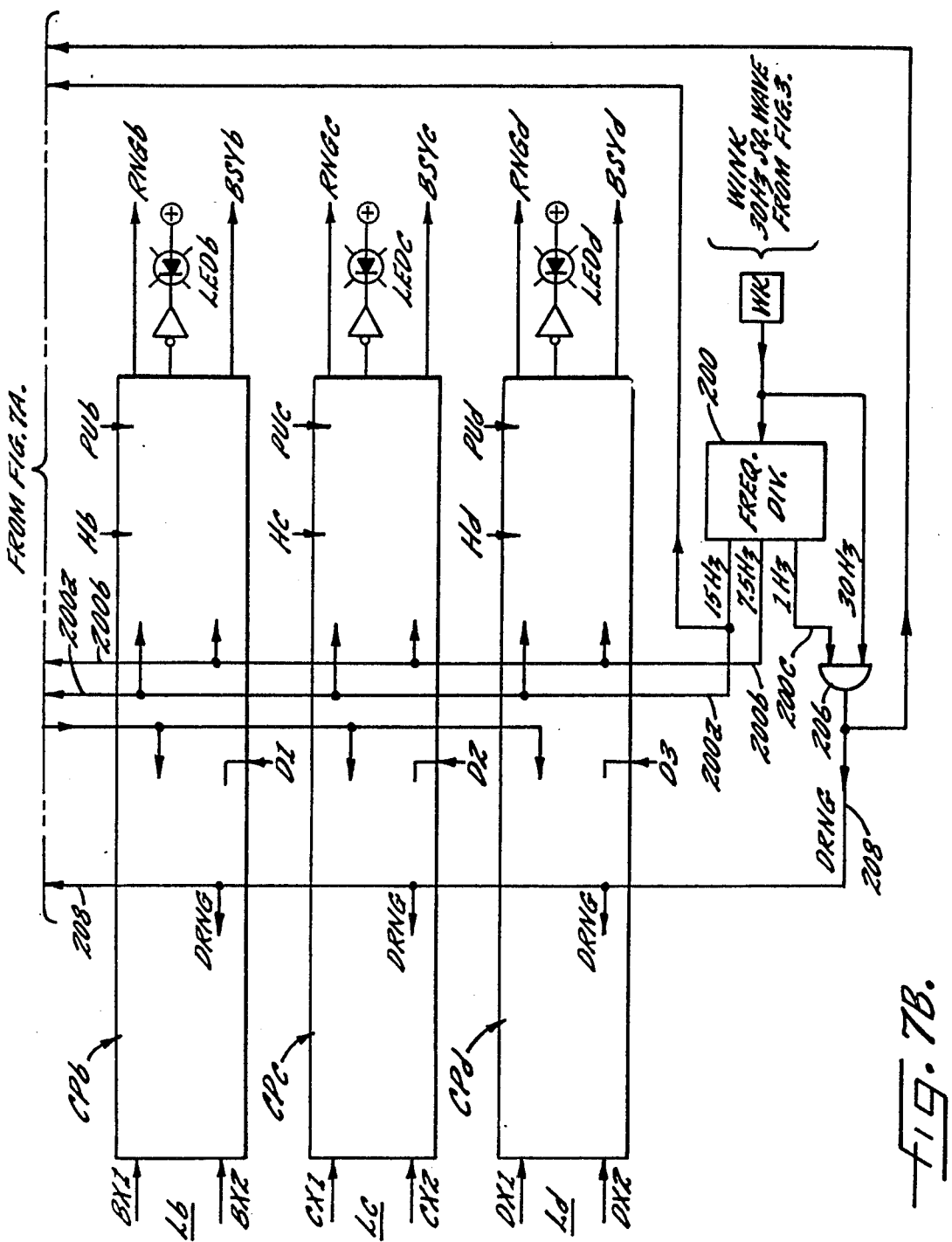

FIG. 3 illustrates the microcomputer apparatus, in conjunction with the several switches and indicating LED's, for all three types of telephone sets identified above. FIG. 3 also shows a standard, commercially available DTMF tone generator in integrated chip form. The apparatus of FIG. 3 connects (via correspondingly labeled terminals) to and cooperates with the line network and electronic ringer which is shown in FIG. 4. The apparatus of FIG. 4 is employed in all three types of phone sets identified above, but it is supplemented and modified slightly for the MS set by circuitry shown in FIG. 5; and it is supplemented in the case of SS type phone sets with circuitry shown in FIG. 7. Thus, one may consider that the electronic circuitry for a BP type phone is illustrated by FIGS. 3 and 4; the electronic circuitry for a type MS set is illustrated by FIGS. 3, 4 and 5 (plus FIG. 6); and the electronic circuitry for a type SS set is illustrated by FIGS. 3, 4 and 7. Each of a plurality of member's sets MS is coupled to one type SS set through a bidirectional link L as shown in FIG. 1. Assuming that the circuitry of FIG. 5 represents the A set ($MS_a$) of FIG. 1, the link $L_a$ in the exemplary embodiment to be described is constituted by two wires $AX_1$ and $AX_2$ which extend between the circuit components shown in FIGS. 5 and 7.

Returning to FIG. 3, any suitable microprocessor 30 is associated with a read only memory or ROM chip 31 as well as a READ/WRITE memory here constituted collectively by two RAM chips 32, 33. These are interconnected, in a manner per se well known, vis an address bus 34 (ten conductors A0–A9) and a data bus 35 (eight conductors D0–D7).

As here shown, the microprocessor 30 is one having an eight bit ALU and is specifically chosen (by way of example) to be a type CDP 1802 currently manufactured and marketed in the United States by Radio Corporation of America (RCA). The inner details and the instruction set for the CDP 1802 microprocessor are well known to those skilled in the art from literature widely published by RCA; thus, such details need not be repeated here. It will suffice simply to note the following salient characteristics:

(a) The ALU and the accumulator (called the D register) in the CDP 1802 microprocessor are eight bits wide. Digital words constituted by one byte of digital bits may be placed on the data bus 35 for reading from or writing to the memory.

(b) The address for such reading or writing is signaled on the eight bit address terminals A0–A7 of the microprocessor, but by reading a wider address in two successive nibbles, and catching the first in a latch 36 (e.g., RCA type 1859), a larger quantity of memory locations (here signaled by ten bits) may be assessed.

(c) Input/output words (each eight bits wide) may be sent over or taken in on the data bus 35 through interface latches which are individually identified (one at a time) by a three bit identification code signaled on the microprocessor terminals N0–N2, providing up to eight combinations. In the present embodiment, these identification codes are decoded into one of eight possible control signals at control terminals C1 through C8 by a decoder 38 (e.g., RCA type 1853). The decoder is enabled so that it produces its output response at the proper time by timing pulses received from the microprocessor terminals TPA and TPB.

(d) Clock pulses (here at a frequency of 768 KHz.) are applied to the CLK terminal of the microprocessor 30 from a suitable clock oscillator circuit 39. The microprocessor employs these clock pulses to execute, with proper timing, its successive phases within successive cycles. Timing pulses are produced at the terminals TPA and TPB to indicate when incoming or outgoing data on the bus 35 are valid. The clock oscillator circuits 39, in a fashion well known, are constructed with appropriate frequency dividers so that they produce certain other clock frequency signals, those being here illustrated as 3.579 MHz. and 30 Hz. The former frequency, as will be explained, serves at a timing input to a digital tone generator, and the latter frequency is used for winking energization of certain visual indicators or LED's.

(e) For a memory READ or WRITE cycle, appropriately timed signals $\overline{MRD}$ and $\overline{MRW}$ are made active low with appropriate timing by the microprocessor 30; these signals are used to enable the memory chips at appropriate times and also to enable input/output latches.

(f) The microprocessor 30 has four input flags which may be tested during execution of certain instructions to determine the states of four respective external bistate devices. These are here designated as input terminals $\overline{EF1}$ through $\overline{EF4}$ (only three of which are used) and they are active when placed at a logic low level.

(g) The microprocessor 30 contains sixteen internal registers (to be called herein Reg. 0–Reg. 15) each of which is sixteen bits wide. The upper and lower halves (bytes) of each register may be accessed alone or sequentially by the execution of appropriate instructions within the instruction set. Because it is assumed that the reader is familiar with the internal registers and the instruction set (widely publicized by the manufacturer, RCA, of the CDP 1802 microprocessor) these registers are not shown in FIG. 3. For completeness, however, reference may be made to the "μmos Pocket Guide" published by RCA with the designation SL8-5 and dated 12/77, such publication being here incorporated by reference.

KEY PAD 15 AND ITS SIGNALS

The standard key pad 15 is illustrated in FIG. 3 as a four-row and three-column matrix circuit associated with the twelve standard dialing switches. Because such a matrix circuit for the key pad 15 is commercially available and well known, its inner details are not here illustrated. It will be understood that as any one switch for standard dialing is actuated, a two-out-of-seven bit code appears on the seven "column and row" terminals here labeled R1–R4 and CN1–CN3. Although frequently such a standard key pad matrix is organized so that active bits in the seven bit output go to a logic low, it is here assumed that the active bits go high according to the "row and column format" code set out in the right portion of Table IV. Thus, whenever any of the standard keys is pressed, a seven bit code appears on a key pad bus 40. Because closure of any standard key makes at least one of the terminals CN1–CN3 go to a high logic level, the output of an associated OR gate 41 will also go to active high for purpose to be explained below.

The outputting of standard dialed digit tones at the tip and ring leads of the telephone set is accomplished through a 2:1 multiplexer 42 and an integrated circuit DTMF tone generator 44 (here, AMI type S2859). The multiplexer selectively transmits eight binary signals from either a first plurality of eight input terminals at A or a second plurality of eight input terminals at B to its eight-conductor output line 42a. The eight lines at 42a connect to the four row input terminals R1–R4 and the three column input terminal CN1–CN3 for the tone generator 44, with the eighth conductor (bit $b_7$) in the group 42a being connected to the chip enable terminal CE of that generator. Assuming that the "select B" terminal in the multiplexer 42 is at a logic low, the eight inputs at 40, 41a are connected to the eight output lines 42a. Under these conditions, if any key of the key pad 15 is momentarily actuated, the output of OR circuit 41 will go to a logic high level and will be transmitted through the multiplexer 42 as the eighth bit $b_7$ to enable the tone generator 44. Simultaneously, the seven bit code from the key pad matrix at 15 will be sent via the bus 40 through the multiplexer to the first seven bit output lines 42a so that the tone generator 44 will receive the "code" representing the particular key pad switch that has been closed.

Incidentally, in the interest of simplicity it is assumed throughout the present description that bi-level logic signals are active when high, except as otherwise explicitly noted. While in many instances use of integrated circuits involves signals active when at a logic low, one skilled in the art will be able readily to understand and make any necessary conversion.

Further, and in a manner to be explained below, the DTMF tone generator 44 provides a high logic signal at its "transmit mute" terminal XM during the period that it is enabled and is outputting any particular tone representing a dial digit. This signal at terminal XM is fed to one input of an AND gate 45 which also receives the signal at line 41a. Thus the output terminal E of the gate 45 goes high when any standard key pad switch has been depressed and a tone is being sent out on terminal TN. The terminal E in FIG. 3 connects to the clock terminal CLK of a seven-bit buffer latch 46 (e.g., RCA Type 1852) called BUF 2. As will be understood by those skilled in the art, the arrival of a signal at the CLK terminal causes the seven bit signals on the key pad output bus 40 to be stored in the latch, and it also results in outputting of a logic low signal on a terminal SR. The terminal SR connects via terminals marked $\underline{A}$ to the $\overline{EF2}$ flag input of the microprocessor 30. Thus, whenever any of the twelve switches in the standard key pad 15 is manually closed, the flag EF2 at the microprocessor 30 will go low for as long as the switch is closed. This may be detected in the microprocessor as an indication that one of the "standard keys" has been actuated.

The buffer latch 46 may have its contents gated through to the data bus 35 in response to simultaneous active logic signals at chip select terminals CS1, CS2 which are here shown as respectively connected to receive the signals $\overline{MRD}$ and C1. Thus, the microprocessor 30 may be conditioned by appropriate program instructions to detect the appearance of an active low signal at the terminal $\overline{EF2}$ and in response thereto to execute an "input routine" which results in the decoder 38 making the terminal C1 high. The particular seven-bit code identifying the specific standard key pad switch actuated can be taken into the microprocessor for usage or for storage into an appropriate memory location. This may be done for two purposes. First, when dial digit sequences which are to be associated with any particular speed dialing or feature switch are going to be initially loaded into RAM, the twelve switches on the key pad may be the "manual data input" avenue for inputting the appropriate digital words which are to be stored. Secondly, the microprocessor 30 and the RAM associated therewith may also be conditioned so as to store any particular sequence of manually dialed digits as the user keys them in to originate a call; and thereafter they may be reproduced and fed sequentially out on the telephone line—in performance of the well known "last number dialed" operation. The present invention involves no aspect of the manner in which digits are first initially stored in association with various ones of the feature or speed dialing keys, nor does it involve any aspect of the "last number dialed" function. While the assignee's product embodying the present invention has those capabilities, details of such capabilities are omitted from the present disclosure because such details are per se known and are not here claimed. It should be understood, therefore, that the buffer latch 46 (BUF 2) may be included in apparatus embodying the invention, but its presence is not essential. The BUF 2 latch 46 is here shown simply as one appropriate means for supplying to the microprocessor (at flag terminal $\overline{EF2}$) a signal which indicates that one of the twelve switches on the key pad 15 has been actuated by the user.

SENDING A DIAL DIGIT SIGNAL FROM MEMORY

The microprocessor 30 in the execution of various instructions may call from memory seven bit words in "column and row format" to represent any of the twelve possible dial digit signals (Table IV). The eighth bit $d_7$ will always be "1". These signals will appear on the data bus 35 simultaneously with the execution of a "C1 output routine", i.e., when the microprocessor terminals N0–N2 are conditioned to cause the decoder 38 to make the control terminal C1 high. In consequence, a buffer latch 50 (here called BUF 3 and constituted for example by an RCA Type 1852 eight bit latch) is enabled by an active signal applied to its CS2 terminal when the signal $\overline{MRW}$ is active. Timing is accomplished by the TPB signal applied to the clock CLK input of BUF 3. Thus, when a dual frequency signal representing a particular dial digit is to be sent out over the tip and ring leads of the telephone set, the appropriate column and row code is applied via the data bus to the seven inputs of BUF 3 and the latter is enabled to latch those seven bits of intelligence by the appearance of the control signal C1. Each of the eight bit words latched into the buffer 50 includes a binary 1 in its eighth bit, $b_7$, and any word latched into the buffer 50 is fed continuously to the seven $\underline{B}$ inputs of the multiplexer 42, the eighth bit $b_7$ always being applied to activate the "select B" control terminal. Therefore, when a word other than all 0's is in BUF 3, it is transmitted as a seven bit signal from input terminal B to the output line 42a and appears at the input of the tone generator 44. The binary 1 level in the $b_7$ bit location enables the tone generator and the latter thus sends the appropriate dual frequency signal from its output terminal TN.

The tone continues until the BUF 3 latch is cleared to make its output signal in bit location $b_7$ (and at the CE terminal for the tone generator 44) revert to a logic low level. The clearing is accomplished by placing an all-zero's signal on the data bus 35 and executing another "C1 input routine" so that the latch 50 is cleared. In this fashion, the microprocessor 30 may, in the execution of instructions within its executive program, cause successive tone signals representing different particular dialed digit values to be sent outwardly from the tone generator 44 via terminal TN.

The tone output terminal TN connects to a correspondingly labeled terminal in FIG. 4 so as to send (in the fashion hereinafter explained) the tone to the tip and ring leads through the hook switch (when the set is off-hook). Whenever a multi-frequency tone is present at the terminal TN, the tone generator 44 also makes transmit and receive mute terminals XM and RM go to an active high logic level. Such signals are fed to correspondingly labeled terminals in FIG. 4 so that outputted multi-frequency dial digit tones are heard at a reduced level via the user's earphone and the transmitter microphone is substantially disabled.

The tone generator 44 is a commercially available and well known integrated circuit chip. The one here illustrated specifically by way of example is manufactured and sold by American Micro Systems, Inc. Reference may be made to the published and publicly available specification sheets for the Type S2859 DTMF tone generator in order to understand the inner details of its operation. It will suffice simply to note here that the 3.579 MHz. signal from the clock circuitry 39 is applied to the "oscillator input" of the tone generator 44, and the VDD and VSS terminals of that tone generator are connected to the positive and negative terminals of an appropriate dc. voltage supply (not shown). The positive terminal of that voltage supply are here represented in the drawings by a ⊕ symbol, and the negative terminal is represented by a ground symbol. In summary, whenever the CE terminal of the tone generator 44 is placed at a logic high level, the particular dial digit value represented by the seven bit word signaled at the row and column inputs is converted into the corresponding industry standard dual frequency sinusoidal tone signal at the terminal TN. At the same time, the transmit and receive mute terminals XM and RM go to a logic high level. When the CE terminal restores to a logic low level, then the outputting of the sinusoidal voltage representing the particular dual frequency tone ceases at the output terminal TN. If a row and column code is latched into BUF 3, the particular dual frequency sinusoidal voltage corresponding to the tone represented by that latched word is outputted at the terminal TN until BUF 3 is again cleared (and the enable terminal CE in generator 44 goes low).

THE AUXILIARY PUSH-BUTTON SWITCHES AND THEIR SIGNALS

The twenty-four auxiliary push button switches SW1-SW24 shown in FIGS. 2, 2A and 2B (and sometimes called simply "buttons") are also represented in FIG. 3 as each being connected between the positive supply voltage terminal and a corresponding one of twenty-four inputs to an encoder 52. That encoder operates to convert one of thirty-two single inputs to a binary five-bit numerical representation which corresponds to the number of the particular switch which has been closed. In the present example, only twenty-four of the encoder inputs are employed, and the encoder output takes on one of the values between 00001 and 11000 (between decimal values of one and twenty-four). The output of the encoder 52 connects to five input terminals $DI_0$ through $DI_4$ in a buffer latch BUF 1 (e.g., RCA Type 1852). An OR circuit 54 connected to all of the switches SW1-SW24 produces a logic high output whenever any single one of those switches is closed, and this is applied to the terminal CLK of BUF 1, causing the latter to (a) latch the outputs of encoder 52 and (b) produce a logic low signal on the terminal SR (and at B) which is thus routed to the $\overline{EF3}$ flag input of the microprocessor 30. Since the microprocessor 30 "looks at" the flag terminal $\overline{EF3}$ on a sufficiently rapidly repeating basis, it will "catch" an indication that any one of the switches SW1-SW24 has been closed. If a "C2 input routine" is then executed by the microprocessor 30 so that the decoder 38 makes the terminal C2 actively high, the contents of the BUF 1 latch are gated onto conductors $D_0$-$D_4$ of the data bus and may be taken into the microprocessor accumulator. This five-bit signaling, resulting from any one of the switches SW1-SW24, numerically identifies (by number) which particular one of those switches has been closed. In summary, therefore, the closure of any one of the twenty-four auxiliary switches, and the identity of that switch, is signaled to the microprocessor via BUF 1 and the data bus during the execution of a "C2 input routine".

THE LED LATCH AND CONTROL OF LED'S

FIG. 3 illustrates, as an output interface device, an eight bit latch BUF 5 which may have any particular bit location therein written high or low, the particular bit so controlled being designated by address signals at terminal A1, A2, A3. For example, the addressable buffer latch BUF 5 may be a Type 4099 chip with a single bit data input terminal D connected to the D7 conductor of the data bus 35. The conductors $D_0$, $D_1$, $D_2$ of the data bus connect to the address inputs. If one desires, for example, to turn on the LED 4 which is connected to output terminal Q3 of BUF 5, the microprocessor is instructed to execute a "C6 output routine" by which the D7 data bus conductor is set to a logic high and the data bus conductors $D_2$, $D_1$, $D_0$ are set to represent 011. When the C6 output terminal of the decoder 38 then goes high, the "write data" terminal WD of BUF 5 goes low to latch a logic high signal at output terminal Q3. Thus, the cathode of LED 4 is placed at a low voltage level via an inverter, and since its anode is connected to the positive voltage source, that LED will light up. The LED 4 may be turned off by writing a "zero" to the Q3 bit place of the addressable latch in the same fashion. Thus the buffer latch B5 permits the execution of instructions by the microprocessor 30 so as to individually set each one of LED 1 through LED 8 to an energized or deenergized state.

HOOK SWITCH SENSING

The hook switch for any particular telephone set being considered is illustrated in FIG. 4 as having five contacts which are shown in their "on hook" positions. Those hook switch contacts include normally open contacts HS1, HS3 and HS5, together with normally closed contacts HS2 and HS4. As a means of informing the microprocessor 30 (FIG. 3) as to whether the telephone set is on-hook or off-hook, the contacts HS5 in FIG. 4 are connected through a load register 55 between the positive voltage source and ground so that a terminal labeled $\overline{EF1}$ will reside at a high or low level when the set is on or off-hook. The terminal $\overline{EF1}$ in FIG. 4 connects to the flag input $\overline{EF1}$ in FIG. 3, and whenever the microprocessor 30 is instructed to test that flag signal, it may be taken that the set is off-hook if the signal $\overline{EF1}$ is a logic low level. This becomes important in the operations to be described hereinafter.

MEANS FOR CREATING A SIMULTATED ON-HOOK CONDITION

Referring first to FIG. 4, the tip and ring leads of the telephone line leading to the central system connect through normally open hook switch contacts HS1 and HS3 to the remainder of the receiver/transmitter network. When those contacts are open (because the phone set is on-hook), then the telephone and its two-wire line exhibit a substantially infinite resistance constituted by a circuit path leading through a resistor 56, a capacitor 58 and the closed switch contacts HS2. As will be explained below, alternating current may flow through this path and give pulsating energization to a light emitting diode 59 in response to ringing signals arriving over the tip and ring leads. When the phone set goes off-hook, however, and the contacts HS1, HS3 close (with the contacts HS2 opening), then the tip and ring leads would normally be directly connected to the RR and C terminals of the receiver/transmitter network. This would normally result in the tip and ring leads presenting a relatively low dc. resistance, sensed at the central system 10 as an indication that the particular phone set is "off-hook".

In the practice of one important aspect of the present invention, a controllable switching device is interposed in the tip and ring lead loop which otherwise exists when the phone is "off-hook". That switching device is controlled so as to normally reside in a conductive or low resistance condition, but it may be switched to its open or high resistance condition so as to make the tip and ring lead loop exhibit a high resistance even though the hook switch is still in its "off-hook" condition. The switching device may be a relay. In the preferred form here shown, this switching device takes the form of a transistor 60 having its emitter-base path interposed between the contacts HS1 and the terminal RR in the tip side of the network. The base of the transistor 60 is connected through a current limiting resistor 61 and a normally conductive photo-transistor 62 to the hook switch contacts HS3 on the ring lead side of the circuit.

A light emitting diode 64 is normally energized by a normally high voltage signal Qc so that when the phone set is off-hook, the transistor 62 conducts base current through the transistor 60, and the latter exhibits a "fully on" or low resistance condition between the tip lead and the terminal RR. If, however, when the hook switch contacts HS1 and HS3 are both closed (and the central system 10 is seeing the tip and ring leads as exhibiting a low resistance, off-hook condition), the control signal Qc is made low so that the light emitting diode 64 is deenergized, then the transistors 62 and 60 are both turned "off". Now, despite the fact that the hook switch contacts HS1 and HS3 are closed, a simulated "on-hook" condition is created and the central system 10 sees the phone set as exhibiting a high resistance in the two-wire line constituted by the tip and ring leads.

The control terminal Qc in FIG. 4 connects to a correspondingly labeled terminal in FIG. 3 which is fed via an inverter 65 from the "Q" terminal of the microprocessor 30. The Q terminal in that microprocessor is the output of an internal controllable flip-flop which can be set or reset by the execution of certain instructions. In keeping with the present invention, and as hereinafter described, the apparatus of FIG. 3 is constructed so that it will make the terminal Q go to a set or high level in certain circumstances and remain there for a predetermined time interval. When this occurs, the inverter 65 makes the signal at terminal Qc revert to a low level so that the switching device or transistor 60 in FIG. 4 causes the phone set to exhibit a high resistance in the tip-ring lead circuit, thereby simulating an on-hook condition. The purpose of this will become clear as the present description proceeds.

THE RECEIVER/TRANSMITTER EQUALIZATION NETWORK

Those portions of FIG. 4 which appear in extra-heavy black lines constitute an "encapsulated circuit" for a conventional hybrid network. This network with its standard terminal nomenclature (terminals RR, C, B, R, and GN) is familiar to those skilled in the art and thus the organization and operation thereof will not be here treated in detail. It will suffice to note that with the telephone set off-hook and the transistor 60 fully conductive, dc. current from the central system battery flows inwardly on the tip lead and through a varistor V1. A normally conductive transistor 70 passes a dc. current bias through the microphone or transmitter 18. The transistor 70 is normally biased "on" by emitter-base current flowing through the collector-emitter circuit of an associated transistor 71, such current passing in a direction from the tip to the ring lead. The transistor 71 is normally conductive by virtue of base-emitter current flowing from terminal RR through a resistor 72. As voice waves impinge upon the transmitter 18, its resistance varies so that the dc. current through the transistor 70 is modulated, and the voice signals thus are sent out as modulated current in the tip and ring leads. When the control voltage at the "transmit" terminal XM goes to a high logic 1 level, a light-emitting diode 73 is energized and an associated photo transistor 74 has its collector-emitter circuit turned on. This shunts the base-emitter of transistor 71 and reduces the current flow through its collector, so that the normally conductive transistor 70 becomes less conductive and presents a higher resistance. As a result, the modulation of current by sound waves impinging upon the transmitter 18 is attenuated or muted. In a consequence, when the outputting of sinusoidal dial digit tone waves is occurring and the signal XM is high, any background noise or spurious sound sources cannot act through a transmitter 18 to materially distort the dual frequency tone waves which are otherwise being applied to the tip and ring leads.

Those sinusoidal tone voltages arrive at the terminal TN (from the tone generator 44, FIG. 3) as previously described when the tone generator 44 is active; they pass through a dc. blocking capacitor 75 and the primary winding 76 of a transformer. The secondary winding 78 thus has ac. tone signals induced in it and these produce modulation of current passing through a transistor 79 to the terminal C and thence to the ring lead. The transistor 79 is turned on by its emitter-base current which flows through a photo transistor 80 whenever a positive voltage level appears at terminal XM to energize an associated light emitting diode 81. If the transmit signal XM is not present from the tone generator 44 (FIG. 3) then a dual frequency tone signal may not reach the tip and ring lead circuit because the transistor 79 is cut off.

In the receive mode, as sinusoidal voice-representing currents flow inwardly and outwardly in the tip and ring leads, they pass through a series circuit constituted by a transformer winding L1/2, a resistor 84, a capacitor 85, and two transformer windings L2 and L1/2 to reach the terminal C, the hook switch contacts HS3 and the ring lead.

The currents in the windings L1/2 and L2 act additively to induce a corresponding voltage in the transformer winding L3, so that currents circulate through the receiver 16 and a normally conductive transistor 86. This results in the sound being reproduced for the user's ear. The transistor 86 is held normally on by its emitter-base current which normally passes through the collector circuit of an associated transistor 88, the latter normally receiving base-emitter current directly through a resistor 89 and flowing from the tip side to the ring side of the circuit. When, however, a positive voltage level appears at the receive mute terminal RM, a light emitting diode 90 is energized to turn on a photo transistor 91 whose collector circuit then shunts the base-emitter path of the transistor 82. This partially turns off the transistor 88 and reduces the emitter-base current in the transistor 86 so that the latter produces a higher resistance in its emitter-collector path. Therefore, the sound produced in the receiver 16 is muted. The effect of this is to mute the "side tone" which the user would hear whenever a relatively strong dual frequency dial tone signal is incoming through the transformer 76, 78.

Further discussion of how side tone is created and produced in the receiver 16, when sound waves impinge on the transmitter 18, will be omitted here since that subject matter is familiar to those skilled in the art and not critical to the practice of the present invention.

AUDIBLE SOUNDER

To audibly indicate the arrival of a ring signal from the central system 10, the telephone sets here being described employ electronic speaker type sounding devices as contrasted to the older, conventional solenoid-clapper bells. Conventionally, either type of sounding device is called a "ringer". Before considering this electronic sounder apparatus, it will be appropriate to note that in conventional telephone systems, the central station battery makes the ring lead of a two-wire phone set −48 volts relative to the tip lead when the set is on-hook and exhibiting a high dc. resistance. When the set is off-hook (for dialing or after a call connection is established), the dc. current drawn as a current bias through the phone network causes a voltage drop at the central station so that the ring lead then resides at about −6 volts relative to the tip lead. The "ringing signal" sent from the central station to an on-hook phone set is generally a 20 Hz. sinusoidal voltage (timed at two seconds on and four seconds off) of about ninety volts amplitude. This 20 Hz. voltage is coupled through an isolating capacitor to actuate the conventional solenoid type bell in older types of standard phones.

From FIG. 4, it will be seen that the dc. voltage source mentioned above in connection with FIG. 3 (and whose positive terminal is represented by the symbol ⊕) is dc. isolated (e.g., by transformer 76, 78 and phototransistors such as 74, 80, 91) from the tip and ring leads and the hybrid network.

In FIG. 4, when an audible response to an incoming ring signal is to be made, the phone set will be on-hook with the contacts HS1 and HS3 open and the contacts HS2 closed. While the capacitor 58 blocks flow of a dc. current through the resistor 56, the 20 Hz. ringing signal on the tip lead will result in pulsating current flow through the resistor 56, the capacitor 58 and the hook switch contacts HS2. Accordingly, the resistor 56 will have a sinusoidal voltage produced across it, and during those half cycles which make the lower end of resistor 56 positive relative to its upper end, current will flow through the light emitting diode 59 to turn on an associated photo transistor 100. Thus, during the two second bursts of the 20 Hz. ringing signal, dc. pulses of twenty-five milliseconds duration and with a frequency of 20 Hz. will appear across the emitter load resistor 101 associated with the photo resistor 100. These pulses are coupled to one input 102a of an AND gate 102. In addition, an integrator in the form of a capacitor 104, a charging diode 105 and a discharging resistor 106 is associated with a Schmitt trigger type circuit 108 to supply an enabling signal on a second lead 102b for the gate 102. When a burst of 20 Hz. ring signal arrives, the dc. pulses appear across the resistor 101, the capacitor 104 charges rapidly through the diode 105 and will discharge slowly through the resistor 106 when that burst of ringing sinusoidal voltage ends. The capacitor 104 thus charges rapidly to the threshold of the trigger circuit 108 and the output of the latter at 102b rises to enable the gate 102. Because the integrator and Schmitt trigger filter out the 20 Hz. pulses, the voltage at input 102b is high during each two second burst and low during the four second pauses of an incoming ring signal.

The input 102c for the gate 102 is coupled to a simple audio frequency oscillator providing a sinusoidal voltage here chosen to be approximately 3 KHz. When an incoming ring signal appears, therefore, the output of gate 102 is a series of pulses having a frequency of 20 Hz. but modulated at the audio frequency of 3 KHz., that combination being turned on and off with 2/4 timing. The output of the gate 102 passes through a normally enabled analog gate 110 and thence through an audio amplifier 111 to excite a loud speaker 112 which produces aural indications of an incoming ringing signal.

The analog gate 110 is employed to mute distinctive ring signals which may be applied to the sounder circuit when the telephone set is off-hook. In particular, MS and SS type sets may be "sounded" when off-hook, as described later. As noted above, the signal $\overline{EF1}$ is high when the phone set is on-hook and the contacts HS5 are open. This normally enables the gate 110. When, however, the contacts HS5 are closed, the signal $\overline{EF1}$ is low and disables the gate 110 so that any "sounding" signal arriving at the resistor 101 must now pass through an attenuating resistor 110a, in parallel with the gate 110, in order to reach the amplifier 111 and the loud speaker 112.

The electronic sounder apparatus in the right portion of FIG. 4 permits other signals to be injected. For a purpose to be explained, a diode 114 is coupled to the upper terminal of the resistor 101 in an SS type set. As noted below with reference to FIG. 7, a distinctive ringing signal may be injected through the diode 114 so that the user of an SS phone may receive a special aural indication under certain conditions.

While it is assumed here that the oscillator 109 produces a 3 KHz. output, this is purely a matter of choice and other frequencies in the audio range may be adopted.

MODIFICATIONS IN AN EXECUTIVE'S OR MS TYPE PHONE

For creating special visual or oral indications, and certain other functions in a "group" exective's set MS, the apparatus in the right portion of FIG. 4 (for a BP or SS set) is supplemented in the fashion illustrated in FIG. 5. It will be assumed that FIG. 5 represents, as typical, the particular master set A or $MS_a$ of FIG. 1; and thus FIG. 5 shows the intelligence signaling link $L_a$ as formed by two wires AX1, AX2 which extend to the SS circuitry in FIG. 7, and over which intelligence signals are sent bidirectionally as explained below.

THE SECRETARY ANSWER FUNCTION

As noted previously, switch SW5 in an MS set (FIG. 2A) may be actuated to establish a "secretary answer" status. A signal SEC-AN resides at a logic 1 level when the secretary answer function has been enabled. In accordance with one aspect of the present invention, that "secretary answer" status results in inhibition of any response to a predetermined number of ring signal bursts incoming to the set MS, and it causes ringing with distinctive signaling at the associated SS set. The executve user of an MS set may thus "turn off" his ringing sounder so that he is not bothered, and so that his secretary will pick up and answer his calls. But if she fails to answer one of his incoming calls after it has rung for a predetermined number of times, then ringing begins at his set and he is advised to answer that call.

To accomplish this, the MS apparatus of FIG. 5 includes means operative only when the "secretary answer" status exists (and a signal SEC-AN is high) for counting the number of incoming ring bursts and for preventing any sounding of the MS speaker 112 until after a predetermined number of such bursts has arrived.

While any suitable form of counter (such as an integrated circuit ring counter) may be employed, the counter 115 in FIG. 5 is illustrated for convenience of understanding as a four state binary counter formed by two tandemly coupled flip-flops 116 and 117. The toggle input for these flip-flops responds to a 0-to-1 positive-going wavefront, the input for the first flip-flop 116 receiving the output of a gate 118 which normally passes two second pulses (separated by four second intervals) from the Schmitt trigger 108 when a series of ring bursts are arriving on the tip and ring leads. The gate 118 is controlled by the inverted output of the last flip-flop 117. Thus as the ringing bursts arrive successively, the counter counts from its 00 state to the 01, 10, 11 states, after which the gate 118 is disabled and the counter is frozen until reset. A gate 119 connected to the outputs of both flip-flops 116, 117 thus produces a logic high on its output lead 119a only after three ring signal bursts have been received and registered in the counter 115 as an indication that the secretary has failed to pick up and answer the incoming call.

The counter 115 is restored to its reset state when any series of incoming ring bursts end, that is, if substantially more than four seconds elapse between successive bursts of 20 Hz. pulses. To accomplish such resetting, an integrator formed by a capacitor 104', a discharging resistance 106' and a charging diode 105' is coupled to receive the 20 Hz. ringing pulses appearing across the resistor 101. The capacitor 104' will charge rapidly when a ringing burst arrives to create pulses across resistor 101. But during the intervening four second interval between such bursts, it will discharge relatively slowly through the resistor 106' which is selected to provide a discharging time constant considerably higher than that formed by the capacitor 104 and resistor 106. The voltage across the capacitor 104' is passed through an inverter 120 which feeds the input of a second Schmitt trigger 121 whose output is coupled to the reset terminals of the flip-flops 116, 117. In operation, the Schmitt trigger 121 is normally in its enabled or active state, but as soon as a burst of ring pulses appears, the capacitor 104' charges and the inverter 120 pulls the input of the Schmitt trigger below the conduction threshold. Thus, the output of the Schmitt trigger 121 switches to a logic low level. During the four second intervals between ring bursts, the capacitor 104' discharges through the resistor 106' but normally the voltage at the input of the Schmitt trigger will not rise above the trigger's threshold if another ring burst comes along within four seconds. If the train of ringing bursts ends, and approximately four and one-half or five seconds elapses with no ring burst following the last, then the capacitor 104' will discharge sufficiently to make the inverter 120 increase the trigger input signal above the threshold, whereupon the output of the Schmitt trigger will switch with a positive-going wavefront to reset the counter flip-flops 116, 117.

In summary, the counter 115 with its AND gate 119 provides a logic high signal on the conductor 119a only after a predetermined number (here three) of ring bursts have been received on the tip and ring lines of an MS type phone. The counter resets automatically through the Schmitt trigger 121 when the train of incoming ring bursts terminates, and this restores the signal at 119a to a logic low level.

To inhibit the first "three rings" when the "secretary answer" function is enabled, but to cause sounding in response to all rings if the "secretary answer" function is not enabled, the SEC-AN signal is applied to an inverting input of an OR circuit 125 which also has the conductor 119a as its second input. The output line 102d forms a fourth input to the gate 102 described above with reference to FIG. 4. Therefore, if the SEC-AN signal is at a logic 0 level because the "secretary answer" feature has not been enabled, the line 102d will reside at a logic high level, the gate 102 will be enabled, and audible ringing will occur at the speaker 112 in the fashion described above with respect to FIG. 4. It may be noted that the output of the gate 102 is passed through an OR circuit 126 to the audio amplifier 111, for a purpose to be noted later. On the other hand, if the SEC-AN signal is at a logic 1 level, then the line 102d will reside at a logic 0 level when ring bursts are first received on the tip and ring leads of the MS apparatus illustrated in FIG. 5. This is so because the conductor 119a will reside at a logic low level until the counter 115 reaches a state of 11 to enable the gate 119. Thus, the gate 102 blocks any audible response at the amplifier 111 and the speaker 112 until the counter 115 has counted three incoming ring bursts. Thereafter, however, as ring bursts continue to arrive, the counter 115 is frozen in its "full" state by the gate 118, and the logic high level at conductor 119a passes through OR circuit 125 to the conductor 102d. This now enables the gate 102 so that the bursts of 20 Hz. pulses arriving on the conductor 102a are transmitted through the gate along with the three KHz. pulses from the oscillator 109. In this fashion, the user of the set MS will hear via his speaker 112 ring burst signals which are subsequent to the first three if he has set up the "secretary answer" status in his telephone set.

COUPLING RING SIGNALS TO THE SECRETARY'S SET

To produce distinctive ringing at the SS when any set $MS_x$ is ringing, the circuitry of each MS includes means for sending its incoming ring signal to the SS via the bidirectional link $L_x$. As shown by FIG. 5 for the set $MS_a$, a ring signal incoming produces 20 Hz. pulses across the resistor 101 with 2/4 on/off timing. These positive-going 20 Hz. pulses pass through an OR circuit 130 to give 20 Hz. blinking (with 2-on, 4-off timing) to the $LED_m$ which is a visual indicator on each MS (see FIG. 2A). Those same 20 Hz. positive voltage pulses at resistor 101 create emitter-base current in a transistor 131 having its collector at point Z coupled through a load resistor 132 to the dc. positive voltage source. Each pulse in a ringing burst will thus pull point Z to approximately a zero volt level (relative to ground). A diode 134 poled toward point Z connected to the intelligence signaling conductor AX1. As diagrammatically shown in FIG. 5A (and more fully discussed below with reference to FIG. 7), the line AX1 couples to a light emitting diode 135 in the SS, its anode being connected to a load resistor 136 leading to the dc. supply voltage. Assuming that an associated transistor 138 is in its cutoff state, a point Y resides at a potential sufficiently positive to permit current flow, when transistor 131 is conducting, through resistor 136, diode 135, diode 134 and transistor 131. In consequence, when the transistor 131 conducts with 20 Hz. pulses the LED 135 (in the secretary's set) flashes with a 20 Hz. pulse frequency. These flashes may be detected by an associated photo transistor 139 having an emitter load resistor 140 which provides signals in-going to the secretary's set (as later described with reference to FIG. 7). In summary, whenever a given master set MS has an incoming ring on its two-wire line, 20 Hz. pulses indicative of that ring (and in two second bursts) are signaled via the conductor AX1 to the transistor 139 in the secretary's set. While the current flows from right to left in wire AX1 as viewed in FIG. 5A, the sensing of the signaling is that a ringing signal at the MS set is sent from left to right (from FIG. 5 to FIG. 7) over the conductor AX1.

COUPLING OF HOOK STATUS AND SPECIAL "CALL SECRETARY" SIGNALS TO THE SECRETARY'S SET

In accordance with another aspect of the present invention, means are provided to send an intelligence signal from each MS within a group to the associated SS to indicate whether or not that particular MS is on or off-hook (i.e., not busy or busy). For this purpose, the conductor AX2 in the directional link $L_a$ (FIG. 5) is employed. As here shown, the hook status signal $\overline{EF1}$ from the FIG. 3 apparatus of the MS set is fed to one input of a NAND gate 145. Recalling that the signal $\overline{EF1}$ (as created by the contacts HS5 in FIG. 4) is at a logic low when the set is off-hook, and assuming that the gate input line 145b is at a logic low level, then the output of the gate 145 will be logically high and positive to send base-emitter current through a transistor 146 whenever the MS is off-hook. When transistor 146 is thus turned on, it draws current through a load resistor 148 making a point W low in potential. As indicated in FIG. 5B, this creates a conductive circuit path via a conductor AX2 and a diode 149 from the associated secretary's set. More particularly, the conductor AX2 connects through a light emitting diode 150, poled toward the point W, to a load resistor 151 tied to the positive supply voltage. Assuming that an associated transistor 52 is non-conductive, then current may flow from the positive voltage source via line 151 to a point U and thence through the diode 150, the conductor AX2, diode 149 to point W and thence through the turned-on transistor 146. This results in steady energization and illumination of the light-emitting diode 150. Its emitted light may be detected by an associated photo transistor 154. A positive voltage across an associated emitter load resistor 155 thus indicates that the MS is off-hook.

A special and priority call is made whenever the user of an MS wishes to call the secretary by putting up a call through the central system 10. The secretary's set will ring by virtue of a ring signal sent to its tip and ring leads from the central system, but it is desirable that some special indication of the origin of the call be made at the secretary's set so that she may answer it with priority.

In keeping with another aspect of the invention, when the user of an MS initiates a call to the SS of the group, a special winking of a visual indicating device is created at the secretary's set. Insofar as this involves the apparatus shown in FIG. 5, an AND gate 160 is coupled to receive at its respective inputs (a) the 30 Hz. wink signal WK created by the clock circuitry 39 of FIG. 3 and (b) a CALL SEC signal which is established at a high level (in a fashion to be explained) whenever the user of an MS pushes his "call secretary" switch (SW6) to initiate a speed dial call to the secretary. When such a special call is initiated the MS will be off-hook and the signal $\overline{EF1}$ at input line 145a will be low. With the CALL SEC signal at a logic high, the output of the AND gate 160 will thus swing high and low at a 30 Hz. squarewave frequency of the signal WK. Accordingly, the transistor 146 in FIG. 5 and FIG. 5B will now turn on and off with 30 Hz. pulses, and the LED 150 (at the secretary's set, see FIG. 5B) will emit light flashes with a 30 Hz. frequency. Thus, the signal across load resistor 155 will be pulsating rather than steady and it will indicate not only that the associated user's set is off-hook but also that the priority call has been or is being speed dialed to the secretary's set. The manner in which this produces a unique indicating response in the secretary's set (FIG. 7) will be explained later.

INDICATING MEANS IN EACH MS RESPONSIVE TO STATUS SIGNALS SENT FROM AN ASSOCIATED SECRETARY'S SET

As will be treated more fully below, the secretary's set SS for any group may pick up a call which is ringing at any one of the several MS's. Thereafter, the picked up call may be placed in group hold, tagged to the directory number of the MS to which the picked up call originally came. It is desirable that the user of the MS be informed as to the status of the SS with regard to calls which have been picked up or placed on hold for that user. In accordance with another aspect of the present invention, special status signals are sent from the SS to any member's set $MS_x$ within the group so as to indicate that a call originally coming into that $MS_x$ has now been picked up or is now on group hold. These status signals, which may have any desired frequency or on/off timing, are here chosen such that pickup status is indicated by a 15 Hz. squarewave signal, whereas a group hold status is indicated by a 7.5 Hz. squarewave signal. Such signal is applied to the base of the transistor 138 (FIG. 5A) so that it renders the transistor conductive at a 15 Hz. or 7.5 Hz. rate, each pulse causing the point Y to fall in potential toward ground during the short intervals when the transistor 138 is fully conductive. When point Y falls in potential, a current path is established from the positive voltage source terminal through the resistor 132 (FIGS. 5 and 5A) via point Z, through a light-emitting diode 165, the line AX1, and another diode 166. Such current with its uniquely timed pulsing causes flashing of the diode 165 so that an associated photo transistor 168 is periodically turned on. The voltage with unique timing pulses across the emitter load resistor 169 may thus be sensed to actuate an appropriate indicator in the member's set MS. As shown if FIG. 5, that voltage at the load resistor 169 is transmitting through OR circuit 130 to energize $LED_m$. If an executive has been absent from his desk and returns to see his $LED_m$ flashing at a 15 or 7.5 Hz. rate, he knows that the secretary has picked up one of his calls and is talking, or that the secretary has picked up one of his calls and placed it in group hold. The $LED_m$ thus serves as a status indicator in the MS, flashing with 2/4 on-off timing when an incoming call is ringing, flashing with a 15 Hz. rate when an incoming call has been picked up by the secretary, and flashing with a 7.5 Hz. rate when an incoming call has been placed on group hold by the secretary.

It is to be observed that the diodes 134 and 165 are connected in parallel and oppositely poled. Similarly, the diodes 135 and 166 are connected in parallel and oppositely poled. This permits two distinctive types of signals to be sent in opposite directions via the intelligence link conductor AX1. A ring signal at the MS is transmitted to the SS by virtue of diodes 134 and 135, whereas status signals are transmitted from the SS to the MS via diodes 165 and 166,—the signal wire AX1 serving as the transmission path in each case.

DISTINCTIVE RINGING IN THE MS RESPONSIVE TO A SIGNAL FROM THE SS

As will be explained more fully below, when a secretary is placing a call directly to a given MS, or is transferring a call from group hold to the MS, it is desirable that the executive user at the MS receive a distinctive ring so that he is apprised of the origin of the call and can treat it with special attention. In a fashion to be explained below, the apparatus of FIG. 7 under certain circumstances may apply a one second on/one second off 30 Hz. squarewave to the base of the transistor 152 (FIG. 5B). When this occurs, the point U is pulled low in potential at a 30 Hz. rate with one second on/one second off timing. This will permit current to flow from the positive voltage supply terminal in FIG. 5B through the load resistor 148 to point W and to thence through a light emitting diode 170, the wire AX2, a diode 171 to the point U and through the transistor 152. A photo transistor 174 will thus be turned on with 30 Hz. pulses and one second on/one second off timing. A load resistor 175 receives those pulses and sends them to one input of an AND gate 176 (FIG. 5) whose other input receives the 3 KHz. wave from oscillator 109. The output of the AND gate 176 passes through the OR circuit 126 to the audio amplifier 111 which drives the speaker 112. Thus, whenever the secretary's set within a group sends a distinctive ring signal (to be called ADR) by periodically energizing the transistor 152 (FIG. 5B), the conductor AX2 carries that distinctive ring signal (here assumed by way of example to be 30 Hz. with one second on/off timing) to the light-emitting diode 170, and the speaker 112 is sounded by an audible three KHz. and 30 Hz. pulsing with 1/1 on-off timing (as contrasted to normal ringing of 3 KHz. with 20 Hz. pulsing and 2/4 on-off timing). By the use of the intelligence signaling interconnections, therefore, the single conductor AX2 sends intelligence in one direction (from the MS to the SS) to indicate whether the MS is on or off-hook and whether a call is being placed to the secretary, while intelligence is transmitted from the SS to the MS in order to produce distinctive ringing at the latter under certain conditions.

As in the case of conductor AX1, the diodes associated with the conductor AX2 are connected in two parallel pairs with opposite polarization. That is, diodes 149 and 170 are in parallel but with opposite polarization, while diodes 171 and 150 are in parallel but oppositely poled.

In summary: The $MS_a$ set of FIG. 1 may send a first signal (20 Hz., 2/4) to the SS via wire AX1 when the MS is ringing. It may send a second signal (steady on) to the SS via wire AX2 when the MS is off-hook and busy. It may send a third signal (30 Hz. WK) to the SS via wire AX2 when a call is being made to the SS. The SS may send a first or second signal (PU BLK at 15 Hz. or HLD. BLK at 7.5 Hz., as explained below) to the $MS_a$ via wire AX1 to excite $LED_m$. And the SS may send a third signal (ADR, 30 Hz., 1/1) to the $MS_a$ via wire AX2 to cause distinctive ringing.

The interaction between the apparatus of FIG. 5 and that shown in FIG. 7 will become more clear when the latter figure is treated in detail.

MINOR CHANGES IN LED ASSIGNMENTS FOR THE MS

In the lower portion of FIG. 3, LED 1 through LED 8 associated with switches SW1 through SW8 (FIGS. 2 and 2C) are assigned to indicate activity of the special function or feature associated with those eight auxiliary switches. In the case of the executive or member's set MS, however, the switch and LED assignments differ slightly as illustrated in FIG. 2B and Table II. That is, switch SW5 is associated with the "secretary answer" feature and switch SW6 is associated with the "call secretary" feature. Referring to FIG. 6, these differing functions for LED 5 and LED 6 may be kept in mind to understand that the output terminal $Q_4$ of the BUF 5 will be high when the secretary answer feature is enabled, thereby turning on the LED 5. It becomes convenient, therefore, to take as a status signal the voltage which appears at the output terminal $Q_3$ and connect it to FIG. 5 as the SEC-AN status signal. It is this particular signal which forms one input to the OR circuit 125 representing the "secretary answer" status when the signal is at a logic high. Similarly, the terminal $Q_5$ of BUF 5 (FIG. 6) is high when the "call secretary" function is being executed, as more fully explained below. Thus, when the LED 6 is excited, the output terminal $Q_5$ is at a logic high, and it forms the CALL SEC signal which is connected to the AND gate 160 of FIG. 5.

Except for the foregoing, and certain other distinctions to be noted below, each of the several member's sets MS within a defined group are structurally the same as the basic phone sets BP.

SUPPLEMENTAL CIRCUITRY INCORPORATED INTO TYPE SS PHONES

In the preceding treatment of FIGS. 2 and 2B and Table II, it was noted that the auxiliary switches SW1-SW24 and LED's 1-8 for an SS are given assignments (here purely examples for purposes of discussion) which are the same as those in a basic phone BP, except for minor differences. These differences involve switches SW20, SW21, SW22 and SW23 which are assigned to coact with the four members' sets $MS_a$, $MS_b$, $MS_c$, $MS_d$. Moreover, the four light-emitting diodes $LED_a$, $LED_b$, $LED_c$, $LED_d$ (FIG. 2B) are associated with the switches SW20-SW23 for the purpose of indicating status of calls to or from the respective members' sets. Finally, in the secretary's set, the switch SW24 is assigned to the function of placing a call, picked up from any member's set, into "group hold".

Unlike the type BP and type MS sets, but as shown generally in FIG. 1, each type SS phone connects to a plurality of MS sets via two-wire links $L_a$, $L_b$, $L_c$, $L_d$—an exemplary member's set $MS_a$ being so connected for intelligence signaling via the two wires AX1, AX2, constituting link $L_a$ as described with respect to FIG. 5.

FIG. 7 shows certain supplemental circuitry included within a secretary's set and which connects both (a) the microcomputer apparatus of that set (shown in FIG. 3) and also to a plurality (here, for example, four) member's sets $MS_{a-d}$. In general terms, FIG. 7 shows four circuit portions $CP_a$–$CP_d$ which are identical but which respectively connect to and coact with the four group phones $MS_a$–$MS_d$ via the two-wire links $L_a$–$L_d$. The inner details of the circuit portion $CP_a$ will be treated and this will be sufficient for an understanding of the identical circuit portions $CP_b$ to $CP_d$ which are illustrated only as heavy line rectangles. The four circuit portions $CP_a$ to $CP_d$ control the respective light-emitting diodes $LED_a$ to $LED_d$; they couple to the four respective pairs of intelligence-carrying conductors (AX1, AX2 for $CP_a$; BX1, BX2 for $CP_b$ and so on); they produce status signals $RNG_a$ to $RNG_d$, respectively; and they produce control/status signals $BSY_a$ to $BSY_d$, respectively. All of the four circuit portions $CP_a$ to $CP_d$ receive timing signals from a common frequency divider 200. Further, the four circuit portions $CP_a$ to $CP_d$ receive respective status signals $PU_a$ to $PU_d$ and $H_a$ to H$_d$ from an addressable latch 201, here called buff BUF 6. Finally, the circuit portions CP$_a$ to CP$_d$ contain four respective "D type" flip-flops EDR$_a$ to EDR$_d$ (only the first being shown physically) which have their "data input" terminals D respectively connected to the first four bit lines D$_0$, D$_1$, D$_2$, D$_3$ of the data bus 35 for selectively controlled setting or resetting.

As a matter of introduction, the 30 Hz. "wink frequency" signal from the oscillator circuits 39 (FIG. 3) is coupled via the terminal WK to the frequency divider 200 in FIG. 7. That frequency divider simply scales down the 30 Hz. input to produce a first squarewave of 15 Hz. at output 200a, a second squarewave of 7.5 Hz. at output 200b, and a third squarewave of 1 Hz. at output terminal 200c. The 15 Hz. and 7.5 Hz. timing signals are applied respectively as inputs to AND gates 204 and 205 in circuit portion CP$_a$ (and to similar AND gates in the remaining circuit portions CP$_b$ to CP$_d$). These signals are used to indicate status in a manner to be explained below. The 1 Hz. squarewave appearing at frequency divider output 200c is appled to one input of an AND gate 206 whose other input receives directly the 30 Hz. squarewave from the terminal WK. The output line 208 for the AND gate 206 thus carries continually a signal called DRING which, merely as an example, has one second "on", one second "off" timing with 30 Hz. pulses during the "on" intervals. As will be explained, the signal DRING is employed for distinctive ringing. It is fed to an AND gate 209 in circuit portion CP$_a$ (as well as to similar gates in the remaining circuit portions). When the gate 209 is enabled by the flip-flop EDR$_a$, it sends a signal ADR to the associated member's set MS$_a$, as treated below.

With the foregoing in mind, a discussion of circuit portion CP$_a$ will suffice for understanding of all four identical such circuit portions.

PRODUCING A BISTATE RINGING SIGNAL RNG$_a$ AND INDICATING THAT SET MS$_a$ IS RINGING

Figure 5A:
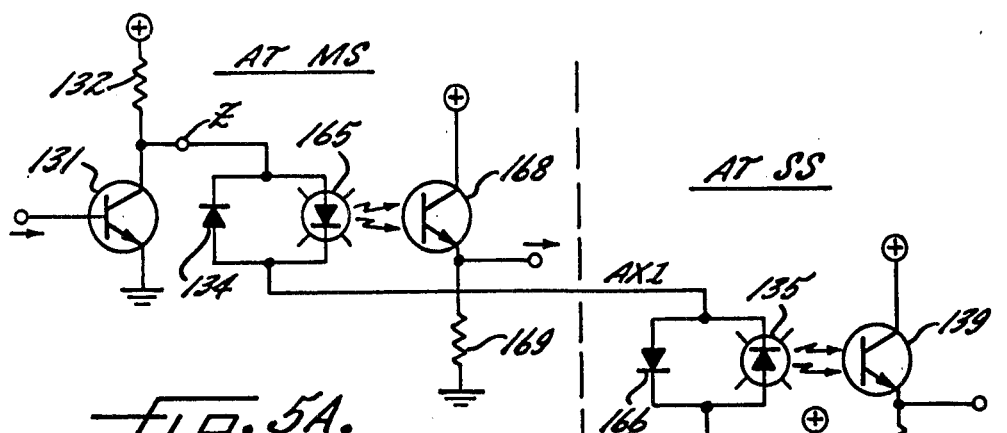
FIGS. 5A and 5B are simplified schematic diagrams illustrating the intelligence link interconnections between the master set and each one of the member's sets within a group.
Figure 5B:
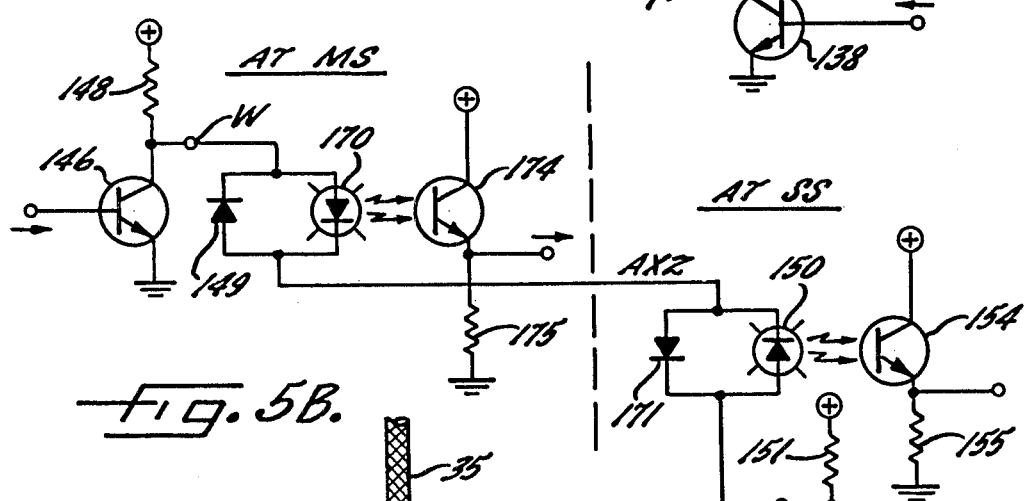

The left portion of circuit portion CP$_a$ in FIG. 7 includes certain elements which have already been identified (by the same reference characters) in the right portion of FIGS. 5A and 5B. As explained with reference to FIG. 5, when the set MS$_a$ is receiving ringing signals due to an incoming call from the central system, the line AX1 is pulled to a low potential (by the transistor 131 in FIG. 5) with a 20 Hz. squarewave having two seconds on and four second off timing. This causes LED 135 (FIG. 7) to render the transistor 139 conductive with the same 20 Hz. signal and 2/4 on/off timing. The ring signal at MR. A's set MS$_a$ is thus reproduced across the emitter load resistor 140 in FIG. 7. When that ring signal voltage appears across resistor 140 it is smoothed by a filter comprising a resistor 215 and a capacitor 216 to remove the 20 Hz. pulsing, thus a voltage alternately "high" for two seconds and "low" for four seconds is fed to one input of an AND gate 218. Assuming that the signal PU$_a$ is at a logic 1 level, the output of an inverter 219 feeding the other input of the gate 218 will be high, so that the gate 218 will supply a logic 1 level voltage to a conductor which leads to a terminal labeled RNG$_a$. If the incoming ring signal at the set MS$_a$ terminates, then the signal RNG$_a$ will revert to a steady logic low.

In a similar fashion, the circuit portions CP$_b$ through CP$_d$ produce signals RNG$_b$ through RNG$_d$ when their corresponding respective member's sets MS$_b$ through MS$_d$ are receiving ringing signals due to incoming calls.

In accordance with the present invention, means are provided for creating a distinct indication at the secretary's set to identify the particular one or ones of the member's sets which are at any time in a ringing status. For this purpose, the output of AND gate 218 is fed to one input of an OR circuit 240 whose output leads through an inverting amplifier 241 to the cathode of LED$_a$ having its anode connected to the positive voltage source. Thus, whenever the set MS$_a$ is ringing, the LED$_a$ associated with switch SW20 (FIG. 2C) flashes with ring signal timing, that is, two seconds on and four seconds off. By glancing at her display panel, the secretary attendant at the SS may know immediately which of the several member's sets is ringing. She also receives simultaneously a distinctive ring or sound from her sounding speaker, as will be explained more fully below. Her attention is directed to the fact that one of her member's sets is ringing by this distinctive sound, and yet she may identify the particular set which is ringing by glancing at the four visual indicators LED$_a$ through LED$_d$.

PRODUCING A BISTATE BUSY SIGNAL BSY$_a$ AND INDICATING THE BUSY STATUS OF A MEMBER'S SET

Further in accordance with the invention, the secretary's set is constructed in conjunction with the member's sets to provide means for indicating (either visually or aurally) when any or all of the associated member's sets is busy. A member's set is busy, of course, if it is off-hook. And as explained earlier with reference to FIGS. 4 and 5, a member's set will have its signal $\overline{EF1}$ residing at a logic low level whenever it is off-hook. In these circumstances (and as shown in FIG. 5) the signal $\overline{EF1}$ at a low logic level will produce a logic high output from the AND gate 145 to render the collector-emitter path of the transistor 146 conductive. Thus, assuming that the transistor 152 (FIG. 7) is non-conductive (because the signal ADR is low) current will flow steadily through the resistor 151 via the point U and the LED 150 over the line AX2 and through the diode 149 and transistor 146 in FIG. 5. With the LED 150 steadily emitting light, the photo transistor 154 is rendered conductive so that a logic high voltage appears at the upper end of a load resistor 155 in FIG. 7. This signal is applied to a terminal here labeled BSY$_a$ which will reside steadily at a high logic level so long as the specifically associated set MS$_a$ is off-hook, i.e., busy.

In a similar fashion, the circuit portions CP$_b$ through CP$_d$ will produce respective signals BSY$_b$ through BSY$_d$ whenever their corresponding member's sets are off-hook and busy.

In order to provide an indication to the user of the secretary's set, and one which in this instance is visual rather than aural, the signal BSY$_a$ from load resistor 155 is coupled to one input of the OR circuit 240. Thus, LED$_a$ will be steadily illuminated to indicate to the secretary that Mr. A is busy whenever the set MS$_a$ is off-hook. It is, of course, impossible for the set MS$_a$ to be simultaneously off-hook and also ringing, so there is no conflict between using the LED$_a$ as an indicator of both a ringing status and a busy status for the corresponding set MS$_a$.

If, however, the user of set MS$_a$ (FIG. 5) is off-hook and is "calling the secretary" by having pressed his switch SW6, the apparatus will send a 30 Hz. signal to FIG. 7 via wire AX2. Thus, the $LED_a$ will wink at 30 Hz. (rather than be steadily lighted) to inform the secretary that a call ringing at her set has been originated by her boss, Mr. A.

PRODUCING A DISTINCTIVE INDICATION OF PICKED-UP STATUS

As will become apparent later, the microcomputer system of FIG. 3 in a secretary's set is controlled in response to the appearance of $RNG_a$ and $BSY_a$ signals as well as the momentary closure of the "Mr. A" switch SW20. In executing its iterative program, the microcomputer of FIG. 3 will output signals to the buffer latch 201 in FIG. 7 so as to place the BUF terminal $Q_0$ at a logic high (and the signal $PU_a$ a logic high) whenever a call originally coming into set $MS_a$ has been answered and picked up by the secretary's set. Assuming that this condition exists and the signal $PU_a$ is at a logic high, then the AND gate 204 in FIG. 7 is enabled to pass the 15 Hz. signal from frequency divider output terminal 200a to one input of the OR circuit 240. Whenever the secretary's set has a caller to the set $MS_a$ in picked up status, therefore, $LED_a$ will flash with a distinctive pulsing of 15 Hz. (called PU BLINK). The secretary need only glance at the $LED_a$ to see this 15 Hz. blinking and know that she is currently connected to and talking with a caller whom she has picked up after he rang at the set $MS_a$.

PRODUCING A DISTINCTIVE INDICATION OF GROUP HOLD STATUS

As will become apparent later, the microcomputer system of FIG. 3 in a secretary's set is controlled in response to the appearance of the $RNG_a$ and $BSY_a$ signals, and the closure of the "Mr. A" switch SW20, according to a program of instructions by which a caller picked up from the set $MS_a$ may be placed into a "group hold" status tagged to the directory number of the member's set $MS_a$. In executing its program of instructions, the microcomputer apparatus of FIG. 3 will output signals to BUF 6 (FIG. 7) to make the signal $H_a$ have a logic high level if a caller to set $MS_a$ has been first picked up and then placed in "group hold".

To apprise the secretary that a caller to the set $MS_a$ has been placed in group hold, unique signaling means are here provided. Assuming that the signal $H_a$ is at a logic high level, it enables the gate 205 so that the latter passes the 7.5 Hz. timing signal from frequency divider output 200b to one input of the OR circuit 240. Thus, $LED_a$ is energized to blink (HLD BLINK) a frequency of 7.5 Hz. in these circumstances. The secretary need only glance at the $LED_a$, see it flashing at a 7.5 Hz. rate, and thus be reminded that she has placed a caller in group hold tagged to Mr. A's set and that she should retrieve that caller after attending to other business.

COUPLING A PICKED UP OR GROUP HOLD STATUS SIGNAL TO THE ASSOCIATED MEMBER'S SET

An incoming call to the set $MS_a$ cannot be simultaneously in a picked up status and a group hold status. In order to provide a distinctive indication (either aural or visual) at the member's set $MS_a$ so that its user will know when the secretary has either picked up or placed a call incoming to him in group hold, the outputs of the two AND gates 204 and 205 are both fed to an OR circuit 245 which controls the base-emitter circuit of the transistor 138. Thus, if the secretary's set has picked up a call incoming to the set $MS_a$ and is talking with the caller, the transistor 138 is turned on and off with the PU BLINK frequency of 15 Hz. Alternatively, if the call originally incoming to set $MS_a$ has been placed via the secretary's set into group hold, the transistor 138 is made periodically conductive at the HLD BLINK frequency of 7.5 Hz. As explained earlier, when the transistor 138 is periodically conductive, point Y is placed periodically at a very low potential so that current may flow from point Z in FIG. 5 through LED 165. Therefore, that LED emits light pulses at the 15 or 7.5 Hz. rate whenever the secretary's set has a caller to the $MS_a$ set in picked up status or group hold status, respectively. Again with reference to FIG. 5, the photo transistor 168 will therefore be made conductive at that corresponding frequency and the resulting signal at load resistor 169 will be transmitted through OR circuit 130 so as to cause $LED_m$ to flash at the PU BLINK or the HOLD BLINK rate. By this intelligence signaling from the secretary's set to the corresponding set $MS_a$, if the user (Mr. A) returns to this desk, he will be informed immediately by the blinking of his $LED_m$ that the secretary has either picked up an incoming call to him or has placed a call incoming to him in group hold.

COUPLING A DISTINCTIVE RING SIGNAL TO THE ASSOCIATED MEMBER'S SET $MS_a$

As will be explained later with reference to the operation of the microcomputer apparatus in FIG. 3, the user of the secretary's set may either speed dial any member's set $MS_x$ or may transfer a picked up call to that set. In either case, it is desirable that the user of that set (here assumed to be $MS_a$) be apprised of the source of the call, i.e., that it is his secretary who is either calling him through the central system or causing the central system to transfer the call to him. For this purpose, means are provided to indicate uniquely at the member's set $MS_a$ the fact that a call is coming to him due to originating action taken by the secretary.

It will be explained later with reference to operation of the micrcomputer apparatus how the "enable distinctive ring" flip-flop $EDR_a$ may be set or cleared as an incident to the secretary's set either speed dialing a call or transferring a picked up call to the set $MS_a$. Assuming for the moment that the flip-flop $EDR_a$ in FIG. 7 has been set so that its output terminal is at a logic high, then the gate 209 will be enabled so that it passes the signal DRNG and creates the signal ADR. The signal ADR has one second on/one second off timing with a 30 Hz. squarewave frequency during the on intervals. The transistor 152 is therefore rendered conductive with that same timing by the signal ADR. And, as explained previously, whenever the transistor 152 is conductive, the point U is pulled to a low potential. This causes current to flow from point W in FIG. 5 via the LED 170, the conductor AX2, and the diode 171 in FIG. 7. Therefore, LED 170 in FIG. 5 will emit light in accordance with the ADR signal to enable the transistor 174 so that the same signal is applied to one input of the AND gate 176 (FIG. 5). In these circumstances, the 3 KHz. signal is transmitted through OR circuit 126 and amplifier 111 to product a distinctive sound from the speaker 112. Therefore, whenever the secretary is calling one of her members at the set $MS_a$ or transferring a call to him (in a fashion later to be explained) the user at that set will receive an audible sound via his speaker 112 which differs from the "ringing sound" produced as a result of an ordinary incoming ring signal on his tip and ring leads. Indeed, the OR circuit 126 will superimpose the ordinary incoming ring signal sound and distinctive ringing sound; in consequence, when a call placed by the secretary through the central system to the set $MS_a$ produces ordinary ringing, and the flip-flop $EDR_a$ is set to produce distinctive ringing, the user of the set $MS_a$ will hear a 3 KHz. tone pulsed at both 20 and 30 Hz. for two seconds, and then will hear the 3 KHz. tone pulsed at 30 Hz. with 1/1 on-off timing during the intervening four seconds off intervals of the ordinary ring signal. It may be preferred in some applications to limit the duration of the MS distinctive ring to only two seconds so that the mixture of 20 and 30 Hz. tones is of limited duration or does not occur. Although the exemplary apparatus here described does not time limit the distinctive ringing, those skilled in the art will be able readily to provide for the resetting of the $EDR_a$ flip-flop (FIG. 7) when two seconds have elapsed after its being set.

BUF 6 AND ITS CONNECTIONS

The buffer 201, shown in FIG. 7 as a type 4099 addressable latch, is identical in its organization and general operation to BUF 5 described earlier with reference to FIG. 3. As indicated in FIG. 7, however, BUF 6 has its three address lines A3, A2, A1 connected to the bit conductors D2, D1, D0 of the data bus 35—with its "data input" terminal D coupled to the bit conductor D3. The particular output bit addressed is set or cleared according to the level of the bus conductor D3 whenever the "write data" terminal WD receives a logic low signal. This occurs when the output of an AND gate 250 rises to a logic high. As shown, the AND gate has three inputs. The first is the inverted counterpart of the timing signal $\overline{MRW}$, the second is the timing signal TPB and the third is the control signal C7. These signals come from the apparatus of FIG. 3 and are produced in the manner explained previously. The microporcessor 30 may be conditioned to execute a "C7 output routine" by which the data bus conductors D0 through D3 are placed at the proper logic levels to select a particular one of the eight latches in BUF 6, and the conductor D3 is made high or low to set that particular latch to a high or low state. Merely as an example, if it is desired to set the signal $H_b$ to logic 1 level (and thereby to indicate that a call originally incoming to the set $MS_b$ has been placed in group hold), one would make the data bus lines D2, D1, D0 have binary states of 1, 0, 1 with the data bus line D3 being simultaneously high. The execution of a "C7 output routine" will enable the terminal WD in BUF 6 and the high logic level at data bus line D3 will be transferred to the BUF 6 output terminal $Q_5$. It will thus be apparent how BUF 6 may be controlled by output routines from the microcomputer so that the individual ones of its eight output signals are selectively controlled to be set or reset from logic high levels.

PRODUCING A DISTINCTIVE SOUND AT THE SECRETARY'S SET WHEN ANY MEMBER'S SET IS RINGING

Whenever any one of the plural members's sets in a group is ringing, it is desirable that the secretary receive a distinctive audible indication so that she will know that any ordinary incoming call to her set is not involved. As here shown in FIG. 7, such a distinctive indication is created audibly at the secretary's set by apparatus which includes an OR circuit 220 having the four ring signals $RNG_a$ through $RNG_d$ fed to its inputs. That OR circuit feeds an integrator made up of a capacitor 221 rapidly charged through a diode 222 and slowly dischargeable through a resistor 224. Recalling that the ring signals such as $RNG_a$ have two seconds on/four seconds off timing, the integrator converts this to a steady signal on capacitor 221 so long as incoming bursts of ringing continue to arrive with six second spacing. Once those bursts cease, the capacitor discharges and its voltage reverts to a logic low level.

The capacitor 221 is connected to the data input terminal D of a "D type" flip-flop DR. Thus when any one of the four sets $MS_{a-d}$ is ringing, the 15 Hz. squarewave from frequency divider output 200a in arriving at the clock terminals CK of that flip-flop will cause the latter to be set and make the signal SDR switch to a logic high level. The signal SDR is fed as one input to an AND gate 224 which receives at its other input the signal DRING. The output of the gate 24 (called SEC DRING) is connected to the diode 114 in FIG. 4. Recalling that FIG. 4 illustrates the apparatus of both a basic phone BP and a secretary's set SS, the one second on/one second off 30 Hz. distinctive ring signal DRING will be applied through the diode 114 whenever the signal SDR exists in FIG. 7. Thus the secretary will hear at her ringing speaker 112 a distinctive sound indicating to her that one of her members's sets is ringing (as contrasted to her own set ringing by virtue of an incoming call thereto). In the event that she is off-hook, she will still hear the distinctive ring but at a reduced volume due to the analog gate 110 (FIG. 4) being disabled.

SUPPLYING STATUS SIGNALS TO THE MICROCOMPUTER APPARATUS

As shown in the right portion of FIG. 7, apparatus is provided by which status signals may be taken into the microcomputer circuitry in order to indicate which, if any, if the member's sets is ringing and which, if any, of the member's sets is busy. A buffer which serves as an input interface to the microcomputer is formed by two separate integrated circuit units here called BUF 4A and BUF 4B. BUF 4A is constituted by a type 4044B integrated circuit which internally consists of four separate set/reset flip-flops have respective output terminals here labeled $Q_1$ through $Q_4$—all of which are gated out when an enable terminal EN is driven high. The individual set and reset terminals for those flip-flops are so labeled. As shown, the four ring signals $RNG_a$ through $RNG_d$ are applied to the four respective set inputs $S_1$ through $S_4$ and, because any ring signal $RNG_a$, $RNG_b$, etc. will have positive-going wavefronts in it, the corresponding flip-flop will be driven set when any member's phone is in a ringing condition. On the other hand, the four reset terminals are tied in common to the output of an AND gate 260 having inputs labeled CLRR and another input connected to the D7 bit conductor of the data bus 35. The signal CLRR will go high when a "C4 output routine" is executed by the microprocessor 30 (FIG. 3); if the data bus conductor D7 is at that time made high, then all of the flip-flops within BUF 4A will be cleared.

On the other hand, the BUF 4B is formed by a type 4503 integrated circuit which is simply a quad tri-state buffer. Its four inputs are connected to receive the respective signals $BSY_a$, $BSY_b$, $BSY_c$, $BSY_d$. When any or all of those is at a logic level, then the corresponding output terminal will go to a high level when a gating input control terminal A $\underline{A}$ is placed at a logic low level.

The four outputs of the BUF 4B connect directly to the bit conductors D7, D6, D5, D4 of the data bus 35.

The contents of the buffer portions BUF 4A and BUF 4B may be read onto the data bus 35 and taken into the micrcomputer 30 of FIG. 3 by the execution of a "C7 input routine". This is accomplished by an AND gate 261 connected to receive the signals C7 and $\overline{MRD}$ from FIG. 3 and having its output connected directly to the enable terminal EN of BUF 4A. When that latter terminal is placed at a logic high level, the output signals at $Q_1$ through $Q_4$ are gated onto the data bus conductors D0, D1, D2, D3. The output of the gate 261 is labeled P and it is supplied through an inverter 262 to the $\underline{A}$ control terminal of BUF 4B. Thus, when the C7 input routine is executed, BUF 4B is enabled to gate its signals onto the data bus conductors D4, D5, D6, D7. It will become plain from the description that follows how and when the signals $RNG_{a-d}$ and the signals $BSY_{a-d}$ are taken into the microprocessor 30 of the secretary's set for the purpose of determining the status of the individual phones within the group of associated member's sets.

TYPICAL MEMORY LOCATIONS AND CONTENTS

As noted above, the microprocessor 30 in FIG. 3 has associated ROM memory 31 and RAM memory 32, 33. In the practice of the present invention, plural bit binary words (here, each four bits wide) are read successively from memory and converted into a corresponding preestablished combination of sequential dual frequency tones sent out on a phone set's line in response to a single actuation of an auxiliary switch—with the proper timing and pauses between the successive tones as well as appropriate loop breaks to signal hook flshes or reseizures. The operation of the apparatus to accomplish this will be detailed below, after the nature and locations of certain information stored in memory has been treated.

As indicated in Table IV, each of the twelve possible dial signals (corresponding to each of the switches in the standard key pad 15, FIG. 2) may be represented by a different one of twelve four bit codes. The codes for the dial digits 1 to 9 conform to conventional binary numbering; the dial signal value 0 is represented by the binary code for decimal 10; and the * or # dial signals are represented in binary form as decimal values of eleven or twelve. Since the code is four bits wide, a total of sixteen combinations are possible. The 0000 code (equivalent to decimal 0) is used to designate "reseize" (called RS or RSZ); the 1101 code (equal to decimal 13) is used to designate a "hook flash" called HF; the 1110 code (equal to decimal 14) is used to designate a "tandem pause" TP; and the 1111 code (equal to decimal 15) is used to designate "last digit" LD in a sequence.

TYPICAL DIAL DIGIT SEQUENCE MEMORY CONTENTS FOR A BASIC PHONE

The generalized RAM map in Table VI indicates that a portion of address locations, 1000 to 2300, is reserved to contain predetermined sequential combinations of digit codes corresponding to the preestablished dial signal sequences which, upon different occasions, are to be sent out as dual frequency tones on the line of a telephone set. For a BP type phone set, exemplary contents of these stored digits and code groups are tabulated in Table VII—to conform to the exemplary switch assignments shown in FIG. 2 for a BP phone and the dial signal combinations to which the central system 10 responds, as described previously with reference to Table III.

As indicated in Table VII, the RAM memory addresses are divided into fourteen blocks each consisting of six successive address locations, each location containing one byte or eight bits. It is not essential that each block immediately follow the preceding block. But the starting addresses SA2 to SA14 (corresponding to feature switches SW2 to SW14) of the respective blocks are preassigned and known. Prior to "loading" of each block (by manual data input via the key pad 15, in a manner per se known and not detailed here), the six bytes of that block are first loaded with all 1's so that any address location contains the hexidecimal value FF. This means that if any half (four bits) of any byte is left unchanged when digit value codes are subsequently loaded, it will hold the code 1111 and thus contains the "last digit" LD code. When the successive digit codes for a desired dial digit sequence are loaded into the given block, they may be entered into successive halves of successive addresses within that block. Because a dial digit code is four bits wide, each address location may contain two codes. In effect, therefore, if three address bytes are used to store six sequential code words, this is tantamount to six address locations (each four bits wide) which are identifiable by successive address numbers. In the present case, the "first half" and the "second half" are taken successively from each byte (unless the first half of the first byte is skipped).

A specific example with reference to Table VII may be of assistance. When a call is to be placed on coded call hold (by actuation of switch SW2, FIG. 2), the telephone set is to send to the central system the signal sequence HF, 7, 1, d, d, d, d (see Table III). The block of addresses 1000 to 1006 is assigned to contain this "hold" sequence of codes. It is loaded (assuming that the directory number of the telephone set is 5432) such that:

| Address | Contents | | Meaning |
|---------|----------|----------|---------|
|         | First Half Byte | Second Half Byte | |
| 1000 | 1101 | 0111 | HF , 7 |
| 1001 | 0001 | 1110 | 1 , TP |
| 1002 | 0101 | 0010 | 5 , 4 |
| 1003 | 0011 | 0001 | 3 , 2 |
| 1004 | 1111 | 1111 | LD , LD |

The contents of the block starting at SA2 therefore represents a signaling sequence of hook flash, 7, 1, tandem pause, 5, 4, 3, 2 where 5432 is the directory number of the telephone set. Thus, the first block having starting address SA2 as set out in Table VII will be understood to contain six bytes at successive address locations 1000 to 1006, the first four of those bytes or address locations each containing two four bit codes (a total of eight code words) which represent either dial digit values or one of the special operational codes (RS, HF, TP, LD). All bytes subsequent to the last code in a given sequence are filled with a code LD in any given memory block.

As explained below, when the first LD code is detected, the reading of successive codes and the outputting of successive dial digit signals corresponding to the contents of a memory block is terminated. It thus makes no difference whether any given sequence contains only one or as many as thirteen digit codes. The apparatus will simply respond to as many as are stored between the starting address and the first LD code.

As made clear by the foregoing example, each of the memory blocks in Table VII is loaded with codes for a sequential signal combination wich corresponds to one of the respective switches SW2–SW14 as set out in Tables II and III. Thus, the block starting at SA3 (Table VII) holds the digits "72" for setting up the "call forward" feature when switch SW3 is actuated. Certain switches (for example SW3) are to produce different output code sequences under different circumstances. If "call forward" has been enabled, for example, then actuation of switch SW3 is supposed to output a different code, namely, the call forward erase digit combination "73". For this purpose, a second starting address SA3' (address 1008) is predesignated as the starting location for scanning of the codes.

When a given auxiliary switch is actuated under certain circumstances, that requires a leading prefix plus a following sequence of digit signals; under other circumstances, the prefix is to be omitted. Refer to the "retrieve" block in Table VII. If the phone has just gone freshly off-hook, a call on hold may be retrieved by reading the code sequence "87" followed by the directory number digits 5432, and this may be done by initiating the sequential reading of successive codes beginning with the starting address SA13'. but if the phone set has been off-hook, then to retrieve a call on hold, the sequence RS, 8, 7, 5, 4, 3, 2 should be read in order that the central system will treat the set as "no busy" when the retrieve code 87 arrives. This selective inclusion of a leading prefix, or its omission, in a sequence of dial digit codes may be accommodated by the reading of successive digits starting at SA13 (instead of SA13') and causing the first half of the first byte to be skipped, so that the code RS is read, followed immediately by reading the code 8, then the code 7 and so on.

With respect to the speed dialing switches SW15–SW24 in FIG. 2, the RAM memory includes ten respective blocks, each block having thirteen address locations and thus being capable of containing up to twenty-five successive codes plus LD as the last or twenty-sixth code. These blocks appear in Table VII with starting addresses SA15 to SA24, the first two of those blocks and the last one being shown with typical contents. For example, the block starting at SA15 may be loaded with codes for four digits xxxx constituting the directory number for an internal station which is frequently called by the user of the telephone set. As made clear below, when switch SW15 is actuated, the sequential reading of the codes beginning at address SA15 is initiated, so that the pre-stored directory number is speed dialed and sent out as a dial signal sequence to the central system.

On the other hand, the memory block at SA16 is shown in Table VII as containing two decimal codes xx followed by the TP code and this followed by seven more decimal digit codes. This sort of storage into the memory block at SA16 will be employed in those situations where it is desired to first output a two digit access combination (for example, a trunk access code), and then output a conventional seven digit directory number for an outside station. As explained below, when the TP code is read, this causes a "tandem pause" of about 1.2 sec. so that the central system 10 has time to execute the access function before it receives the subsequent dial digits. The contents shown for the memory block beginning at SA24 in Table X are shown by way as example as similar to the contents of the block beginning at SA16. Of course, the specific access code and the specific seven digit code which follows may be different.

From this explanation with reference to Table VII, one may now understand that a whole string of tandem digit groups may be stored within any given one of the memory blocks starting at SA15 through SA24. For example, if the user of a given phone set frequently dials from his United States office a certain station in London, one of the blocks for speed dialing may be set up to contain first a two digit trunk access code followed by a tandem pause, this being followed by an area code plus a foreign exchange directory number, followed by a tandem pause to enable seizure of an overseas line, this being followed by an area code in London, and that being followed by the London directory number of the station to be contacted. A whole sequence of different tandem digit groups, separated where approrpriate with tandem pauses, may thus be prestored within any one or more of the memory blocks shown in Table VII and used for the purpose of speed dialing.

DIFFERENCES IN DIGIT CODE MEMORY FOR AN MS

Table VII makes clear—by way of arbitrarily chosen examples—the contents of memory blocks at address locations 1000 through 2300 in the RAM memory for a basic phone BP. Table VII may also be taken as fully applicable to a typical member's set MS, except that the RAM contents for stored digit code sequences may differ to a small degree in accordance with the differences in assumed switch assignments shown in FIG. 2A compared to FIG. 2. Table VIIA sets out these differences in stored digit code sequences for a type MS phone, and indicates the contents of memory blocks starting at SA5, SA6, SA10 and SA11.

More specifically, for an MS set having its switch SW5 assigned to the "secretary answer" function, the memory block having starting address SA5 (1018) is filled with LD codes. If reading of successive four bit codes in that block is initiated, the first LD code signals will simply terminate that reading sequence.

Table VIIA reflects a digit code group starting at address SA6 for an MS type phone wherein the switch SW6 is assigned to the "call secretary" function. In this case, the actuation of the switch is intended to result in speed dialing of the directory number for the secretary's set SS within a defined group of telephones. Thus, the memory block at SA6 contains four successive digit codes ssss; and if it were assumed that the secretary's internal directory number is 3232, that digit sequence would be stored there.

Table VIIA also indicates that the RAM memory block at SA10 contains the trunk access digits "88"; and that the memory block at SA11 contains the executive override feature digits 79. When the auxiliary switch SW10 or SW11 on a MS phone is actuated, the respective digit sequences will automatically be sent out as dual frequency signals on the two-wire line to the central system.

Other than the foregoing differences, it may be assumed for purposes of discussion that the stored dial digit code sequences in any MS type set are the same as those for a basic phone (as set out in Table VII).

DIFFERENCES IN DIGIT CODE MEMORY FOR A SECRETARY'S SET

The switch assignments for a secretary;3 s set SS (FIG. 2B) are the same as those assumed for purposes of discussion in a type BP set (FIG. 2), excepting that the five switches SW20-SW24 are specifically reserved and assigned for manipulation of calls associated with the MS telephones of a specific telephone group. For the purpose of manipulating member's calls (picking up, placing on group hold, retrieving, transferring and so on) the RAM blocks associated with switches SW20-SW24 are loaded with particular code sequences differing specifically from those described in connection with Table VII. Table VIIB sets out these differences. It shows that the memory blocks starting addresses SA20-SA23 are all generally similar in their contents except that they deal with processing of calls for the members's phones A, B, C, D respectively. There are four starting addresses designated SA20, SA20', SA20'', and SA20'''. The initiation of the reading in this block may be at any one of those starting addresses as a consequence of SW20 being closed. In a fashion to be explained, if a sequential reading begins at SA20, the output sequence will be RS, 6, 6—resulting in a reseizure followed by signaling of the central system digit sequence for causing pickup of call ringing at set $MS_a$. If the reading sequence is initiated at SA20', the output signal sequence will be 6, 6 to effect pickup. If the reading is initiated at SA'', the output sequence will be RS, a, a, a, a—resulting in a reseizure followed by dial digit signals constituting the directory number for set $MA_a$. On the other hand, if reading is initiated at starting address SA20', only the directory number a, a, a, a for a set $MS_a$ will be signaled as a dial digit sequence.

The foregoing applies equally well to those RAM blocks having starting addresses SA21, SA22, SA23 exept that they relate to the member's sets $MS_b$, $MS_c$, $MS_d$. It will be recalled from Table III that the three two digit combinations 67, 68 or 69 are assumed to be those recognized by the central system to effect pickup of the SS call ringing at $MS_b$, $MS_c$ or $MS_d$.

The memory block beginning at SA24 as shown in Table VIIB is associated with the switch SW24 in the secretary's set and assigned to the function of placing a picked up call into group hold status. When switch SA24 is actuated, and reading of this block begins at SA24, the output sequence will be HF, 7, 1, TP—and the tandem pause which results from outputting of the last code will be followed by outputting of the directory number to which the holding call has been tagged, as more fully explained below.

Finally, Table VIIB indicates that still another memory block with a starting address SA25 or SA25' is employed in the SS type phone. As noted below, a call initially ringing at set $MS_a$ which has been picked up and placed in group hold may be retrieved by actuating the swtich SW20 (whose associated $LED_a$ will then exhibit HLD BLK). In consequence, either the code sequences RS, 8, 7 or the sequence 8, 7 will be signaled followed by outputting of the directory number of the set $MS_a$. The stored codes in the block at SA25 assist in this function as described more fully below.

OTHER MISCELLANEOUS CONTENTS OF THE RAM MEMORY

Returning to Table VI, a small quantity of addressable words are reserved to represent the group hold status of the member's sets MS within a group. These group hold status words designated AGH, BGH, CGH, DGH are required only within a type SS phone, and they will be referred to by their indicated addresses when the operation of the secretary's set is explained later. This leaves, as shown in Table VI, a plurality of memory address locations between 2306 and 2400 to be used for changeable data, it being understood that the total number of RAM address locations need not be limited to 2400.

GENERAL DESCRIPTION OF THE ROM CONTENTS

Table V sets out a generalized ROM map. It indicates that the ROM memory is eight bits wide and contains (mrerely by way of example) 999 addressable words. Arbitrarily and by way of example it is assumed that the memory words at addresses 0000 through 0700 constitute main routine instructions for a program which will be described in detail with reference to Tables X and XI taken with FIGS. 9, 10 and 11. Certain differences in the master instructions will be noted for the BP, MS and SS type telephones but as a general matter all such phones follow the same basic iterative sequence of instructions.

Table V further indicates that an "output subroutine" of instructions is contained at memory locations 900 to 950. This routine is entered and executed whenever a preassigned sequence of dial digit codes (as discussed above) are to be converted into the column and row code format (Table IV), signaled at the input of the tone generator 44 (FIG. 3), and thus sent as dual frequency tones outwardly over the phone set's two-wire line to the central system. This output subroutine will be described more fully with reference to Table IX and FIG. 8.

In the conversion of the dial digit codes (set out in Table IV) to the column and row format, a lookup table is stored in the ROM memory at address locations 851 through 862. This table is accessed by the microcomputer 30 of FIG. 3 in the execution of its instructions whenever a digit code (other than RS, HF, TP, LD) is read from the RAM, and it is employed to create the particular combination of signals fed by the microprocessor to the input of the tone generator 44 of FIG. 3.

Finally, Table V indicates that address locations 950 through 999 in ROM may have stored therein various constants which are from time to time read and used in the execution of the master routine.

All of the information in binary form (and much of it representing different instructions within the instruction set of the microprocessor) may be burned into the ROM memory after a particular master program has been formulated. Rather than to designate the contents of the entire ROM memory in machine language which would be understandable only with considerable mental effort, instructions in ROM will be made clear by the following narration of operations carried out in executing the program of instructions, these being set out in "English language" in the listings of Tables IX through XI and the flow charts of FIGS. 8 through 11.

ASSUMED ASSIGNMENTS OF REGISTERS WITHIN THE MICROPROCESSOR

As those skilled in the art will know (and as set out in RCA publication incorporated by reference above), the type CDP 1802 microprocessor of FIG. 3 is one which contains a matrix of sixteen internal registers designated Reg. 0 through Reg. 15. Its accumulator is designated as a register D, and the contents of the accumulator may be fed, by an appropriate instruction, onto the data bus. The instruction set for this particular microprocessor (which is here taken merely as one of choice from the many which may be selected) permit data to be manipulated among the registers through the ALU, and those instructions also permit data to be written into or read from the RAM by sequences carried out in response to a single instruction. Certain registers may be used to apply appropriate address signals to the address bus in the latter operations. Further detailed comment on the organization and operation of the microprocessor is unnecessary, inasmuch as those skilled in the art will be familiar with it (and may make reference to the RCA publication identified above).

It is desirable, however, for the reader to understand particular assignments here arbitrarily given to the various registers within the microprocessor for the purpose of executing the master program which is to be described below. These assignments are set out in Table VIII. It may be mentioned merely as an example that Reg. 11 through Reg. 15 are employed here only as to their least significant bits which constitute a "subsequent switch" flag SS, a "forward control" flag FC, a "call forward" flag CF, a "first half finished" flag FHF, and a "secretary answer" flag SECAN. Further, and by way of example, the register Reg. 8 is assigned to the function of saving the address of the next main program instruction, which is to be executed upon return to the main program after the output subroutine has been entered and finished.

The remainder of Table VIII will become clear as the execution of the master program is explained below.

DESCRIPTION OF PHYSICAL CONDITIONING OF ROM TO HOLD INSTRUCTIONS; FLOW CHARTS AND LISTINGS

The present invention may be practiced with physical apparatus not involving any digital computer nor any master program for such a computer. The way in which hard-wired logic circuitry may be constructed for this purpose will be apparent to those skilled in the art from the teachings of the present disclosure. In the preferred embodiment, however, the microcomputer is employed because of its compact size, low cost, and high speed. The microcomputer is exemplified in FIG. 3 and its associated ROM 31 (or a RAM) is physically conditioned to hold the successive instructions of a master program with one or more subroutines. As a way of describing such physical conditioning of the ROM and the operation of the apparatus here disclosed, a narrative sequence of the operations will now be presented with the aid of the accompanying flow charts and listings. It should be understood that the master program may differ in details and specifics from that which is set out in the flow charts (FIGS. 8-11) and the listings (Tables IX-XII) of the present case. Moreover, for clarity and ease of understanding, those flow charts and listings are couched in "English language" rather than in the hexidecimal language of the instruction set for the particular microprocessor employed. Indeed, some of the program steps to be described may require more than one microprocessor instruction (and more than one word of instruction memory), but this will be readily apparent and the necessary plural instructions may be readily adopted by one skilled in the art who is therefore familiar with the instructions of the CDP 1802 microprocessor.

DIGIT SIGNAL SEQUENCE OUTPUT SUBROUTINE

Whenever a particular sequence of digits, pauses and/or loop breaks is to be outputted to the central system 10, the microcomputer system of FIG. 3 will first "save" an instruction address at which the operations of the main program are to be resumed after completion of an output subroutine. Reg. 3 in the microprocessor will have been set to the particular starting address (SA) in RAM (Table VII) at which the desired particular sequence of dial digit codes is stored. The microcomputer will then jump its program counter to the instruction address 900 to begin execution of the output subroutine now to be described with reference to FIG. 8 and Table IX.

It will be recalled from Table VII that each byte at each RAM address contains dial digit codes representing two such four bit codes in the respective upper and lower four bit halves of the byte. If the first or higher order half of such a byte has already been processed (or is to be ignored), then the "first half finished" flag FHF will have been set in the manner which will become clear as this description proceeds. The FHF flag is constituted by the lower order bit in Reg. 14 (see Table VIII) and when this bit contains a "one", the flag is deemed to be set or on. In the latter event, the digit code in the second half (four lower order bits) of a RAM byte are processed; but if the FHF flag is not set, then the first half (upper four bits) representing a digit code are processed.

Figure 8:
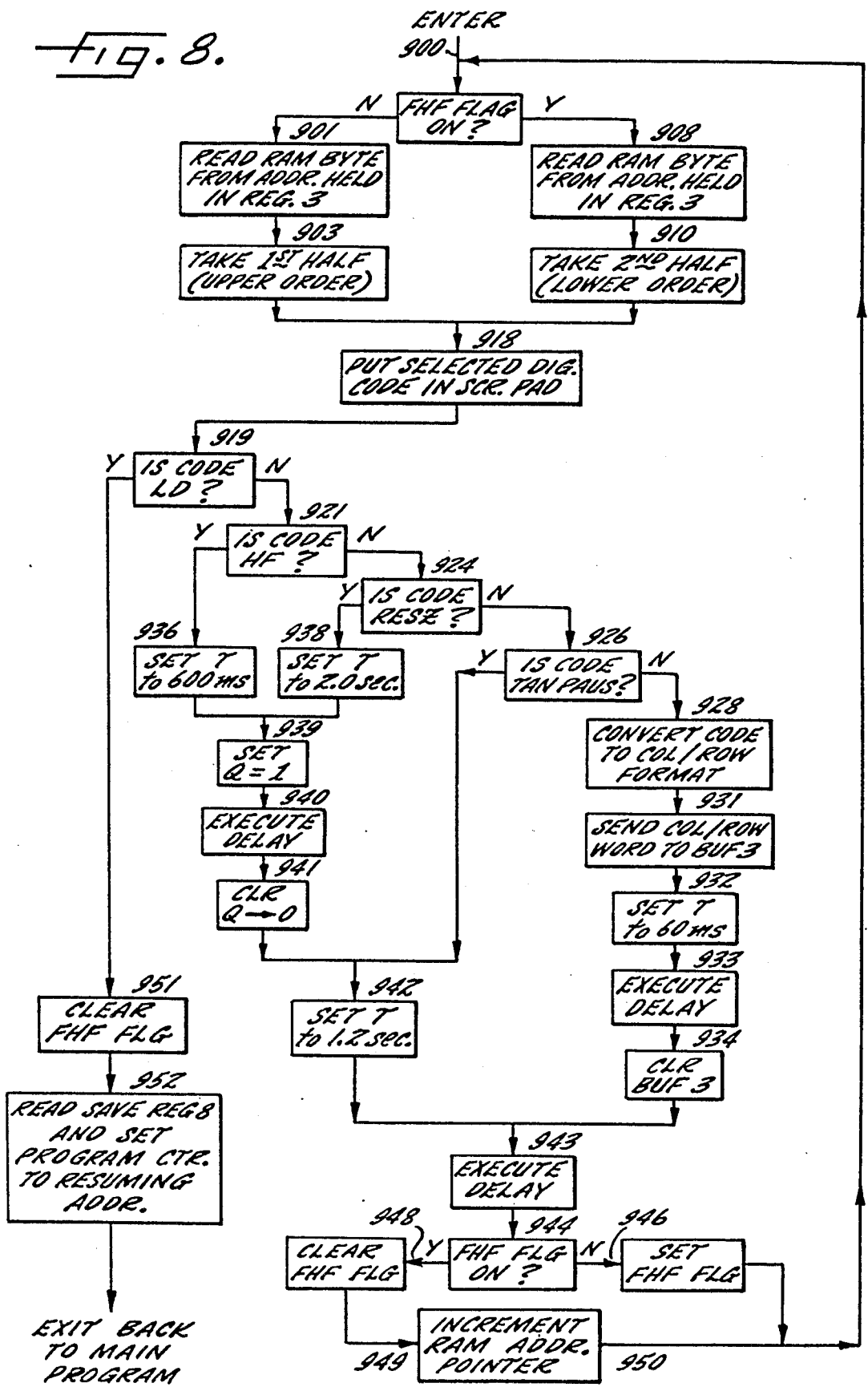
FIG. 8 is a flow chart illustrating the succession of instruction steps carried out according to a subroutine program stored in the memory of FIG. 3 for outputting successive dial digit signals forming a dial digit sequence.

Referring to FIG. 8, the operations represented at 900 through 918 determines whether the upper half or the lower half of a RAM byte containing two digit codes will be processed. In this general procedure, the FHF flag is tested. If it is off or on, then the first half or the second half of a RAM byte (whose address is signaled by the contents of Reg. 3) will be selected and placed in scratch pad register Reg. 6 for further manipulations.

At step 900 (Table IX) the contents of Reg. 14 are read to the microprocessor accumulator (called ACC) and those contents (called D) are tested at step 901. If the accumulator holds other than zero (and FHF is on), the operations jump to step 908; but if the accumulator holds zero (and FHF flag is off), operations proceed to step 902.

On step 902, the two-digit RAM byte (at the starting address signaled by Reg. 3) is brought to the accumulator. Since FHF is off, the accumulator is shifted four places to the right during steps 903-906 so that the four lower order places in the accumulator now contain the first half of the RAM byte. In other words, the second half code is removed in the shifting operation and the first half code is moved to the four lower order places in the accumulator. Thereafter, at step 907 the system jumps to step 918 where the contents of the accumulator are written to a scratch pad register here assigned as Reg. 6. Thus Reg. 6 holds the selected one of the two digit codes contained within one byte which has been pulled from an address in RAM.

On the other hand, if at step 901 the FHF flag is found to be on, the system jumps to step 908 where the RAM contents at the address signaled by Reg. 3 are read to the accumulator. Thereafter on steps 910-913 the accumulator is shifted four places to the left, and on steps 914-917 the accumulator is shifted four places to the right. This results in the second half of the RAM byte being located (as originally) in the four lower order places of the accumulator but with the upper half of that byte being masked or replaced by all binary 0's. Thus, if the FHF flag is on, the second half of the RAM byte is selected for use and ends up in the lower four bits of the accumulator after step 917. Then, on step 918 the accumulator contents are written to scratch pad Reg. 6. Thus, whether step 918 is reached from steps 902-907 or from steps 908-917, the register Reg. 6 ends up containing the selected four bit digit code.

Turning momentarily to Table IV, the first twelve digit codes (corresponding in binary form to decimal values of 1 through 12) are those which correspond to dial digit signals, whereas the last four codes represent reseize, hook flash, tandem pause and last digit. Returning to FIG. 8, four successive tests are performed at the blocks labeled 919, 921, 924, 926 in order to determine if the selected digit code (now in Reg. 6) is one of those which does not represent a dial digit value. If the system finds that none of these "special" codes is in Reg. 6, then beginning at step 928 (FIG. 8) the selected digit code is processed and converted into a dual frequency signal sent out on the two-wire line of the telephone set. In a description which immediately follows, it will be assumed that the selected digit code is in fact one of the first twelve which is listed in Table IV, and the operational sequences will be described with reference to Table IX.

At step 919 in Table IX, the accumulator holds the selected digit code when the constant (decimal 15) corresponding to the LD code is read from ROM subtractively. Then on step 920, if the accumulator contains zero it is known that the selected digit code represents LD, and the system jumps to step 951. But if the accumulator does not contain zero at step 920, the system proceeds to step 921 where the selected digit code is again read from Reg. 6 to the accumulator, and on step 922 the decimal constant 13 (corresponding to the HF code 1101) is read from ROM and subtracted. On step 923, if the accumulator contains zero, it is known that the selected digit code represents HF, and the system will jump to step 936. But if the accumulator contents are not zero, the system proceeds to step 924 to begin a test which determines whether or not the selected code represents reseize RS. Thus, on step 924 the contents of register 6 are brought to the accumulator and on step 925 the accumulator is tested to see if it holds all zeros (the RS code). If the accumulator contents are zero on step 925, the system jumps to step 938; but in the present assumed example, the accumulator contents will not be zero so that the system proceeds to step 926 where the constant 14 (representing the TP code 1110) is brought subtractively to the accumulator (which on step 925 held the selected digit code). On step 927 if the accumulator contents are zero, it is known that the selected code represents TP, and the system jumps to step 942. But if the accumulator contents are not then zero the system proceeds to step 928 to begin operations which, as described below, will result in outputting the current dual tone frequency on the two-wire line of the telephone set.

OUTPUTTING A TONE SIGNAL

Referring back to FIG. 8, at steps 928 et seq., the selected digit code is converted to the column-row format, and on step 931 those signals are supplied to BUF 3 (FIG. 3). Again, it will be recalled from Table IV that any of the twelve dial digit signals for the digits 1-9, 0, *, # is represented in a four bit code which is decimally equivalent, respectively, to values of 1 through 12. The corresponding column and row format codes have been stored in a look-up table (see Table V) which exists at the twelve ROM addresses 851-862. This look-up table is used to obtain the correct column and row code for any given dial digit code. As indicated in Table IX, on step 928 the selected four bit digit code is read from Reg. 6 to the microprocessor accumulator, and on step 929 the constant value 850 is read from ROM and added. On step 930 the resulting sum is written to scratch pad register Reg. 6 whose contents now represent the address of the column-row word in memory which corresponds to the selected digit code. Then, on step 931, the contents of ROM at the address signaled in Reg. 6 are read to the microprocessor data bus as an incident to performance of a "C1 output routine". Merely as an example, if the four bit selected digit code represents the dial digit "3" it will be represented in a four bit code 0011 (Table IV). When this is added to the decimal constant of 850, the sum will be 853, and the memory address at 853 in ROM contains the eight bit column and row code 11000001—which is a representation of the digit value "3" in column and row format (with the highest order place $d_7$ also containing a 1). It will be recalled from the previous description of FIG. 3 that when a "C1 output routine" is executed (mnemonic OUT 1 in the 1802 microprocessor instruction set), the decoder 38 will make the control terminal C1 high and it will enter into the BUF 3 column and row format signals then existing on the data bus. In consequence, BUF 3 will send its column and row output signals through the multiplexer 42 and the tone generator 44 will apply the dual frequency digit-representing signal at its output terminal TN. That signal then passes through the circuitry of FIG. 4 (in the fashion already described) so that it appears on the tip and ring leads of the telephone set and is sent to the central system 10.

The duration of each dual frequency digit signal on the phone line is timed to exist for approximately sixty milliseconds. Referring to Table IX, after step 931 has been executed and the dual frequency signal is existing on the phone set line, then at step 932 a constant 600 (representing sixty milliseconds) is read from ROM and written to Reg. 7 which is employed as a timer by the microprocessor for measuring off a delay. At step 933 microprocessor instructions for a timing loop delay is executed so that no further instructions are performed for a period of sixty milliseconds. At the end of that delay, the microprocessor resumes execution of successive instructions and at step 934 a "C1 output routine", with the data bus signals all 0's is executed to clear BUF 3. This terminates the sending of the dual frequency signal corresponding to the selected digit code.

Next, at step 934, the system jumps to step 943. The timer register Reg. 7 still contains the number 600 and thus is conditioned to execute a delay of sixty milliseconds in response to the "execute delay instruction". At step 943 (Table IX) this instruction is executed so that another delay of sixty milliseconds is measured off—during which no signal is present on the tip and ring leads for the two-wire line of the telephone set. This forms a spacing between the outputting of successive dial digit signals. The next dial digit signal will be sent out at the end of this sixty millisecond time spacing due to iteration of the output subroutine as now to be described.

At step 944 (FIG. 8 and Table IX) the FHF flag is again tested. If that flag is on, it means that the dial digit just sent out has been the second half of a RAM word; if that flag is off, it means that the dial digit just sent out corresponds to the code represented in the first half of a RAM word. In the latter case, the flag is set and the subroutine is iterated to take the second half of the same RAM word. In the former case, the flag is cleared and the RAM address (held in Reg. 3) is incremented so that the next RAM byte will be accessed during the following iteration of the output subroutine.

As indicated in Table IX at step 944, flag FHF is read to the accumulator from Reg. 14 and on step 945 the system jumps to step 948 if the accumulator contents are not zero, indicating that the FHF flag is on. But if the flag is off, the system proceeds to step 947 where the FHF flag is set by writing a one to Reg. 14, and on step 947 the system jumps to step 950 where the program counter is restored to 900 and the subroutine is entered for an iteration. If, however, on step 945, the FHF flag is found on, and a jump is made to step 948, the FHF flag is cleared by writing zero to Reg. 14 and at the following step 949 the RAM address pointer (Reg. 3) is incremented. Then at step 950 the system restores the program counter to 900 so as to begin the next iteration of the subroutine. It may be mentioned, incidentally, that an exit is made from the subroutine only when a last digit code LD is detected.

In the manner described, once the subroutine of FIG. 8 and Table IX has been entered, and so long as the successive digit codes read from RAM represent dial digit signals other than RS, HF, TP or LD, then successive halves of RAM bytes will be read and sixty millisecond long tone signals will be sent via the phone sets two-wire line, with sixty millisecond spacing between each dual tone signal.

DETECTION OF CODE TP, RS OR HF

Let it be assumed, however, that a four bit code selected from RAM represents TP. In this event, then at step 927 (Table IX) the accumulator will hold zero and the system will jump to step 942. As Table IX indicates, at step 942 a time delay constant 12,000 is read from ROM and written into the timer register Reg. 7. From step 942 the system proceeds to step 943 where the delay is executed. The ending portion of the subroutine then proceeds as previously described. Therefore, whenever a TP code is detected, the system at 943 will execute a tandem pause of 1.2 seconds to interpose more than the normal sixty milliseconds between the successive outputting of digit signals. This tandem pause enables an access code to be received and processed by the central system before it receives the next sequence of dial digit signals.

According to one aspect of the present invention, if an auxiliary switch is closed while the telephone set is off-hook and engaged in a connected call conversation, a loop break of duration sufficient to be recognized as a reseizure is automatically created in the telephone set's two wire-line. After that loop break, a predetermined sequence of dial digit signals may be outputted. To accomplish this, the output subroutine includes the test illustrated at block 924 in FIG. 8. If the four bit code pulled from RAM represents RS, then at step 925 the accumulator contents will be zero and the system will jump to step 938. At step 938 (Table IX) the constant 20,000 is read from ROM and written into the timer register Reg. 7. Then, at step 939 the microprocessor flip-flop Q is set and at step 940 a delay is executed which will endure for 2.0 seconds because of the previous setting of the timer register Reg. 7. At the end of the 2.0 second interval, and on step 941 the Q flip-flop wil be cleared and the Q signal restored to zero. As seen in FIG. 3, therefore, the signal Q will go high for 2.0 seconds and the signal $Q_c$ will go low for that period. Thus, the LED (FIG. 4) will be turned off for two seconds and the switching device transistor 60 will be rendered non-conductive for 2.0 seconds. The tip and ring lines will present a high resistance to the central system 10 which the latter will recognize as if the phone set were "on hook". In consequence, any call in existence will be terminated, and the phone set will "reseize" a new register in the central system, just as if it were freshly off-hook, when the 2.0 reseizure interval ends. The present apparatus thus includes means for measuring off a predetermined interval in time (here, 2 seconds), means for creating a control signal (here, Q) during that interval, and means (transistor 60) responsive to the control signal for creating a simulated on-hook condition even though the phone set remains physically off hook. This will occur when any auxiliary switch is actuated which results in reading of the code RS from RAM.

Returning to Table IX, after such a 2.0 second reseizure has been executed, at step 942 a constant 12,000 is written to the timer register Reg. 7 and a delay is executed at step 943. The iteration through the subroutine of FIG. 8 then continues as previously described. The 1.2 second delay constitutes a tandem pause between the two second simulated on-hook condition and the beginning of the digit signal outputting which follows that simulated on-hook condition.

In some instances the detected four bit digit code will represent HF. When this occurs, and as illustrated in FIG. 8, the system jumps from the test at 921 to 936 to set the timer register for a delay of six hundred milliseconds, and then executes steps 939 to the end of the subroutine as previously described. Thus, on step 939 the Q flip-flop is set and on step 940 a delay is executed which will endure for 600 ms. because of the timer register having been set on step 936. The delay at step 940 ends after 600 ms., which is an interval selected to approximate that of a "hook flash". After such 600 milliseconds, the Q flip-flop is cleared at step 941. In the fashion explained above, therefore, the $Q_c$ signal in FIG. 4 will go low for 600 milliseconds, turning off the LED 64 and rendering the main switching transistor 60 non-conductive, whereby the central system sees high resistance presented by the telephone's two-wire line for a period of 600 milliseconds, the central system recognizing this as a hook flash. Thereafter, at step 942, the timer register is set to a constant value corresponding to 1.2 seconds (so as to create a tandem pause) and the remainder of the subroutine is executed in the fashion already treated. Thus, whenever a plurality of digit codes stored at a given starting address in RAM includes an HF code (as, for example, at SA2 in Table VII), the system will respond to the HF code by creating a high resistance condition simulating an on-hook condition for a predetermined interval which will be recognized by the central system as an on-hook, hook flash signal—and despite the fact that the telephone remains off-hook. Each hook flash is followed automatically by a tandem pause because of the program steps at 942 and 943. Thereafter, as successive digit codes within a group are read and processed, a predetermined sequence of digit signals will be output on the two-wire line.

Digressing to FIG. 12, a timing waveform 300 shows the total sequence of signal conditions produced whenever the block of digit codes beginning at SA2 (Table VII) has its eight successive four bit code words read in sequence. The sub-routine of FIG. 8 and Table IX will be entered after Reg. 3 has been sent to the starting address 1000. When the HF code which constitutes the first half of the RAM contents at that address is detected, a loop break occurs for 600 ms. as illustrated at 300a in FIG. 12. This occurs because the timer is set for 600 milliseconds at step 936 (FIG. 8), the signal Q is set to a 1 level, and then a delay is executed at step 940 for 600 milliseconds, after which the signal Q is cleared at step 941. Steps 942 and 943 in FIG. 8 result in the telephone set two-wire line remaining in its quiescent off-hook condition for the subsequent 12000 milliseconds shown at 300b in FIG. 12. Next, when the operation reaches step 944 in FIG. 8, the system will find the first-half flag not on, it will set the flag at step 946, and will return for another iteration beginning at step 900. Because the FHF flag is now set, at step 900 the system will proceed to steps 908 and 910 so as to access the second half or lower four bits of the RAM contents from address 1000. This code represents the digit "7" and when step 928 is reached, that code is converted into column and row format so as to energize the tone generator 44 (FIG. 3). The energization continues for a period of sixty milliseconds because of the timing steps at 932 and 933, followed by clearing of BUF 3 at 934. Thus, a dual frequency tone is set out on the line to represent the digit "7" as illustrated at 300c in FIG. 12. When step 943 in FIG. 8 is reached, the timer register Reg. 7 still contains a constant calling for a sixty millisecond delay, so that a pause interval of sixty milliseconds occurs at 300d in FIG. 12. When the test is made at step 944, it will be found that the FHF flag is set, and so that flag is cleared at step 948 and the address pointer in register 3 will be incremented at step 949. Thus, when the system returns from step 950 to step 900, Reg. 3 will hold a number representing address 1001, and FHF will be cleared. Therefore, as another pass is made through the subroutine of FIG. 8, the selected digit code will represent "1" and this will be converted at step 928 to column and row format so as to be sent out as a tone on the two-wire line. This is depicted at 300e in FIG. 12. The "hold" digit combination 71 is thus outpulsed to the central system. The next four bit digit code at address 1001 (Table VII) is TP, and in the fashion explained, a tandem pause of 1200 milliseconds will be created on the telephone line as depicted at 300f in FIG. 12. Thereafter, as indicated in FIG. 7, the codes for digits 5432 will be retrieved from RAM addresses 1002 and 1003 (Table VII) during successive passes through the subroutine. These will be successively outpulsed as dual frequency tones, each tone existing for sixty milliseconds and being separated from the preceding tone by a space of sixty milliseconds—all as shown on the timing wave 300 of FIG. 12. It may now be understood how the apparatus of the present invention serves to output a dial digit sequence which may include a loop break (either a hook flash or a reseizure) followed by a sequence of dial digit signals with proper time spacing between such signals.

DETECTION OF AN LD CODE

Returning to FIG. 8 and the first test illustrated at block 919, it is determined whether or not the selected four bit code represents LD. Referring to Table VII, if reading of digit codes began at SA2, the LD code will first be seen when the address pointer (Reg. 3) reaches address 1004. If the selected digit code is LD, then the test performed at step 920 (Table IX) will find the accumulator contents zero, and the system will jump to step 951 before exiting from the subroutine. At step 951, the FHF flag is cleared by writing zeros into Reg. 14. Next at step 952 the address saved in Reg. 8 (prior to departure from the main program to the subroutine) is read and written into the accumulator. On step 953 the accumulator contents are written to Reg. 4, i.e., to the program counter, so that the system then resumes its sequence through the main program of operations which is to be described below.

In summary, whenever the signal outputting subroutine of FIG. 8 and Table IX is entered by a jump from the main program, it successively processes the four bit dial signal codes begining at the starting address which has been written into Reg. 3 (called the starting address pointer). In response to each four bit code which is read, the appropriate pause, or loop break, or dial digit signal is produced at the phone set's line. These dial digit codes are processed in sequence by successive passes or loops of the subroutine in FIG. 8. When the first LD code is detected, however, it is known that all of the dial digit codes in a particular sequence have been processed, so the system returns to the main program and resumes its sequential operations specified by ROM contents.

THE PHYSICAL CONTENTS OF THE ROM AND THE MAIN PROGRAM FOR A BASIC PHONE OR MASTER SET—FIGS. 9, 10 AND TABLE X

In the execution of the main program, jumps to the output subroutine will be made at the appropriate points so that a sequence of dial digit codes at a particular starting address are treated. The starting address is determined by which one of the switches SW2–SW24 has been actuated and by conditions in the telephone set which are sensed to determine what operations should be produced. FIGS. 9 and 10 taken with Table X illustrate the master program which is loaded into ROM 31 (FIG. 3) of a basic phone BP. That master program and the operations of that type of telephone may now be described in a narrative sequence.

Referring to FIG. 9, the microprocessor system of FIG. 3 begins its operation whenever power is turned on (i.e., whenever the dc. supply voltage referred to in connection with FIGS. 3 and 4 is first applied). The "power on and initialize" block in FIG. 9 represents the standard steps of clearing all of the various buffers and flip-flops which may exist in the system, and because this is a conventional and well known technique, the circuit connections and apparatus for this function have not been illustrated in the drawings. The turning on of power sets the program counter (Reg. 4) in the microprocessor to its starting address of 0000, and the first few steps appearing at 0 through 7 are there shown as typical initialization procedure by which the Regs. 2, 5 and 10–15 are cleared. Thus, all flags listed in Table I are initially clear when power is turned on. The main program begins really at program step 08 with testing of the signal $\overline{EF1}$. It will be recalled that this signal is low only if the telephone set is off-hook. If the signal is high and the set is on-hook, certain flags are cleared and certain of the indicating LED's are turned off. The system simply loops to continue the testing of the $\overline{EF1}$ signal. On the other hand, if the $\overline{EF1}$ signal is flound to be low, a first test is made to determine if any of the conventional key pad switches has been closed. If so, it is known that manually dialed digit tones are being output on the two-wire line. If not, a test is then made to see if any of the auxiliary switches SW1–SW24 has been closed. Generally speaking, a human cannot actuate a push button switch and then deactuate it in less than about twenty-five milliseconds. Thus any short manual closure of a switch will be detected by the switch tests now to be described.

More specifically, at step 08 in FIG. 9 and Table X, the signal $\overline{EF1}$ is tested by the execution of a "BN1" instruction within the instruction set of the CDP 1802 microprocessor. If that signal is high, the system proceeds to step 09 where the "subsequent switch" flag SS is cleared by writing all zeros into Reg. 11. On steps 10 and 11, a "C6 output routine" (called OUT 6 in the microprocessor instruction set) is executed to set the $Q_5$ output terminal of BUF 5 low, thereby assuring that LED 6 is deenergized. It will be recalled that BUF 5 in FIG. 3 is a bit-addressable latch. This C6 output routine involves placing a byte on the data bus to represent 0000 0101. The $d_7$ bit in that byte is a zero, and the $d_0$ and $d_2$ bits represent the decimal value of five. Therefore, when the C6 signal from decoder 38 goes high, the zero will be written to output $Q_5$ of BUF 5, clearing or leaving cleared that $Q_5$ signal so that LED 6 is turned off (or left turned off).

At steps 12 and 13 a similar C6 output routine is executed to make certain that LED 7 is turned off or left turned off. Similarly, at steps 14 and 15 (Table X) a C6 output routine is executed to be certain that LED 8 is off. It will be recalled from FIG. 2 that LED's 6, 7 and 8 when lighted respectively indicate that the feature for "trunk access", "voice page" or "dictation access" is enabled. And, whenever the telephone set restores to an on-hook condition, these features are terminated, so the corresponding LED's are deenergized.

At steps 16 and 17, the C6 output routine is executed to clear terminal $Q_4$ of BUF 5 and thus to be certain that LED 5 (signaling the "operator recall" function in a BP) is deenergized. Because LED 5 for an MS set (FIG. 2A) is not employed for the operator recall function, the master program for an MS set may contain NOP instructions at steps 16 and 17—as indicated in Table X.

If the test at step 08 shows the signal $\overline{EF1}$ to be low, however, and thus that the set is off-hook, the system jumps to step 19 where test is made to determine if the flag signal $\overline{EF2}$ is low. The signal $\overline{EF2}$ (FIG. 3) will be low if any key pad switch is closed because BUF 2 makes its terminal SR low whenever and so long as any of the twelve keys on the standard key pad 15 is closed. In FIG. 9 and Table X, if any key pad switch is found to be closed, the operations proceed to step 20; otherwise, the program jumps to step 22. In the former case, the SS flag is set by writing the decimal value of "1" to register Reg. 11. The "subsequent switch" flag SS will be on after the first switch is actuated following the telephone set going from on-hook to off-hook (or following the output of a reseize loop break). This flag SS is thus a way of indicating whether the telephone set is freshly off-hook (SS not set) or whether it has been involved in some other operations (SS set), including possibly a call connection, when one of the switches is actuated.

From step 20, the system returns to step 08 by resetting the program counter Reg. 4 to that address number. Thus, the system here described permits manual dialing of successive dial digit signals through the key pad 15 acting via input A of the multiplexer 42 to supply appropriate signals to the tone generator 44. During such a manually dialed operation, the flag SS is set when the first standard key pad switch is closed, and it will redundantly set, as each successive standard key pad switch is actuated.

If, at step 19, the test reveals that no standard key pad switch has been closed, the system jumps to step 22 where the signal $\overline{EF3}$ is tested. $\overline{EF3}$ in FIG. 3 comes from BUF 1 and will reside at a low value whenever any one of the auxiliary switches SW1 through SW24 has been actuated. If the test at step 22 shows $\overline{EF3}$ to be high, indicating that no auxiliary switch has been closed, then the program counter proceeds to step 23 where it is reset to the address 08, and the system returns to the start of the master program. But if at step 22 the signal $\overline{EF3}$ is found low, the system skips to step 24 and executes a C2 input routine for the purpose of transferring the identifying number of the actuated switch from BUF1 to Reg. 5. Table VIII indicates that Reg. 5 (also called register Rs) is used to signal the identity of the "last switch closed". And from FIG. 3, whenever an auxiliary switch is closed, its assigned identifying number is signaled in binary form at the output of the encoder 52 and latched into BUF 1. During execution of a C2 input routine at step 24, the contents of BUF 1 are placed on the D4-D0 conductors of the data bus 35 and taken into the accumulator. Thus, step 24 in FIG. 9 and Table X indicates that Reg. 5 contains the number of the last auxiliary switch closed, and this number will remain there until a different switch is actuated and detected. At the end of step 24 the accumulator still holds the identifying switch number.

Successive tests are performed at blocks labeled (in FIG. 9) with steps 25, 31, 49, 64 and 67 to determine whether or not the last switch closed is that for the function HOLD (SW2), that for the function RETRIEVE (SW13); that for the function RESEIZE (SW14); that for the function of CALL FWD. (SW3); or that for the function of FWD. CONTROL (SW4). If the last switch closed (having its identifying number held in Reg. 5) is none of the foregoing, then the system jumps from the test shown at step 77 in FIG. 9 to program step 90.

DETECTION OF HOLD SW2

At step 25, the constant 2 is read subtractively to the ALU and if on step 26 the accumulator contents is zero, it is known that the last switch closed is that for the "hold" function. Otherwise, the system jumps to step 31. At step 27, Reg. 2 is incremented. The latter register is used as a "hold counter" to signal how many successive calls have been received and placed on hold. Then, at step 28, a C6 output routine is executed (with the conductor $d_7$ of the data bus high) to set the $Q_1$ output terminal of BUF 5, thereby energizing the hold LED 2. It is known now that the user of the phone set has actuated his hold button (SW2); the system will operate to output the appropriate sequence of digit signals to the central system. At step 29 (Table X) a constant 1000 representing starting address SA2 is written into Reg. 3 (the starting address pointer). Thereafter, at step 030, the program counter is reset to jump to step 0205.

Still referring to FIG. 9 and Table X, at step 205, a resuming address (namely, a constant 207) is read from memory and written to the save register, Reg. 8. Then, on step 206 the program counter is jumped to step 900 so that the system exits momentarily to the output subroutine of the FIG. 8 and Table IX. Prior to this entry into the subroutine, pointer Reg. 3 was set (on step 29) to contain a starting address of 1000 (SA2). This starting address is illustrated in Table VII and it contains the sequential codes of HF, 7, 1 TP, 5, 4, 3, 2. Thus, successive passes are made through the output subroutine of FIG. 8 and these corresponding signals are produced on the two-wire line of the phone set, as explained previously with reference to the timing wave 300 in FIG. 12. In consequence, the central system receives first a hook flash, then the hold access digit combination of 71, and then the directory number of the telephone set which is sending those signals, such directory number here being assumed for purposes of discussion as a four digit number 5432.

The user of the phone set may now go back on-hook, or he may actuate his reseize switch (SW14) as a way of telling the central system that he wishes to take some further action without actually depressing his hook switch. If the latter event transpires and the reseize switch is actuated, it is desirable to clear the SS flag so that the system will immediately thereafter know that the system is the same as being freshly off-hook. Thus, at step 207 (following resumption of the main program after the output subroutine has been completed) the "last switch closed" register Reg. 5 is read to the accumulator and on step 208 the constant 14 is read subtractively to the microprocessor ALU. At step 209, if the accumulator contains zero (indicating that SW14 is the "last switch closed"), the system proceeds to step 210 where zero is written into Reg. 11, thereby clearing the SS flag. Then, on step 211, the system skips to step 213. But if at step 209 the accumulator contents are not zero (indicating that the last switch closed is not the reseize switch SW14), then the system jumps to step 212 where the SS flag is set by writing a "1" into Reg. 11. Then, on step 213 the program counter is reset to 0008 so that the system returns to the beginning of the main program. The foregoing therefore makes clear the operational sequences which occur if a given BP phone set is off-hook and the hold switch SW2 is actuated. A hook flash followed by the proper sequence of digit signals is outputted via the two-wire line to the central system so that the latter places the call, previously put up to that set, on hold tagged to the set's directory number (here assumed to be 5432).

DETECTION OF RETRIEVE SW13

Of course, if the test performed at program step 25, 26 does not reveal that the last switch closed is SW2, the system jumps to steps 31 and 32. Here the Reg. 5 contents are read to the accumulator and the constant 13 is read subtractively to the ALU. At step 33 if the accumulator contents D are zero, it is known that the last switch closed is SW13 calling for the retrieving of a call previously placed on hold. If the accumulator contents are not zero, the last switch closed is not SW13, and the system jumps to program step 0049.

In the former case, at steps 34 and 35 the contents of the hold counter (Reg. 2) are tested to see if there is a call waiting on hold. This is done by reading the contents of Reg. 2 to the accumulator and then testing the accumulator contents (called D) to see if they are equal to zero. It they are equal to zero, it means that no call is holding and a retrieve action would be useless, so the system proceeds to step 36 where the program counter is returned to step 08 at the beginning of the main routine. On the other hand, if on step 35 the contents of the hold counter are found to be other than zero, the system skips to step 37 where the hold counter (Reg. 2) is decremented to signify that there is going to be one less call on hold because one of those calls is now in the process of being retrieved.

In the event that the decrementing of the hold counter has reduced its contents to zero, this signifies that the last call on hold is now about to be retrieved so that the hold-indicating LED 2 should be turned off. To accomplish this, on step 38 the contents of the hold counter (Reg. 2) are read to the accumulator and the accumulator contents are tested on step 39. If the contents are zero, the system proceeds to steps 40 and 41 by which a "C6 output routine" is executed to clear the $Q_1$ output terminal of BUF 5 (FIG. 3), thereby turning off the LED 2. But if on step 39 the hold counter contents are found to be other than zero (indicating that there is at least one more call waiting on hold), the system jumps to step 42, bypassing the operation which would otherwise turn off LED 2.

The apparatus next determines whether the telephone set is freshly off-hook (and whether the switch SW13 has been the first one actuated after the set went off-hook), —in which event the sequence of output signals may be conventional retrieve sequence recognizable by the central system. On the other hand, if the user of the phone set has placed a call on hold and then has been talking to another party, he may actuate retrieve switch SW13 without first going on-hook. Such actuation of the retrieve switch in those circumstances should make the central system disconnect the second party and act as if the phone set in question had gone back on-hook. This is accomplished in the present instance by the apparatus producing an artificial loop break of sufficient duration to be recognized as a reseizure, followed by the dial digit values which the central system recognizes as a retrieve instruction.

Referring momentarily to Table VII, the retrieve block of digit codes has two starting addresses labeled SA13 and SA13'. If reading of the four digit codes in these address locations begins at the second half of address 1066, the output sequence will be RS, 8, 7, 5, 4, 3, 2. But if the sequential reading of digit codes begins at address SA13', that output sequence will simply be the digit values of 8, 7, 5, 4, 3, 2. In the latter case there is no reseizure.

To make the system operate correctly in these two sets of circumstances, at step 41 in FIG. 9 and Table X, the SS flag is tested by reading the contents of Reg. 11 to the accumulator. Then on step 43, if the accumulator contains zero, the system jumps to step 0047 where the constant 1067 (SA13') is written to the address pointer, Reg. 3. But if at step 43, the accumulator does not hold zero (meaning that the SS flag is on), the system proceeds to step 44 where the FHF flag in Reg. 14 is set (so that the first half byte at SA13 will be ignored in the output subroutine) and then at step 45 the constant 1066 (SA13 in Table VII) is written to the address pointer Reg. 3. In either case, the system jumps from step 46 or step 48 to step 205 so that the output subroutine is entered. The operations proceed from step 205 through 213 as previously described, but the execution of the output routine in these circumstances will result either in outputting of the combination of signals representing a reseize loop break plus the retrieve access combination of 87, plus the directory number (5432) of the set to which the call on-hold was tagged in the central system. On the other hand, if the reseize code is not needed because the retrieving set is freshly off-hook, then the output subroutine begins at starting address SA13' (Table VII) and only the retrieve combination 87 followed by the directory number is signaled to the central system.

These operations are depicted by timing diagrams 301 and 302 in FIG. 12. In the first case, the processing of the code RS in the output subroutine result in a loop break of 2.0 seconds, indicated at 301a. This is followed by a tandem pause at 301b for a duration of 1.2 seconds after which the digits 87 are output sequentially. Thereafter, the digits 5432 follow in sequence, the tone for each existing for 60 ms. spacing with 60 ms. between successive tones. The timing diagram at 302, however, indicates, that because the SS flag was not set (indicating that the phone set is freshly off-hook prior to actuation of the retrieve switch SW13), then reading of digit codes begins at SA13' and the resulting sequence of signals is simply the retrieve combination 87 followed by the four directory number digits. The present invention thus makes it possible for the user of the basic phone BP to retrieve a call at the end of a second call conversation simply by hitting his reseize switch SW13 and without first depressing his hook switch. This flows from the fact that the transistor 60 in FIG. 4 is controlled to make the two-wire line present a high resistance, even though the phone set remains physically off-hook, by the signal Q being made high for a period of 2.0 seconds.

DETECTION OF RESEIZE SW14

Returning to step 33 in Table X, if the last switch closed (and whose identifying number is signaled in Reg. 5) is not SW13, then the system jumps to step 0049. At steps 49, 50, 51 a test is made to determine if the "last switch closed" is SW14 and thus is calling for a reseizure. If not, the system jumps from step 51 to step 64; if so, the system proceeds to step 52 where the SS flag is tested by reading the contents of Reg. 11. On step 53, if the accumulator D holds zero, it is known that no switch prior to the reseize switch has been operated since the telephone set has gone freshly off-hook. Therefore, no reseizure is necessary. Thus, the system at step 54 simply returns to the starting step 08 to begin a new iteration. On the other hand, if at step 53 the SS flag is found to be on, the system skips to steps 55 through 66 which are the same as steps 10-17. This results in LED's 5, 6, 7 and 8 all being turned off (if any were turned on) because the reseizure which is about to occur is tantamount to the phone set going on-hook. That turning off of LED 5 illustrated in Table IX, does not occur for an MS set, because that LED 5 and SW5 are assigned to a different function which does not require that action.

The system thus reaches program step 62 where the starting address 1072 (SA14) is written to the address pointer REG. 3. This is the starting address for "reseize" combination of digit codes, (Table VII) which consists simply of a single code RS followed by LD codes. Then, at step 63, the program counter is jumped to address 205 to depart from the main program and enter the output subroutine. Upon exiting the subroutine, the system returns to perform steps 207-213, ending up again at the starting point 08. In the execution of that subroutine, there will be a loop break of 2.0 seconds created by setting the transistor 60 (FIG. 4) to its non-conductive state.

In review, the user of the BP set may be talking with another party and desire simply to terminate the call. He need not place his hand set back on-hook. He need only momentarily press his reseize switch (SW14) and wait until he hears a dial tone. Thereafter he may manually dial another number into his key pad 15, or he may press another auxiliary switch to speed dial some other directory number or to access some other function.

DETECTION OF CALL FWD SW3

Reverting to program step 51, if the "last switch closed" is not SW14, the system will jump to step 0064. By steps 64 through 66, a test is made to determine if the last switch closed is SW3, calling for enablement (or erasure) of the call forward feature. If SW3 is the last switch closed, then on step 66, the accumulator contents D will be zero, and the system will proceed to step 67; otherwise, the system will jump to step 0077. In the former case, a test is made to determine if the call forward flag (held in Reg. 13, Table VIII) is on. This is done by reading the contents of register 13 into the accumulator and testing for zero at step 68. If the accumulator holds zero, the system jumps to step 073; otherwise, it proceeds to step 069. These two cases exist (i) if the call forward switch SW3 has not previously been actuated and LED 3 is off, or (ii) if the call forward switch SW3 has been previously executed and the call forward LED 3 is on. At step 69, a "C6 output routine" is executed to make the terminal $Q_2$ of BUF 5 (FIG. 3) high and then at step 070 a "1" is written to Reg. 13 to set the CF flag. Thus, the LED 3 is turned on.

Next, at step 71, the constant 1006 (which is SA3) is written to the address pointer Reg. 3—and at step 72 the system jumps to step 205. Thereupon the output subroutine is accessed and the system proceeds to output the combination of digit signals shown in Table VII as "72" beginning at SA3. When the output subroutine is completed, the system returns to step 207 and thereafter returns to start an iteration at step 08.

On the other hand, if the basic phone BP has previously set up a "call forward status" and is off-hook when SW3 is again actuated, then the operations will jump from step 68 to step 73. In this case, a "C6 output routine" wil be executed to restore terminal $Q_2$ of BUF 5 to a zero level, thereby turning off LED 3 inasmuch as the call forward status is about to be erased. At step 74, Reg. 13 is cleared to turn off the CF flag. At step 75 the constant 1008 (SA3') is written to the address pointer, Reg. 3. Then, at step 76 the operations jump to step 205 where the output subroutine is entered and the digits "73" are signaled on the two-wire line of the phone set so as to cause the central system to cancel the call forward status.

DETECTION OF FWD CTR SW4

Reverting again to step 66, if the accumulator then does not contain zero, it is known that the last switch closed is not the switch SW3 associated with the call forward function. Thus, the system jumps to step 77 as illustrated in FIG. 9 where the last switch closed is tested to see if it is SW4 associated with the "forward control" function. This test involves reading $R_5$ (Reg. 5) to the accumulator on step 77 and subtractively reading in the constant 4 on step 78. If the contents of the accumulator on step 79 are zero, the system proceeds to step 80 because the last switch closed is SW4. Otherwise, the system jumps to step 90.

In the former case, at step 80 the system reads the contents of Reg. 12 to the accumulator. On step 81 if the accumulator contents D are zero, it is known the FC flag is not on the system proceeds to step 82; otherwise, the system jumps to step 87. In the former case, it is known that the forward control feature has not been enabled previously and that the actuation of switch SW4 is to create that status. Therefore at step 82, a C6 output routine is executed to to set the $Q_5$ terminal of BUF 5 high, thereby turning on LED 4 to indicate that the "forward control" function is in effect. Next, on step 83 the FC flag is set by writing "1" to Reg. 12, and on step 84, the constant 1012 (SA4) is written to the address pointer Reg. 3. At step 85 the system jumps to step 205 so as to enter the output subroutine of FIG. 8 with the initial address being SA4 (Table VII). Therefore, the digit combination "74" will be sent out on the two-wire line of the phone set and this will be recognized by the central system to set up the "forward control" access. Once this is done the user of the set need only manually dial in (or speed dial) the four digit directory number which is to be rung in the event that the "forward control" action is needed. In any event, after entering the subroutine at step 205 (FIG. 9) the system returns from that subroutine and goes through steps 207 through 213 to arrive back at the beginning address 08. Another iteration of the main program is thus initiated.

On the other hand, if during step 81 the SC flag is found to be set, it is known that the actuation of switch SW4 is to cause cancellation or erasure of the "forward control" status. The system will therefore jump from step 81 to step 86 to perform a "C6 output routine" by which the $Q_3$ terminal of BUF 5 in FIG. 3 is cleared to a logic low level, thereby turning off LED 4. Next, on step 87, the FC flag is cleared by writing all zero's to Reg. 12; and on step 88 the constant 1014 (SA4') is written to the address pointer Reg. 3. At step 89 the system jumps to step 205 and enters the output subroutine of FIG. 8 beginning at the starting address 1014 (Table VII) so that the two digit combination "75" is sent in the form of two successive dual frequency tones to the central system. The central system responds by cancelling the "forward control status". When the output subroutine is completed, the apparatus returns to program step 207 and proceeds from there to begin another iteration at the initiating step 08.

DETECTING SW5, 6, 7 or 8

Reverting again to step 79, if the accumulator does not contain zero, it is known that none of the four switches for the functions of hold, retrieve, reseize, call forward or forward control has been actuated and thus the "last switch closed" number held in $R_5$ (Reg. 5) must represent some switch other than SW2, SW13, SW14, SW3 or SW4. As indicated in FIG. 9 and Table X, the system will jump in these circumstances from step 79 to step 90 in order to test and determine if any of the other switches associated with LED's has been actuated. LED's 5, 6, 7 and 8 are related to functions which require each to be turned on whenever its associated switch is actuated and to be turned off whenever the phone set goes back on-hook (or outputs a reseize loop break). Thus, at step 90 in Table X the "last switch closed" number is read from Reg. 5 to the accumulator; and on step 91, the constant five is read in subtractively to the ALU. On step 92, if the accumulator contents D are zero, it is known that SW5 has been closed and that LED 5 should be turned on. The system proceeds to step 93 where it jumps to step 97 and executes a "C6 output routine" so as to make terminal $Q_4$ of BUF 5 high and turn on LED 5. But if at step 92 the accumulator contents are not zero, the system jumps to step 100 where a test is made to determine if the "last switch closed" is SW6. If so, then the execution of steps 100 through 103 result in turning on of LED 6 in a manner which will now be understood from the foregoing examples. If not, the system jumps to step 105 and tests for closure of the switch SW7, turning on the LED 7 if switch SW7 has been actuated. If that switch has not been actuated, the system jumps from step 107 to 110 to test for the actuation of switch SW8. If the latter switch has been closed, LED 8 is turned on; but if SW8 has not been closed, the system jumps to step 114. In the foregoing fashion, LED 5, 6, 7 or 8 is turned on if the corresponding switch has been found closed.

DETECTING ANY OF SWITCHES SW5–12 OR 15–24

In the multiple operations beginning at step 114 (FIG. 9) the switches SW20–24 are tested and if any is found closed, the address pointer is set to the corresponding SA. When any SA is so set, the operation jumps to step 205 so outputting of digit signals begins. But if none of SW20–24 is detected, operations continue at steps 140 et seq. for switches 5–12 and 15–19. Recalling that the accumulator receives the "last switch" number on step 114, the system proceeds through step 115 with no operation to reach step 116 where the constant 20 is read subtractively. If the accumulator contains zero at step 117 it is known that the last switch closed is SW20. SW20 is associated with a stored group of digit codes for speed dialing a directory or an outside number. The system will proceed to step 118 if SW20 has been actuated; otherwise it jumps to step 120 in order to test for the closure of SW21. At step 118 (in the event that SW20's closure has been detected) the starting address 1145 (SA20 as shown in Table VII) is written to the address pointer Reg. 3, and then on step 119 the system jumps to step 205 where the output subroutine is entered. Thus, if switch SW20 has been closed in a BP or MS phone, the output subroutine will be entered at step 119 to start the reading of stored digit codes at starting address SA20, and a sequence of dial digit signals will be sent out over the two-wire line to the central system 10.

Table X shows the same sorts of operations for testing switches SW21, SW22, SW23 and SW24. If any of these switches is found to have been actuated (because its identifying number is located in Reg. 5), the output subroutine is executed to output the correct series of dial digit signals. See, for example, timing wave 308 in FIG. 12 which represents a typical speed dialed combination of signals sent out when SW24 is actuated and in consequence of starting RAM reading at SA24 in Table VII.

But as each switch is found not to have been closed as instructions 116 to 139 are executed, then the next switch is tested. This same procedure is thereafter followed beginning at steps 140 et seq. for the switches SW5–SW12 and SW15–SW19. As steps 116 through 202 are executed, only one switch will be found actuated, but that will result in the setting of the address pointer to the proper starting address followed by entry of the system (at step 205) into the output subroutine so that the correct sequence of dial digit signals is sent to the central system. If the system reaches step 202 and finds that the accumulator contents D are not zero, it means that none of the switches SW2-SW24 has been found to have been closed, even though such a closure was detected at program step 22. This means that Reg. 5 is holding an invalid "last switch closed" number, and thus on step 203 the system will simply return to the initiation step 08. But if on step 202 the accumulator contents are zero, the system jumps to step 204 where the constant 1132 (SA19) is written to register 3. Thereafter, the system proceeds to step 205 and enters the output subroutine. Therefore, when any of the switches other than SW2, SW13, SW14, SW3, SW4 is found to have been closed, the system ultimately ends up at step 205 to first write the saving address 207 into Reg. 8 and then jumps to the subroutine at step 900.

MODIFICATIONS FOR AN MS TYPE PHONE

Again referring to FIGS. 2 and 2A, an MS type phone has the "secretary answer" and the "call secretary" functions assigned to its switches SW5 and SW6. This difference is one of arbitrary choice here shown for purposes of explanation. The "secretary answer" function is one which requires the outputting of no signals to the central system, as has been noted in connection with FIGS. 4–7 above. The "secretary answer" LED 5 in the MS type phone, therefore, is one which is to be turned on when SW5 is actuated a first time and which is to be turned off when it is actuated a second time. In view of this difference, program steps 16 and 17 (Table X) are stored simply as "no operations". Further, program steps 60 and 61 (which are the same as program steps 16 and 17) are stored simply as "no operations" in an MS type phone. The operations illustrated in FIG. 9 between points P1 and P2 and between points P1' and P2' are not performed in an MS phone, whereas they are performed in a BP phone.

Still further, however, the LED 5 associated with the secretary answer function in an MS phone should be turned on or off whenever the switch SW5 is actuated to create or terminate the SEC-AN signal (FIGS. 5 and 6). Thus, that part of the flow chart between points P5 and P6 in FIG. 9 for a basic phone BP is replaced by the fragmentary flow chart shown in FIG. 10 for any MS type phone. This means that at steps 93 and 94 in Table X for an MS, the SEC-AN flag is tested by reading the contents of Reg. 15 to the accumulator. If, on step 94, the accumulator contents D are not zero, the flag is "on" and the system proceeds to turn off LED 5 (step 95) and then clear the SECAN flag by writing zero to Reg. 15 (step 96). Via steps 96a to step 99 and then to 08, a new iteration is begun since no dial signals need to be outputted. But if at step 94, the SECAN flag is found "off" the system jumps to step 97 to perform a "C6 output routine" which sets terminal $Q_4$ of BUF 5 (FIG. 3) so that LED 5 (see FIG. 6) is turned "on", and the control signal SEC-AN is set to a logic 1 level. By step 98, the SECAN flag is set and on step 99 there is a jump to step 08 to start a new iteration. Therefore, if the secretary answering function has been enabled by previous actuation of SW5 in an MS phone, a given closure of that switch will cancel or erase the secretary answer status and turn off LED 5.

At step 98, there is no operation for the basic set BP, but for the MS set the SEC-AN flag is set by writing a one to Reg. 15. This means that when switch SW5 is next actuated, it will find the SEC-AN flag is a set condition. At step 99 in the MS phone, and because the switch SW5 has been detected as closing, no digit signals are to be supplied to the telephone line. Therefore, the microcomputer system returns to step 08 and begins a new iteration. This is unlike the basic phone where at step 99 when the closure of SW5 has been detected, the system jumps to step 0114. Finally (as shown in FIG. 10) if at step 92 the accumulator contents D are not zero, it is known that SW5 has not been actuated. Accordingly, the system jumps to step 100 and proceeds from there identically in the fashion described for a BP set.

When the switch SW6 is actuated in an MS phone, the outputting of digit signals begins with reading at SA6 in Table VIIA. Thus, the SS directory number $\overline{ssss}$ is speed dialed to initiate a call through the control system to the secretary. For the reasons explained, LED 6 is thus turned on (incidentally, it will later turn off when the MS goes on-hook or reseizes) and therefore the signal CALL SEC in FIG. 6 and FIG. 5 will appear. This means that a 30 Hz. signal is sent via AX2 to the SS and the $LED_a$ there will distinctly blink (while SS is ringing and so long as Mr. A talks with her after she answers). She is thus informed to answer that call with priority attention.

BRIEF REVIEW OF THE OPERATION OF THE BP AND MS TYPE PHONES

Looking back at FIG. 9 and Table X, once digit codes have been stored at various starting addresses in RAM as depicted by Tables VII and VIIA, the master program held in the ROM 31 (FIG. 3) of a BP or MS phone causes an iterative repetition of the sequential steps which detect whether the phone is on or off-hook and which detect closure of any of the switches in the key pad 15 or any of the auxiliary switches SW2 through SW24. Nothing happens if any such switch is actuated when the hand piece is on-hook. If the hand piece is off-hook, however, then the key pad 15 may be employed for standard manual outputting of dial digit signals via the tone generator 44 to the central system 10. Although it is not disclosed or claimed here, such manual actuation of the standard key pad may be "remembered" so that the same sequence of dial signals can be automatically reproduced to carry out the "last number dialed" function. When the BP or MS phone is off-hook and any of the auxiliary switches SW2-SW24 is actuated, the microcomputer will "catch" this by detecting that the input flag signal $\overline{EF3}$ has reverted to a logic low level. Thereupon, the identifying number of that particular switch is written into a "last switch register" $R_s$ (here designated as Reg. 5) in the microprocessor 30. Thereafter, this identifying number is tested and depending upon the function assigned to the switch, a proper sequence of operations is carried out to create a corresponding combination sequential of signals on the two-wire line of the phone.

That sequence may be simply (in the case of TRANSFER, SW12) turning off transistor 60 in FIG. 4 in order to create a loop break for a predetermined interval (600 ms) which will be recognized by the central system as a "hook flash". This is illustrated by timing diagram 309 (FIG. 12) and may be followed by manual dialing of the transferee directory number.

In certain other cases, (e.g., for switches SW15–24) the output routine is entered with a starting address SA which results in speed dialing of a sequence of numerical dial digit values sent over the two-wire line in the form of dual frequency tones. Each digit is represented by its tone enduring for sixty milliseconds, and the individual tones are separated by intervals of sixty milliseconds. As illustrated by timing diagram 308 in FIG. 12, the speed-dialed sequence may include two digits "33" for trunk access followed by a tandem pause and then seven digits for an outside number. A greater number of digit groups, each separated by a tandem pause may be produced where successive accesses may be required (as in dialing overseas).

The LED's associated with switch SW2–SW8 are controlled so that they properly turn on and off. LED 2 is turned on whenever the hold switch SW2 is actuated; a hook flash followed by the hold access number and the set's directory number (timing diagram 300, FIG. 12) are automatically outputted. LED 2 is then turned off when the retrieve switch SW13 is next actuated providing that the last call on hold is being retrieved. LED 3 is turned on when Call Forward is enabled by actuation of switch SW3. This results in automatic sending of the digit combination "72", as represented by a timing diagram 306 in FIG. 12. LED 3 is turned off when the same switch SW3 is actuated a second time (and the combination "73" is outputted). LED 4 to signal Forward Control is similarly controlled by first and second actuations of the switch SW4.

When the reseize switch SW14 is actuated, this is treated as if the set had physically gone on-hook, so that LED's 6–8 (and LED 5 in the case of a BP set) are turned off prior to the outputting of the simulated two second on-hook signal at the tip and ring leads of the phone. But if the reseize code is read as the first code in a series (see SA13 in Table VII), the LED's 5–8 are not turned off since some cal action immediately follows the reseize operation.

Finally, and as an example which may be practiced in other functions, the arrangement here disclosed senses whether the switch whose actuation has been detected is the first switch since the set has gone off-hook or is a "subsequent switch". In the latter case, the SS flag is set. That SS flag signal is used—especially in the case of the retrieve function here described—to determine whether a retrieving sequence of signals should be outputted which is or is not preceded by a simulated reseizure loop break. This is done as illustrated in FIG. 9 at steps 42 et seq. by testing the SS flag and where it is found on, then the starting address SA13 is accessed so that a reseize signal is simulated (timing wave 301, FIG. 12). In contrast, when the SS flag is not on at the time the reseize switch SW14 is hit, the starting address accessed by the output subroutine is SA13' so that only the necessary sequence of numerical signals (timing wave 302) is outputted because the central system 10 is then viewing the set as freshly off-hook.

DIFFERENCES IN THE MASTER PROGRAM FOR THE SECRETARY'S SET, ESPECIALLY AS ASSOCIATED WITH THE MS-RELATED SWITCHES SW20–SW24 AND LED$_{A-D}$

The digital codes stored at the several starting addresses for an SS type phone are here assumed to be the same as those (Table VII) for a BP type, except as shown in Table VIIB. In RAM address blocks starting at SA20, SA21, SA22, SA23, digit code combinations are stored which can be accessed in the execution of the output subroutine already described. Taking the block at SA20 as an example, there are actually four starting addresses SA20 (1145), SA20' (1146), SA20" (1147), and SA20''' (1148). If the reading of successive four digit codes is started at the second half of SA20, the sequence of codes is RS, 6, 6, after which the LD code is detected in the first half of address location 1147 so the sequence ends. The two digit combination 66 is assumed to be that which the central system will recognize for effecting pick-up at SS of a call ringing at the MS$_a$ set. Thus, if reading is started at SA20, the output signals call for a reseizure plus the pick-up combination of digits. By contrast, if reading is started at SA20', the sequence of codes is simply 6, 6—involving no reseizure but the combination for pick-up of a call incoming to the set MS$_a$. If reading is started at SA20" (second half), the code sequence is RS, a, a, a, a. The four a's represent the known directory number for the member's set M$_a$. On the other hand, if reading is started at SA20''', the sequence is simply a, a, a, a.

The master program of an SS type phone is the same as that already described with reference to FIG. 9 and Table X except for specific differences now to be noted. First, in Table X, the steps 0115–0139 are not used in the master program of the SS type phone. Rather, at step 115, there is a jump to step 230 which is the beginning of a supplemental program section employed especially for the SS type phone. This is indicated in FIG. 9 by the dashed line at points P7 and P8. A flow chart for the SS master program below these two points appears in FIG. 11 and it ends via steps 140–213 or steps 205–213 which appear in FIG. 10 but are reproduced in FIG. 11 for the sake of completeness.

Figure 11A:
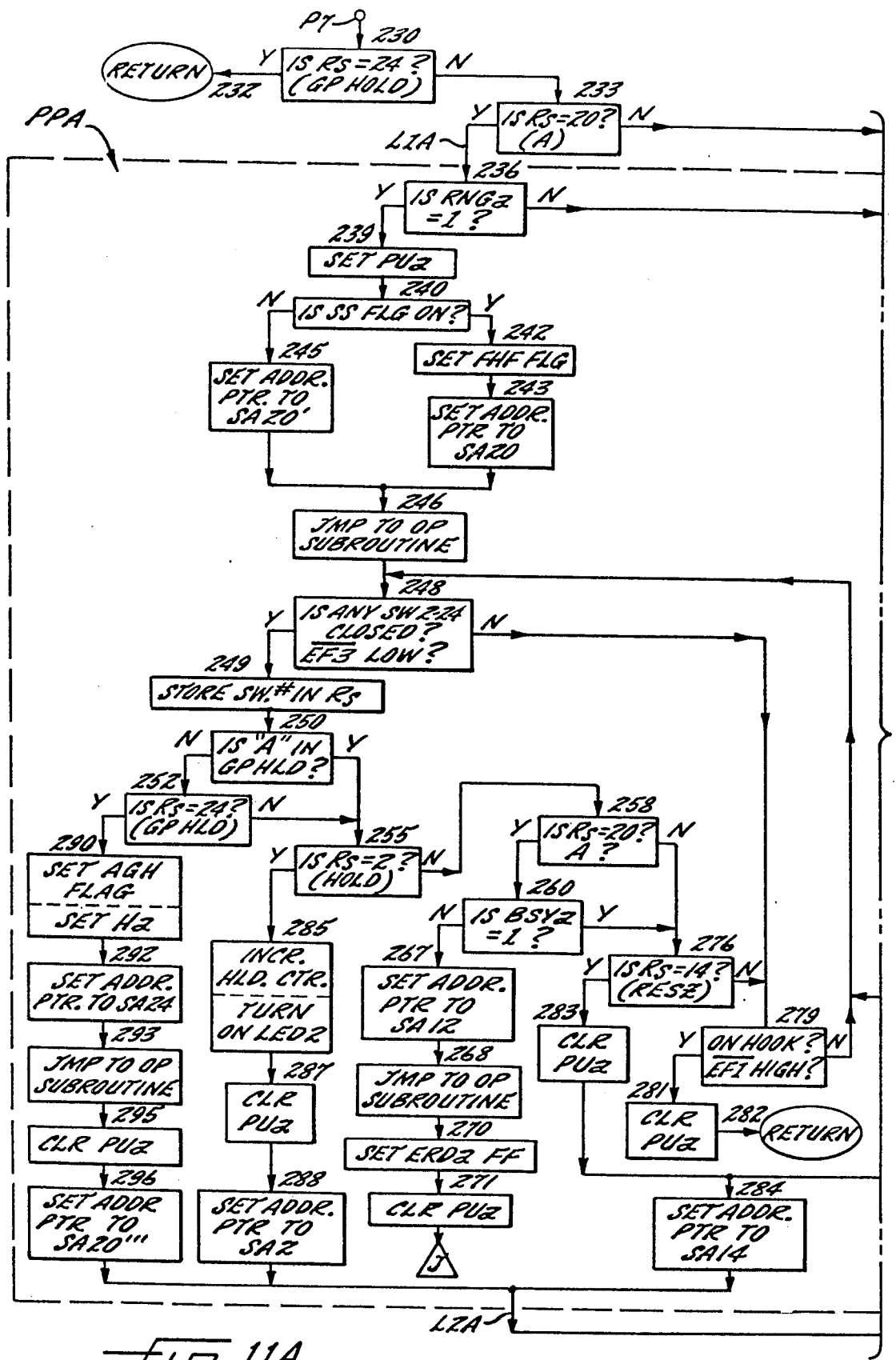
Figure 11B:
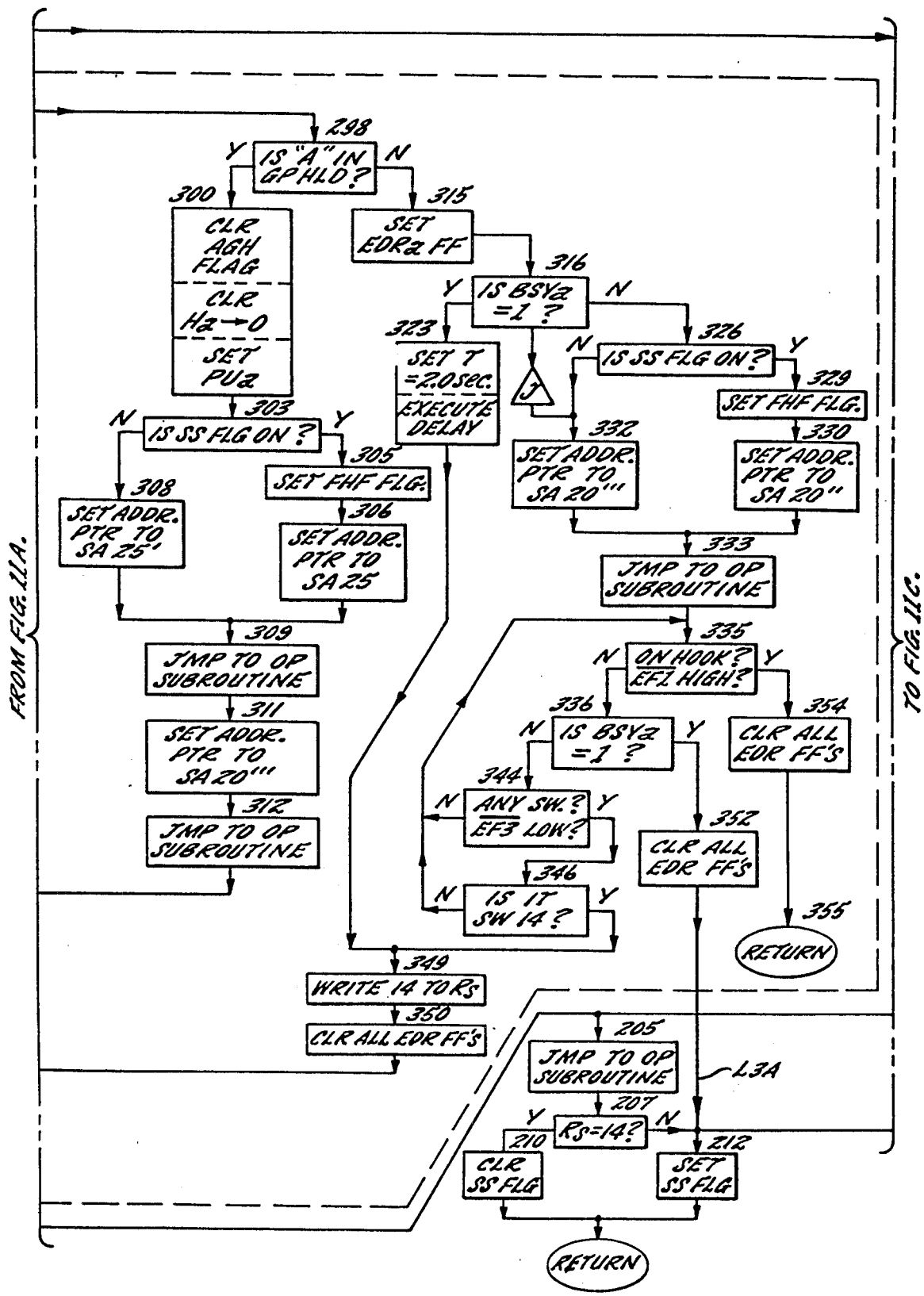

An English language listing of the operations depicted in the flow chart of FIG. 11 appears in Table XI. Thus, it may be considered that an SS type phone follows the operational program steps of FIG. 9 and Table X down to points P7 or P8; and the remainder of the SS program may now be made clear by the following narrative sequence taken with reference to FIG. 11 and Table XI.

It will be recalled that the closure of one of the switches SW2–SW24 is detected at step 22 in FIG. 9 and the identifying number for that switch is stored in register R$_s$ (Reg. 5) during step 24. If the operations of FIG. 9 detect that the closed switch is SW2, SW13, SW14, SW3 or SW4, then the flow of operations proceeds through point P8 to reach step 205, ending up with a return from step 213 for another iteration. In FIG. 11, point P8 is shown as a part of the supplemental flow chart but it leads directly to step 205 and thence to step 213 in the same fashion as already illustrated by FIG. 9. Thus, if it is detected that one of the switches SW2, SW13, SW14, SW3, SW4 has been closed in an SS type phone, the operations and the outputting of dial digit signals occur in precisely the same fashion as already described for the BP type phone set.

By contrast, and with reference to FIG. 9, if none of the switches enumerated in the preceding paragraph is detected as having been closed, FIG. 9 indicates that the operations proceed via point P5 to point P6. In the secretary's set SS, program steps 116–139 are never executed, and operations jump from step 115 to point P7 as it appears in FIG. 9. From this point, one next looks at point P7 in FIG. 11 to understand the master program operations for an SS type set. The flow chart of FIG. 11 is to be read with reference to Table XI. It is to be remembered that at step 114 in FIG. 9 and Table X, the accumulator is conditioned to hold the "last switch closed". Then, on step 115 a jump is made to step 230 which appears in FIG. 11 and Table XI.

At step 230 in FIG. 11 a test is made to determine if the "last switch closed" was SW24 (calling for placing a picked up call into group hold). If so, the system returns to step 08 to begin an iteration of the entire main program because the group hold switch is ineffective, and its closure produces no result, if the secretary has actuated that switch when she does not have a call picked up. But if at step 231, the test shows that the actuated switch is not SW24, the system skips to step 233.

At steps 233, 360, 462 and 563 a succession of tests are made in order to determine whether the "last switch closed" is SW20 (for Mr. A), SW21 (for Mr. B), SW22 (for Mr. C) or SW23 (for Mr. D). The first such test is performed (in the fashion explained above and now readily understood) by bringing the last switch identifying number from Reg. 5 to the accumulator, subtracting the constant 20, and then determining whether the accumulator contents are zero or other than zero (Table XI, steps 233-235). If switch SW20 is not the "last switch" the system jumps to steps 360-362 where a similar test is made for Mr. B's (SW21). If that turns out not to be the case, the apparatus jumps to steps 462-464 where a similar test is made for Mr. C's switch (SW22). If that turns out not to be the case the system jumps to steps 563-565 where still another similar test is made for Mr. D's switch (SW23). And if that turns out not to be the case, the system restores the program counter to step 140. At this point in the progress through the entire master program, it is known that the "last switch closed" must be one of switches SW5 through SW12 or SW15 through SW19. These switches have functions in the SS type phone identical to those of the same switches in a BP type phone. And when the system reverts to program step 140, the pass through the master program is completed in the fashion already described with reference to FIG. 9 and Table X.

If it should turn out, however, that one of the group interaction switches associated with phones A, B, C, D is detected as the "last switch closed", then the program execution enters into program portion PPA, PPB, PPC or PPD respectively as illustrated in FIG. 11. That is, an affirmative response at step 235, step 362, step 464 or step 565 results in entry into those respective program portions. The latter three program portions are illustrated in the flow chart of FIG. 11 as dashed line rectangular blocks because they are essentially identical to the program portion PPA illustrated in some detail by the flow chart—except for the fact that they relate to the member's sets $MS_b$, $MS_c$, $MS_d$ whereas program portion PPA is associated with the member's set $MS_a$. It will suffice, therefore, to understand the organization and operation of the program portion PPA associated with the set $MS_a$; those skilled in the art will understand how essentially the same operations apply for the remaining member's sets. It need only be understood that in program portion PPB, for example, signals such as $PU_b$, $H_b$, $RNG_b$, BGH would be used in counterpart operations to those shown in PPA and involving $PU_a$, $H_a$, $RNG_a$, AGH, respectively. Program portion PPA is entered via flow line L1A in FIG. 11 and is departed via line L2A or L3A. The same is true of program portions PPB, PPC and PPD but with respect to corresponding flow lines L1B, L2B, L3B; L1C, L2C, L3C; and L1D, L2D, L3D.

With the foregoing as an introduction, let is be assumed that the "last switch closed" in the SS phone is detected to have been SW20 (assigned to the set $MS_a$). This means that at step 235 in FIG. 11 and Table XI, the contents D of the accumulator will be found equal to zero and thus the system proceeds to step 236. At this point the set $MS_a$ may be in one of several conditions. For example, it may be ringing in response to an incoming call; and in that case, the signal $RNG_a$ (FIG. 7) will be alternately high for two seconds and low for four seconds and the flip-flop associated with output terminal $Q_1$ in BUF 4A will be in a set state. Alternatively, the secretary may have picked up a call originally incoming to $MS_a$ and thereafter placed it in group hold; in this case (for reasons to become apparent), the signal $H_a$ in FIG. 7 will have been placed at a logic high level, and the AGH status flag (Table VI) will be set. Finally, if the set $MS_a$ is not ringing and has not had one of its calls placed in group hold by action of the secretary, the set $MS_a$ may be either busy (off-hook) or not busy (on-hook). In the former case, the signal $BSY_a$ in FIG. 7 will reside at a logic high level. Thus, when BUF 4B is enabled, the signal on data bus conductor D4 will go high if the set $MS_a$ is off-hook and busy. These respective conditions are tested by the program operations illustrated in FIG. 11 by rectangles labeled 236, 289 and 316. The operations which result in each of these cases may now be considered somewhat in more detail.

PICKING UP A CALL RINGING AT $MS_a$

When an incoming call is ringing at $MS_a$, the SS will sound a distinctive ring because the DR flip-flop (FIG. 7) will be set. Also, LEDa will be flashing with 2-on/4-off timing, so the secretary knows the call is incoming to Mr. A rather than Mr. B, C or D.

In order to determine whether or not the signal $RNG_a$ has set the $Q_1$ stage in BUF 4A, program step 236 in FIG. 11 and Table XI involves a "C7 input routine" by which signals are taken onto the data bus from BUF 4A-B in FIG. 7. This means that the $RNG_a$ signal is sent into the bit place $b_0$ of the accumulator. Then, on step 237 (Table XI) the accumulator contents are shifted right one place (this is accomplished by an instruction called SHR for the 1802 microprocessor shown in FIG. 3) whereupon the signal in the least significant bit place of the accumulator is shifted to the carry/borrow flag flip-flop called DF in the 1802 microprocessor. Then, on step 238 the contents of DF are tested (by a short branch instruction designated BNF for the 1802 microprocessor). If DF is found to be zero, the system jumps to step 298 because the $RNG_a$ signal has been found to be a logic low. But if the DF contents at step 238 are found to be a logic one, the system proceeds to step 239. It is now known that the set $MS_a$ is ringing (the SS is distinctively ringing since SDR is high) and that switch SW20 has been actuated so that it is desired to have the secretary's set pick up Mr. A's incoming call by switching in the central system. The central system must be commanded to do that by the dial digit combination "66".

Because the call will be picked up, the signal $PU_a$ in FIG. 7 is placed at a logic one level thereby enabling the gate 204 so that LEDa will flash at the 15 Hz PU BLK rate. On step 239 in Table XI, eight bits representing a constant of decimal 8 in the four lower order places are read onto the data bus as an incident to execution of a "C7 output routine". This causes the BUF 6 latch in FIG. 7 to place its Q₀ output terminal and the signal PU$_a$ a logic high level. LEDa is now in the PU BLK mode, and the LEDm at MS$_a$ is PU BLINKING. The signal PU$_a$ disables gate 218 to the 2/4 alternation of signal RNG$_a$ ends, and flip-flop DR then resets to end the distinctive ringing which was occurring at the secretary's set.

Next, beginning at step 240, a test is made of the SS flag. The contents of Reg. 11 are read to the accumulator and on step 241 the accumulator contents D are tested. If the SS flag is on set, the system proceeds to step 242; if it is off, the system jumps to step 245. At step 242, the constant "1" is written to Reg. 14 to set the FHF flag because it is now known that when the secretary actuated SW20 she was not freshly off-hook. On the contrary, it is known that a sequence of digit codes will now be read starting at RAM address SA20 (Table VIIB) so that a reseize loop break will be signaled. Under these circumstances, it is necessary that the output subroutine be entered with the FHF flag set so that the second half of the byte at starting address 1145 will be used in the initial pass through the subroutine, followed by use of the first byte at the succeeding address 1146. Thus, step 242 is performed to set the FHF flag. At step 243, the constant 1145 (SA20) is written to the starting address pointer (Reg. 3), and at step 244 the program skips to step 246.

If it was found that the SS flag was not set when the test at step 241 was made, it is known that the secretary was freshly off-hook and that when she pressed switch SW20 it was the first switch actuated. Accordingly, the system jumps to step 245 where the constant 1146 (SA20') is written to the starting address pointer. Thus, whether the system reaches step 246 by skipping from step 244 or progressing from step 245, the starting address pointer (Reg. 3) has been set to the proper starting address number.

As step 246, the resumption address (to which the system is restored after execution of the output subroutine) is written to the saving register Reg. 8, and at step 247 the program counter is jumped to step 900 so that the output subroutine of FIG. 8 is entered. In the fashion already described, the output subroutine will be executed by successively reading four bit code words until the first LD code is detected. Accordingly, if the secretary had been engaged in another call when she pressed SW20, there will be a loop break of 2.0 seconds resulting from reading of the RS code followed by outputting of the dial digit combination "66". By contrast, if the secretary was freshly off-hook, only the dial digit combination 66 will be sent to the central system 10. In the former case it is not necessary for the secretary to manually depress her hook switch in order to terminate an active call and output to the central system the pickup code 66.

SWITCH ACTUATION TO EXIT FROM PICKED UP STATUS

Now, the caller who was ringing at set MS$_a$ is connected to the secretary's set and her LEDa is energized at the PU blinking rate so that she knows that she is engaged in a converation with a caller picked up from Mr. A's phone. When the output subroutine is completed (as previously described) and the system returns to step 248 in Table XI, there are only certain actions which can result in terminating that picked up status. First, if the secretary presses her group hold switch SW24, the picked up caller will be placed in group hold tagged to Mr. A's directory number. But if a previous incoming call to set MS$_a$ has already been placed on group hold, then actuation of the switch SW24 will have no effect because group holding of a picked up call to a given member's set will only accommodate (in the present embodiment) one such call in group hold status. Secondly, if the secretary pushes her own hold switch (SW2) she may place the picked up caller on hold tagged to her own set. Thirdly, the secretary may terminate her conversation with the picked up caller (i) by actuating her reseize switch (SW14) or (ii) by returning on-hook. And finally, if the secretary actuates her A switch while a caller to set MS$_a$ is in a picked up status, she can effect automatic transferring of that caller back to Mr. A's line. These several alternatives are illustrated in the left portion of the FIG. 11 flow chart and each may now be considered in somewhat more detail with reference to Table XI.

With a caller to MS$_a$ having been picked up at the secretary's set SS, then at step 248 the $\overline{EF3}$ flag is tested to see if any of the switches SW2-24 has been closed. If that signal $\overline{EF3}$ is high, it is known that none of those switches has been actuated so the system jumps to step 279 where the $\overline{EF1}$ signal is examined to determine if the secretary's set has gone on-hook. If so, the signal $\overline{EF1}$ will be high and the connection to the picked up caller will be terminated. If not, then the system proceeds to step 280 so as to reset the program counter and loop back to step 248.

If, however, at step 279 the secretary's set is found to be on-hook, the system proceeds to step 281 where the signal PU$_a$ (FIG. 7) is cleared to terminate the PU blinking by the LEDa. This operation at program step 281 involves executing a "C7 output routine" with the data bus conductors carrying all zero's, whereby the Q₀ output terminal of BUF 6 (FIG. 7) is cleared. Thus the PU$_a$ signal reverts to a logic low, the gate 204 is disabled, and the pickup blinking of LEDa (and of LEDm in MS$_a$) is terminated.

Reverting back to step 248, the test of the signal $\overline{EF3}$ may find it low, whereupon the system proceeds to step 249. Here the identifying number for the particular switch closed will be transferred from BUF 1 (FIG. 3) to the "last switch closed" register Reg. 5. This is done on step 249 by executing a "C2 input routine" by which the contents of BUF 1 are read onto the data bus and transferred into Reg. 5.

Next, at step 250 the AGP HLD status word is tested to determine if a previous call to MS$_a$ has already been placed into group hold. For this purpose, the status word (Table VI) at address 2301 is brought into the accumulator. On step 251 if the accumulator contents are not zero, it is known that there is a previous call already in group hold tagged to the MS$_a$ set, so the system jumps to step 255. But if on step 251 the accumulator contents are zero, the system proceeds to step 252 and makes the test to determine whether or not the particular switch last closed was the group hold switch (SW24). This is done by reading the contents of Reg. 5 to the accumulator and on step 252, and then on step 253 reading the constant 24 in a subtracting operation. On step 254, if the accumulator contents are zero it is known that SW24 has been actuated and the system will jump to 290. Otherwise, the system proceeds to step 255. At steps 255-257, a test is made to determine if the hold switch (SW2) of the secretary's set has been actuated. If so, the system jumps to step 285; and if not, the system proceeds to step 258.

At steps 258-259a a similar test is made to determine if the last switch closed was switch SW20 assigned to set MS$_a$. If so, the system proceeds to step 260, and if not, the system jumps to step 276-278 where a test is performed to determine if the last switch closed was the reseize switch (SW14). If so, the system jumps to step 283; if not, the system proceeds to step 279 where the on-hook test (already described) is performed.

Therefore, once a call incoming to the set MS$_a$ has been picked up at the secretary's set, and the secretary is talking to the caller, her set will remain in that status unless and until she actuates group hold (SW24), her own hold switch (SW2), her switch SW20 assigned to MS$_a$, her reseize switch (SW14), or she returns on-hook. Each of these possible manners in which a picked up call may be terminated or otherwise treated will not be discussed individually.

Let it be assumed that at steps 250, 251 it is found that the set MS$_a$ does not have a previous call in group hold and waiting. And let it be assumed that at steps 252-254 it is found that the switch SW24 has been the last one closed. The system therefore jumps to step 290 where the constant "1" is written to the memory address 2301 to set the AGH status flag. This is done because it is known that a picked up call is about to be placed into group hold status.

Then at step 291, the signal H$_a$ in FIG. VII is placed at a logic high in order to make the LEDa begin flashing at the hold blink rate. This is done by executing a "C7 output routine" which addresses the Q$_4$ output terminal in BUF 6 of FIG. 7. The D3 conductor in the data bus 35 is made high so that the Q$_4$ output terminal of BUF 6 is set to logic high and the H$_a$ signal enables gate 205 to permit the 7.5 Hz. HLD BLK signal to excite LEDa. Thus, the secretary is immediately apprised that she has placed a call picked up from set MS$_a$ into group hold status.

Next, at step 292 the constant 1197 (SA24) is written into the starting address pointer Reg. 3 as a prelude to outputting a sequence of dial digit signals which will cause the central system 10 to place the picked up caller in group hold tagged to the directory number of MS$_a$. At step 293, the constant 295 is written into the saving register Reg. 8 so that this program step will be the reentry point after performance of the output subroutine has been completed. And, on step 294, the program counter is jumped to step 900 so that the output subroutine of FIG. 8 is entered. With reference to Table VIIB, the successive passes through the output subroutine will result in the signaling of a hook flash followed by the digits 7, 1 and these followed by a tandem pause of 1.2 seconds. Thus, the necessary recognition signals are sent to the central system as a prefix for the group hold function, these signals being HF, 7, 1, TP. When the HF code is detected in the output subroutine, this causes the transistor 60 in FIG. 4 to go to its high resistance condition for a time interval of 600 m.s. And, when the LD code at address 1119 (Table VIIB) is reached, the output subroutine is completed and the system will restore to the main program instruction at step 295 (the latter number now being held in Reg. 8).

At step 295, in the main program of Table XI, a "C7 output routine" is executed to clear the signal PU$_a$ in FIG. 7. Since the details of that operation are the same as those described with respect to step 281, they need not be repeated here. Because the status of the set MS$_a$ is being changed from pickup to group hold, this terminates the pickup blinking by LEDa and by LEDm in MS$_a$; those LED's now flash at the HLD BLK rate.

At step 296, the starting address 1148 (SA20′′′) is written into the address pointer, Reg. 3. This conditions the system for another jump to the output subroutine which is executed when step 297 causes the system to jump the program counter to step 205. At step 205 (see Table X) the constant 207 is written to Reg. 8 and at step 206 the program counter is jumped to 900 so that the output subroutine is entered. Recalling that the starting address pointer (Reg. 3) has been set to 1148, the digit codes a, a, a, a beginning at that address in Table VIIB are successively signaled as tones sent to the central system. Thus, the central system has received a hook flash, a prefix 71 for holding and a four digit directory number tagging MS$_a$ as phone set to which the call is to be held.

This sequence of output signals is illustrated by the timing wave 302 in FIG. 12. The loop break at 302a is produced by the transistor 60 of FIG. 4 being made non-conductive for 600 milliseconds in response to the reading of the HF code which appears at SA24 in Table VIIB. This is followed by a 1.2 second tandem pause 302b created automatically by program steps 942 and 943 in FIG. 8. During the next two iterations of the output subroutine of FIG. 8, tones representing the digits 7 and 1 are sent out as illustrated as 302c and 302d in FIG. 12. Next, the output subroutine responds to the code TP appearing at address 1198 in Table VIIB to produce a 1.2 second pause 302e shown in FIG. 12. Thereafter, the system returns to the main program but sets the starting address pointer at step 296 and jumps to the output subroutine again at step 205 so that the four digits a, a, a, a are output successively as indicated in the timing wave 302 in FIG. 12. All of this has happened after the secretary has picked up a call incoming to Mr. A and has thereafter actuated a single switch SW24 (whose LEDa was PU BLINKING) to place that call in group hold.

When operations have proceeded from step 290 through step 296 to step 205 as illustrated in FIG. 11, then the remainder of the steps 207-213 are performed and there is a return to the initial step 08 (FIG. 9) to begin another main iteration.

Returning now to FIG. 11 and Table XI, let it be assumed that the test performed at step 248 reveals the fact that one of the switches SW2-SW24 has been closed and that the test performed at steps 252-254 has revealed that the particular switch so closed is not the group hold switch SW24. Let it be assumed further that the test performed at steps 255-257 indicates that the secretary's hold switch (SW2) has been closed. In these circumstances, the system will jump from step 257 to step 285 where Reg. 2 will be incremented. The latter register is the hold counter, and since a picked up call is about to be put on hold tagged to the secretary's set, the hold counter is incremented in the fashion described previously with reference to step 27 in FIG. 9. Then at step 286 in Table XI, an operation is performed to turn on LED 2 so that the secretary will know that she has a call on hold to her set. This involves performing a "C6 output routine" whereby the Q$_1$ terminal of BUF 5 (FIG. 3) is set high. Next, at step 287 the signal PUa in FIG. 7 is cleared by the execution of a "C7 output routine" in the manner previously described with reference to step 281. This disables the gate 204 so that the PU BLK status of LEDa (and of LEDm in MS$_a$) is terminated inasmuch as the secretary is converting the call from a picked up to hold status. Thereafter, at step 288 the constant 1000 (SA2) is written to the starting address pointer, Reg. 3. And, on step 289, the program counter is reset to step 205 so that an output subroutine begins to send out the signals corresponding to the digit codes beginning at SA2 in Table VII.

The outputting of these codes has been described previously, and the central system will respond to the dial digit signals in order to place the caller (who was picked up from A's phone) in hold tagged to the secretary's set. When the output subroutine has been completed, the system will return to step 207 and proceed to step 213 in the fashion already described to begin another iteration of the main program. Thus, the secretary has terminated a picked up call status for Mr. A by placing the caller on hold to her set.

Let it be assumed next that the test performed at steps 255-257 does not indicate that the last switch closed was SW2, but the test performed at steps 258-259$a$ indicates that the last switch was SW20, i.e., the switch assigned to process calls to set MS$_a$. LEDa associated with that switch is now energized at the PU blink rate because a call coming to MS$_a$ has been picked up. The system thus proceeds from step 259$a$ to step 260 where a test is made to determine whether Mr. A's set is busy.

This involves the execution of a "C7 input routine" by which the contents of BUF 4A and 4B are read into the accumulator. If Mr. A's set is off-hook and busy, the signal BSYa in FIG. 7 will be high, and the data bus conductor D4 will be high when this input routine is performed. Thus the bit place b$_4$ in the accumulator will be high. At steps 261-265, the contents of the accumulator are shifted right five times so that the carry-borrow flag DF is now set or cleared according to the logic level of the signal BSYa. At step 267, the contents of DF are tested. If they are not zero, the picked up call cannot be transferred back to Mr. A's line (which is busy) and the system thus jumps to step 276. But if they are zero, it is known that Mr. A's line is not busy so the system proceeds to step 267.

Operations are now begun to transfer the picked up call back to Mr. A. At step 267 the constant 1060 (SA12) is written into the starting address pointer (Reg. 3); at step 268 the constant 270 as a resuming address is written to the saving register, Reg. 8; and at step 269 the program counter is jumped to step 900 to enter the output subroutine. From Table VII, one sees that the digit codes beginning at SA12 are constituted by the single code HF (plus LD's). Therefore, one pass through the output subroutine will be made and the transistor 60 of FIG. 4 will be non-conductive for a period of 600 milliseconds. See timing wave 309 in FIG. 12. Then the following code LD will be detected, and operations will return from the output subroutine to main program step 270 in Table XI.

Next, since a call picked up by the secretary is to be transferred back to MS$_a$, distinctive ringing at Mr. A's phone is initiated. For this purpose, on step 270, a "C4 output routine" is performed which will set the flip-flop EDRa (FIG. 7). This involves making the four lower order data bus conductors have signals corresponding to 0001 so that the data input terminal for the EDRa flip-flop is high, and then causing the C4 terminal to go high so that this data is clocked into that flip-flop, making the latter's output high. Accordingly, the gate 209 in FIG. 7 is enabled and the one second on/one second off 30 Hz. distinctive ring signal ADR is fed to the base of transistor 152. As previously described, this results in the signal ADR being coupled over the conductor AX2 and via the LED 170 (FIG. 5) to the audio amplifier 111 and the loud speaker 112 in the set MS$_a$. Therefore Mr. A immediately begins hearing the distinctive ringing.

Further, at step 271 (Table XI) a "C7 output routine" is executed to clear the signal PUa in FIG. 7 by making terminal Q$_0$ of BUF 6 low. This operation has been previously described and need not be repeated here. It stops the pickup blinking of LEDa since the secretary is terminating the status in which a caller to A had been picked up.

Thereafter at step 272, the program counter (Reg. 4) is jumped to step 332 and from that point the directory number of set MS$_a$ wil be outputted to the central system in a fashion later to be described. It is to be recalled that steps 267 and 268 have caused a hook flash to be sent to the central system before these directory digits are signaled, and thus the central system 10 will recognize this sequence as a conventional transfer. It will take the picked up call from the secretary's phone and transfer it to Mr. A's phone, assuming that Mr. A answers when his phone rings.

Next, let it be assumed that step 276 is reached either (i) because none of the switches-SW24, SW2 or SW20 has been found closed, or (ii) because the signal BSY$_a$ has been found high at step 260. Let it be assumed further that at steps 276-278 the reseize switch (SW14) is found closed. In these circumstances, the system will jump from step 278 to step 283 where the PUa signal will be cleared to terminate the pickup blinking by LEDa and LEDm. Thereafter, at step 284 the starting address pointer Reg. 3 will be set to SA14 (1072 in Table VII) and the system will proceed via flow line L2A to step 205. As described above, therefore, a reseize loop break of 2.0 seconds will be placed artificially on the two-wire line when the output subroutine is executed following step 205. When that output subroutine is completed, then at step 207-209, it will be found that the last switch closed was SW14, so that the SS flag will be cleared on step 210. Thus, reseize clears the SS flag the same as if the secretary's set had been restored to an on-hook condition. She has terminated the call picked up from MS$_a$ by hitting her reseize switch (SW14). The system then returns for another iteration beginning at step 08.

The operations involved in picking up a call to MS$_a$ and then, in one way or another, ending that picked up status have now been treated with respect to program steps 236 through 296 in FIG. 11 and Table XI.

RETRIEVING A CALL FROM GRP. HOLD BY PRESSING SW20

Next, let it be assumed that when Mr. A's switch (SW20) is pressed, his set is not at that time ringing. The system will therefore jump from step 238 to step 298 and a test will be made to determine if there is a caller on group hold tagged to Mr. A's phone. It will be recalled from the description of step 290 that the status word AGH was set previously if a caller has so placed on group hold. At step 298, therefore, the AGH status word is read from memory address 2301 (Table VI) to the accumulator. At step 299 if the accumulator contents D are zero, it is known that a caller is not in group hold tagged to MSA, so the system jumps to step 315. But assuming that a caller is on group hold, then the system proceeds to step 300 to begin the operations by which the caller is retrieved to the secretary's set and placed back in picked up status.

Since the group hold status is to be terminated, the operation at step 300 clears the AGH status word at memory location 2301. Next, at step 301, the signal $H_a$ in FIG. 7 is cleared to terminate the hold blinking of the LEDa, and this is done by executing a "C7 output routine" which addresses the $Q_4$ bit in BUF 6 and clears it.

Thereafter, at step 302 a "C7 output routine" is performed to set the $Q_0$ bit of BUF 6 high and thereby start PU BLK of the LEDa since the caller is going to be restored to a picked up status.

Next, at step 303 the SS flag is tested. This is done by reading the contents of Reg. 11 to the accumulator and at step 304 if the accumulator contains zero, the system jumps to step 308; otherwise it proceeds to step 305. At step 305, the FHF flag in Reg. 14 is set because it is known that digit codes in RAM will be outputted beginning with the second half of the contents at SA25 (Table VIIB). Then, on step 306 the constant 2210 (SA25) is written to the starting address pointer, conditioning the system to output (from the SA25 block in Table VIIB) successive signals corresponding to RS, 8, 7. At step 307, the system skips to step 309.

By contrast, if on step 304 it is found that the SS flag is off, the system will jump to step 308 at which the constant 2211 (SA25' in Table VIIB) is written to the starting address pointer. Thus, the operations arrive at step 309 with the starting address pointer having been set to SA25 or SA25' depending upon whether the secretary's set is not or is freshly off-hook.

At step 309 the restoration address 311 is written to the saving register Reg. 8, and on step 310 the program counter is jumped to enter the output subroutine. From Table VIIB it will be apparent that either the combination of RS, 8, 7 or simply the combination of 8, 7 is signaled to the central system 10. A reseizure is first created for 2.0 seconds by the transistor 60 in FIG. 4 if the secretary's set is not freshly off-hook at the instant when the closure of the switch SW20 occurs with a caller being in group hold tagged to that set.

Thus, the retrieve combination of digits "87" is sent to the central system when the secretary actuates SW20 in order to retrieve a caller who has been previously placed in group hold. Thereafter, operations return from the output subroutine to step 311 in Table XI and the constant 1148 (SA20''') is written to the starting address pointing register, Reg. 3. By steps 312 and 313 the program counter is again jumped to enter the output subroutine so that the directory number a̲, a̲, a̲, a̲ for the set MS$_a$ is outputted to the central system. Because the original caller has been placed in group hold tagged to Mr. A's directory number, the central system will now reconnect the holding caller to the secretary's set. She will be able to begin talking with that caller and he will be considered as a caller picked up after he attempted to dial Mr. A.

At the conclusion of the output subroutine which began at step 312, the system is restored to main program step 314 where the program counter is restored to step 248. LEDa is now flashing at the pickup blinking rate, the caller is a picked up status, and the operations proceed from step 248 onward in the fashion already described above. It is possible for the secretary to place this same caller again into group hold; to place this caller on hold to her directory number; to transfer this caller to Mr. A's phone; or simply to terminate the call by actuating the reseize switch SW14 or by going on-hook. The retrieving of a caller in group hold tagged to Mr. A's phone is accomplished simply by the secretary depressing switch SW20 which is then identified by the associated LEDa flashing at the hold blink rate. The single actuation of that switch results in outputting of signals represented by a timing wave 304 in FIG. 12, that timing wave being based on the assumption that no reseize is required prior to sending out of the retrieve digit combination "87".

SECRETARY'S SPEED DIAL CALL TO MSA

It is, of course, quite possible and likely that the secretary will be off-hook and actuate Mr. A's switch (SW20) at a time when no incoming call is ringing at his set and no call has been placed in group hold tagged to his directory number. In these circumstances, the secretary wishes directly to call Mr. A by speed dialing his directory number. It is desirable also that Mr. A's phone sound with distinctive ringing so that he is informed as to the origin of the call.

If Mr. A's switch SW20 is actuated when his line is not ringing and when there is no call on group hold for him (and LEDa is neither in the PU BLK nor HLD BLK mode), then the system will reach step 299 (FIG. 11 and Table XI) to find that the accumulator contents are zero, so it will jump to step 315. It is known at this point that the secretary's set is going to place a call to Mr. A and thus at step 315 the EDRa flip-flop in FIG. 7 will be set to make the signal ADR high and initiate distinctive ringing at MS$_a$ by a signal coupled over conductor AX2 and through LED 170 (FIG. 5). This is accomplished by performing a "C4 output routine" in the fashion previously described. In the event that Mr. A is off-hook and busy, the distinctive ring will nevertheless sound at a muted level because the signal $\overline{EF1}$ in his circuitry will be low and the analog gate 110 (FIG. 5) will be disabled. Thus, even if Mr. A is engaged in another call, he will be advised that the secretary is attempting to contact him.

At step 316 in Table XI, a "C7 input routine" is executed in order to test the BSYa signal and determine whether Mr. A is on or off-hook. Again, if he is off-hook and the signal BSYa (in FIG. 7) is high, then the eight bit word read from BUF 4A, 4B into the accumulator during the C7 input routine will include a high signal on conductor D4. Accordingly, on steps 317–321 the contents of the accumulator are shifted right five times so that the carry/borrow flag DF holds the signal BSYa. Then, on step 322 if the DF signal is zero (low), it is known that Mr. A is not busy and the system jumps to step 326; otherwise, the system proceeds to step 323. Assuming the latter case, at step 323 a constant 20,000 is written to the timer, Reg. 7. Then on step 324 a delay instruction is executed which will endure for 2.0 seconds. This is sufficiently long that a short distinctive ring will be sounded at Mr. A's phone even though it is off-hook. From step 324, the system proceeds to step 325 where the program counter jumps to step 349. At step 349, the constant 14 is written into the "last switch closed" register (Reg. 5) making it appear as if the secretary had actuated her reseize switch (SW14) even though she has not in fact done so. In other words, if Mr. A is off-hook when the secretary attempts to speed dial him, he receives a distinctive ringing sound for two seconds and then the secretary's set will automatically terminate the call attempt by outputting a reseizure indication to the central system.

From step 349, the system proceeds to step 350 where a "C4 output routine" is executed to clear all of the EDR flip-flops including the flip-flop EDRa in FIG. 7. This terminates the signal ADR and the short distinctive ring sent to the set $MS_a$. Next, on step 351 the system jumps to step 284 where the starting address pointer (Reg. 3) receives the constant 1072 (SA14). At step 284a the program counter jumps to step 205 and therefore enters the output subroutine so that a 2.0 second loop break occurs. Thus, if the secretary attempts to speed dial her executive, Mr. A, at a time when he is busy (and despite the fact that his LEDa at her set is energized steadily by the BSYa signal in FIG. 7) the speed dialing will not actually occur but Mr. A will receive a short distinctive ring and the secretary will thereafter receive a fresh dial tone from the central system.

Consider next the situation where the test performed at steps 316–322 results in a finding that Mr. A's phone is not busy, so that the system jumps to step 326. At steps 326–328 the SS flag is tested to determine whether the secretary's set is or is not freshly off-hook. If the accumulator contents on step 328 are found to be zero, the SS flag is not set and the secretary's set is freshly off-hook, whereupon the system jumps to step 332. But if the accumulator contents are found to be other than zero, the system proceeds to step 329 where the FHF flag is set (for the reason explained above) and then continues to step 330 where the constant 1147 (SA20") is written into the starting address pointer, Reg. 3. This is done when the secretary's set is not freshly off-hook and it is necessary for reseize signaling to occur before Mr. A's directory number is outputted.

After step 330 the system at step 331 skips to step 333. Step 333 is reached when the secretary's set is freshly off-hook also by jumping from step 328 to step 332 where the constant 1148 (SA20''') is written to Reg. 3 as a starting address. By either route, at step 333 the saving address 335 is written into Reg. 8 and at step 334 the system jumps to the output routine of FIG. 8. From Table VIIB, the output routine will result in either signaling of a reseizure followed by A's directory number (RS, a̱, a̱, a̱, a̱) or simply the outputting of A's directory number (a̱, a̱, a̱, a̱) if the secretary's set is freshly off-hook. Thus, the central system will cause ringing at the set $MS_a$ (with the simultaneous distinctive ringing) so that Mr. A will be apprised that his secretary is calling him. He may pick up and answer the call in a normal fashion.

When the output subroutine beginning at step 334 is completed, the system will revert to step 335 in Table XI. Three possibilities now exist. Mr. A may answer the secretary's call (placed through the central system) in the normal fashion—in which event, the signal BSYa in FIG. 7 will revert from logic low to logic high when he goes off-hook. Alternatively, the secretary may simply give up after listening to ringing with no answer for some indeterminate period of time, and place her phone set back in an on-hook condition thereby to terminate her attempted call. As another possibility, however, the secretary may push her reseize switch (SW14) as a way of terminating her attempted call and asking the central system to give her a fresh dial tone. Until one of these events occurs, the central system will continue to ring Mr. A's set $MS_a$ and these possible events are sensed by the operations which are performed after the system arrives at step 335.

Referring to Table XI at step 335, the secretary's "off-hook" signal $\overline{EF1}$ is tested. Assuming that it is high, the secretary has placed her set on-hook. Accordingly, the system will jump from step 335 to step 354 where it will execute a "C4 output routine" to clear all of the EDR flip-flops, thereby terminating the distinctive ringing at set $MS_a$. From step 354, step 355 is performed to begin a fresh iteration of the main program at step 08. These are the events which occur when the secretary hangs up after placing a call to Mr. A and receiving no answer.

As a next alternative consider that at step 335 the secretary's signal $\overline{EF1}$ is found low to confirm that she is still off-hook. The system proceeds to steps 336–342 which are identical with the previously-described steps 316–321. These operations transfer the BSYa signal into the carry/borrow flag DF of the microprocessor. At step 343 the DF flag is tested. If it is on, the system jumps to step 352 because it has been found that Mr. A's line is busy. Since Mr. A's line was not busy when tested at steps 316-322 this finding of "busy" at step 343 indicates that Mr. A has answered the ringing caused by the secretary's call. In this event, at step 352 a "C4 output routine" is executed to clear all of the EDR flip-flops, thereby terminating the signal ADR and distinctive ringing at Mr. A's phone. Then on step 353, there is a jump to step 212, after which the system begins a fresh iteration at step 08. The secretary may now talk with Mr. A in the connected call and her phone set awaits her next physical act such as going on-hook, pressing of her reseize switch or some other auxiliary switch. As an example of the latter, it may be seen that if the secretary is talking to Mr. A and an incoming call rings at Mr. B's phone ($MS_b$), she will hear a muted distinctive ring sound and see $LED_b$ flashing at the 2/4 rate. She can just hit her switch SW21 once,—whereupon an artificial reseize loop break will terminate her connection with $MS_a$ and output the sequence RS, 6, 7 to effect pick up of Mr. B's call. She need not go on-hook before hitting SW21.

Still another alternative is that at step 343 the flag signal DF will be found at a logic low level indicating that $MS_a$ is not busy and therefore has not answered the call ringing there. In this event, the system proceeds to step 344 to test the signal $\overline{EF3}$ and determine whether any of the secretary's switches SW2–SW24 has been actuated. If this test reveals that $\overline{EF3}$ is high, the system reverts back to step 335, and this loop will be executed indefinitely until one of the alternative possibilities here named does in fact occur. On the other hand, if it is found that the signal $\overline{EF3}$ is low, the system skips to step 346 to execute a "C2 input routine" by which the contents of BUF 1 (FIG. 3) are placed in the accumulator. The accumulator thus contains a number identifying the particular switch that has been closed. Next, on step 347 the constant 14 is read in and subtracted. If on step 348 the accumulator contents are zero, it is known that the particular switch previously closed is the reseize switch (SW14). In this event, the system proceeds to step 349 to write the constant 14 into Reg. 5, thereby storing the fact that the last switch closed is the reseize switch. Then, at step 350 a "C4 output routine" is executed to clear the EDR flip-flops and terminate the distinctive ringing which has been taking place at the $MS_a$ phone. At step 351, the system jumps to step 284 where the starting address pointer is set to 1072 (SA14), after which the system jumps to step 205 to begin an output subroutine which will result in a reseizure being signaled to the central system. In other words, if the secretary after dialing Mr. A's directory number receives no answer and ultimately depresses her reseize switch (RS 14), her call attempt is terminated (and distinctive ringing at Mr. A's phone is ended) and she will again receive a fresh dial tone from the central system so that she may initiate some other call. She can terminate her attempted call to Mr. A without going on-hook but simply by actuating her reseize switch.

As indicated at step 348, if it is found that some switch other than SW14 has been actuated when the secretary has initiated a speed-dialed call to Mr. A (and at step 348 the contents of the accumulator are not zero), then the program counter simply reverts to step 335 to continue a loop until one of the alternate possibilities here discussed does in fact occur.

In summary, if the secretary pushes Mr. A's switch SW20 when $MS_a$ (i) is not ringing, (ii) does not have a call picked up from it, and (iii) is not busy—then a speed dialed call is placed through the central system from the SS to $MS_a$ (and distinctive ringing begins at $MS_a$). The distinctive ringing ends when (a) the secretary hangs up, (b) the secretary reseizes by her switch SW14, or (c) Mr. A answers and thus makes the signal $BSY_a$ change from logic low to logic high. If the $MS_a$ phone is busy when SW20 in the SS is pushed, then the automatically outputted signals do not occur, but a short distinctive ring signal is sent to Mr. A and the secretary hears a reseize loop break for two seconds before receiving a fresh dial tone from the central system.

If transferring of a picked-up call occurs by reason of SW20 being actuated (see FIG. 11 at steps 260-271), the directory digits a, a, a, a are outputted (following a hook flash) when a jump takes place from step 271 to step 332 (as labeled at J in FIG. 11). Thereafter, the ringing which occurs at $MS_a$ is terminated when Mr. A answers, the secretary goes on-hook, or the secretary reseizes—as previously noted with respect to steps 335 et seq.

RESUMé

In overview, the main program defined by FIGS. 9, 10 and 11 is iteratively executed at a rapidly repeating rate—and with different paths through the flow charts depending upon the existing conditions and the particular switch which is actuated.

If no switch is actuated, looping occurs in the upper portion of FIG. 9. Actuation of any switch SW2–SW24 results in its identifying number being stored in Reg. 5 at step 24.

Thereafter, if the HOLD, RETRIEVE, RESEIZE, CALL FWD. or FWD. CONTROL switch (SW2, SW13, SW14, SW3 or SW4) is identified as the one previously actuated, the appropriate LED is turned on or off and operations progress via point P8 (FIG. 9) to step 205 so that the corresponding dial signal combination sequence is sent out over the two-wire line to the control system.

If none of the five switches named in the preceding paragraph is identified, the operations may proceed via step 090 where LED 5, 6, 7 or 8 is controlled (if SW5–8 is identified as having been closed).

Then, in the secretary's set, the system tests switches SW20–SW24 (see FIG. 11). It executes program portion PPA, PPB, PPC or PPD if the identified switch is SW20 to SW23, respectively. The group retrieve switch SW24 has no effect unless the system of the SS phone is in a picked up status loop exemplified at steps 248-296. The system leaves any of those program portions by jumping to step 205—after having either (i) speed dialed in the member's directory number, (ii) outputted a digit combination to pick up a call incoming to the member (such call distinctively ringing at the SS) and then terminating that pickup in one of several ways, including placing the call in group hold. Finally, if a call has been put on group hold tagged to the $MS_a$ switch, then closure of SW20 retrieves that call to the secretary's set.

If none of the switches SW20–24 in an SS phone is detected as having been closed, the operations go to step 140 where the last switch actuated is identified to pick a starting address for outputting a dial signal combination preassigned to that switch. This occurs in SS type phones for switches SW5–12 and SW15–24. For BP or MS type phones, the response to any of switches 20–24 is essentially the same as indicated by step 115 to 139 in Table X.

Noteworthy is the fact that a single switch actuation results in outputting of not only a sequence of decimal digit value signals (any of 0–9, *, #) in a desired combination; in addition, loop breaks (for transfer or reseizing) as well as tandem pauses are created at any desired point in a combination sequence. As exemplified by the signal code combination at SA2 in Table VII (which is accessed to produce the sequence 300 in FIG. 12), a loop break for "hook flash" is created automatically by timed control of a switching device 60 in FIG. 4. To produce a hook flash or a reseizure, the user of the phone set need not physically depress the hook switch.

In consequence, the present invention not only provides "feature phones" which are able to issue access or feature digit combinations to a central system; it also gives those phones full control over the central system without the user having to manipulate his hook switch (or worry about how long he holds it down) at certain points in any sequence of dial digit signals.

Because of this ability to send loop breaks as well as decimal digit value signals in combinations to the central system, the present invention enables "groups" of phones to be interrelated through the central system without the need for each phone to have more than one line. In the secretary's group here described, it is possible for her to pick up, transfer, place on group hold (coded call hold), and retrieve a call originally incoming to any one of a plurality of her member's sets.

The invention avoids the need for multiple lines brought to each of several phones within a group; yet by simple, short, two-wire intelligence links running from a master phone (SS) to each of plural member's phones MS, distinctive ringing and status signals for indicators are exchanged between the secretary's set and each of the member's sets. A member is informed when the secretary has one of his calls picked up or in group hold; and he is also informed when the secretary is attempting to call him. The secretary is informed when each of her members is on-hook or off-hook. She is also informed when each of her member's sets is ringing; and she is specially alerted when any of her members is calling her via the central system, so she can give priority response. But the intelligence sent over the simple two-wire links (here shown as extending between FIGS. 5 and 7) is also used in the secretary's set to govern the action which will occur when she actuates the switch assigned to a given member.

All of the foregoing is accomplished without a centralized "control box" of the type which has characterized prior key line groups of phones.

There now follow, as the conveniently located, concluding pages of this specification, the Tables I–XI to which reference has been made.

TABLE I

ACRONYMS & SYMBOLS FOR SIGNALS AND CONDITIONS

| | |
|---|---|
| A | First Group Member ($MS_a$) |
| B | Second Group Member ($MS_b$) |
| C | Third Group Member ($MS_c$) |
| D | Fourth Group Member ($MS_d$) |
| SS | Secretary's Set |
| ADR | A Distinctive Ring |
| BDR | B Distinctive Ring |
| CDR | C Distinctive Ring |
| DDR | D Distinctive Ring |
| SDR | SEC Distinctive Ring |
| $RNG_a$ | A's set ringing |
| $RNG_b$ | B's set ringing |
| $RNG_c$ | C's set ringing |
| $RNG_d$ | D's set ringing |
| $BSY_a$ | A's set busy (off-hook) |
| $BSY_b$ | B's set busy |
| $BSY_c$ | C's set busy |
| $BSY_d$ | D's set busy |
| DRNG | Distinctive Ring |
| $PU_a$ | A's call picked up by SEC |
| $PU_b$ | B's call picked up by SEC |
| $PU_c$ | C's call picked up by SEC |
| $PU_d$ | D's call picked up by SEC |
| HLD | Call to given set has been placed on hold |
| $H_a$ | SEC has placed call to A on group hold |
| $H_b$ | SEC has placed call to B on group hold |
| $H_c$ | SEC has placed call to C on group hold |
| $H_d$ | SEC has placed call to D on group hold |
| PU BLK | Light flashing with timing to signify call picked up |
| HLD BLK | Light flashing with timing to signify call is on group hold |
| $EDR_a$ | Enable Distinctive Ring at A's set |
| $EDR_b$ | Enable Distinctive Ring at B's set |
| $EDR_c$ | Enable Distinctive Ring at C's set |
| $EDR_d$ | Enable Distinctive Ring at D's set |
| $LED_a$ | Lamp in SEC's set for Mr. A (#20) |
| $LED_b$ | Lamp in SEC's set for Mr. B (#21) |
| $LED_c$ | Lamp in SEC's set for Mr. C (#22) |
| $LED_d$ | Lamp in SEC's set for Mr. D (#23) |
| GP HLD | SEC Button to put caller to A, B, C or D on hold |

TABLE I-continued

ACRONYMS & SYMBOLS FOR SIGNALS AND CONDITIONS

| | |
|---|---|
| $R_s$ | Register holding identifying number of last switch closed |
| Flags | |
| SS | Subsequent switch (after going off-hook) flag |
| FC | Forward Control Flag |
| CF | Call Forward Flag |
| FHF | First Half Finished Flag (first four bits of a byte have been used or should be skipped) |
| SECAN | SEC Answer (enabled) flag |
| SA1 | Starting Address 1 for a digit sequence to be sent |
| SA2 | Starting Address 2 |
| ⋮ | ⋮ |
| $SA_n$ | Starting address n |

TABLE II

| SWITCH NO. | LED NO. | FUNCTION IN BASIC PHONE | FUNCTION IN SEC'Y PHONE | FUNCTION IN MEMBER PHONE |
|---|---|---|---|---|
| 1 | 1 | STORAGE MODE | → | → |
| 2 | 2 | HOLD | → | → |
| 3 | 3 | CALL FWD | → | → |
| 4 | 4 | FWD CONTROL | → | → |
| 5 | 5 | OPER RECALL | → | SEC'Y ANSWER |
| 6 | 6 | TRUNK ACCESS | → | CALL SEC'Y |
| 7 | 7 | VOICE PAGE | → | → |
| 8 | 8 | DICTATION | → | → |
| 9 | None | CONF ACCESS | → | → |
| 10 | " | INTERNAL SPEED DIAL | → | TRUNK ACCESS |
| 11 | " | INTERNAL SPEED DIAL | → | EXEC O'RIDE |
| 12 | " | TRANSFER | → | → |
| 13 | " | RETRIEVE | → | → |
| 14 | " | RESEIZE | → | → |
| 15 | " | SPEED DIAL | → | SPEED DIAL |
| 16 | " | SPEED DIAL | " | " |
| 17 | " | SPEED DIAL | " | " |
| 18 | " | SPEED DIAL | " | " |
| 19 | " | SPEED DIAL | " | " |
| 20 | " | SPEED DIAL | Mr. A ($LED_a$) | " |
| 21 | " | SPEED DIAL | Mr. B ($LED_b$) | " |
| 22 | " | SPEED DIAL | Mr. C ($LED_c$) | " |
| 23 | " | SPEED DIAL | Mr. D ($LED_d$) | " |
| 24 | " | SPEED DIAL | GROUP HOLD | " |

TABLE III

| FEATURE FUNCTION | ASSUMED DIGITS FOR PBX RESPONSE | |
|---|---|---|
| HOLD | HF 71 | dddd |
| CALL FWD | 72 | xxxx |
| CALL FWD CANCEL | 73 | |
| FWD CONTROL | 74 | xxxx |
| FWD CTR CANCEL | 75 | |
| OPER RECALL | HF 0 | |
| TRUNK ACCESS | 88 | |
| VOICE PAGE | 76 | |
| DICTATION ACC | 77 | |
| CONF ACC | 78 | xxxx |
| TRANSFER | HF | xxxx |
| RETRIEVE | 87 | dddd |
| RESEIZE | 2.0 sec. loop break | |
| EXEC O'RIDE | 79 | |
| CALL SEC | ssss | |
| PU A's CALL | 66 | |
| PU B's CALL | 67 | |
| PU C's CALL | 68 | |
| PU D's CALL | 69 | |

NOTE:
dddd designates four digit directory number of phone putting call on hold;
xxxx designates directory number of transferee phone;
ssss designates a group secretary's directory number.

TABLE IV

| DIGIT OR SYMBOL | FOUR BIT CODE | | | | ROW & COL. FORMAT | | | | | | | |
|---|---|---|---|---|---|---|---|---|---|---|---|---|
| | $b_3$ | $b_2$ | $b_1$ | $b_0$ | d7 C3 | d6 C2 | d5 C1 | d4 R4 | d3 R3 | d2 R2 | d1 R1 | d0 |
| 1 | 0 | 0 | 0 | 1 | 1 | 0 | 0 | 1 | 0 | 0 | 0 | 1 |
| 2 | 0 | 0 | 1 | 0 | 1 | 0 | 1 | 0 | 0 | 0 | 0 | 1 |
| 3 | 0 | 0 | 1 | 1 | 1 | 1 | 0 | 0 | 0 | 0 | 0 | 1 |
| 4 | 0 | 1 | 0 | 0 | 1 | 0 | 0 | 1 | 0 | 0 | 1 | 0 |
| 5 | 0 | 1 | 0 | 1 | 1 | 0 | 1 | 0 | 0 | 0 | 1 | 0 |
| 6 | 0 | 1 | 1 | 0 | 1 | 1 | 0 | 0 | 0 | 0 | 1 | 0 |
| 7 | 0 | 1 | 1 | 1 | 1 | 0 | 0 | 1 | 0 | 1 | 0 | 0 |
| 8 | 1 | 0 | 0 | 0 | 1 | 0 | 1 | 0 | 0 | 1 | 0 | 0 |
| 9 | 1 | 0 | 0 | 1 | 1 | 1 | 0 | 0 | 0 | 1 | 1 | 0 |
| 0 | 1 | 0 | 1 | 0 | 1 | 0 | 1 | 0 | 1 | 0 | 0 | 0 |
| * | 1 | 0 | 1 | 1 | 1 | 0 | 0 | 1 | 1 | 0 | 0 | 0 |
| # | 1 | 1 | 0 | 0 | 1 | 1 | 0 | 1 | 0 | 0 | 0 | 0 |
| RS | 0 | 0 | 0 | 0 | (Assumes Active High) | | | | | | | |
| HF | 1 | 1 | 0 | 1 | | | | | | | | |
| TP | 1 | 1 | 1 | 0 | | | | | | | | |
| LD | 1 | 1 | 1 | 1 | | | | | | | | |

RS means RESEIZE
HF means HOOK FLASH
TP means TANDEM PAUSE
LD means LAST DIGIT

TABLE V
GENERALIZED ROM MAP

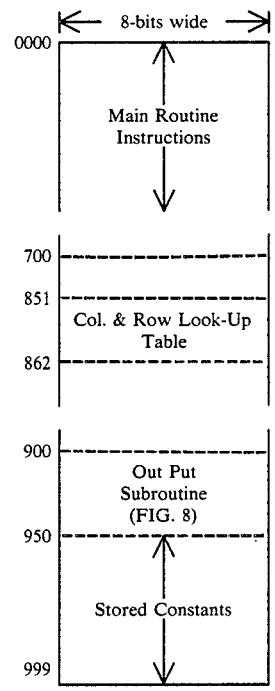

TABLE VI
GENERALIZED RAM MAP

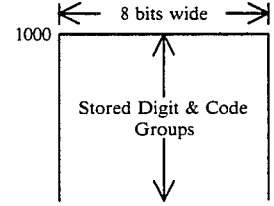

TABLE VI-continued
GENERALIZED RAM MAP

```
2300 ┌──────────────┐
2301 │ AGH  STATUS  │
2302 │ BGH  STATUS  │
2303 │ CGH  STATUS  │
2304 │ DGH  STATUS  │
     │              │
2305 ├ ─ ─ ─ ─ ─ ─ ─┤
     │      ↑       │
     │  Available for│
     │ Changeable Data│
     │      ↓       │
2400 └──────────────┘
```

TABLE VII
EXEMPLARY RAM MAP FOR BASIC PHONE DIGIT SEQUENCES

| | | | | |
|---|---|---|---|---|
| Hold | SA2 | HF | 7 | 1000 |
| | | 1 | TP | 1001 |
| | | 5 | 4 | 1002 |
| | | 3 | 2 | 1003 |
| | | LD | LD | 1004 |
| | | LD | LD | |
| Call Fwd. | SA3 | 7 | 2 | 1006 |
| | | LD | LD | |
| | SA3' | 7 | 3 | 1008 |
| | | LD | LD | |
| | | LD | LD | |
| | | LD | LD | |
| Fwd. Control | SA4 | 7 | 4 | 1012 |
| | | LD | LD | |
| | SA4' | 7 | 5 | 1014 |
| | | LD | LD | |
| OP. Recall | SA5 | HF | 0 | 1018 |
| | | LD | LD | |
| Trunk Acc. | SA6 | 8 | 8 | 1024 |
| | | LD | LD | |
| Voice Page | SA7 | 7 | 6 | 1030 |
| | | LD | LD | |
| Dict. Acc. | SA8 | 7 | 7 | 1036 |
| | | LD | LD | |
| Conf. Acc. | SA9 | 7 | 8 | 1042 |
| | | LD | LD | |
| Int. Sp. Dial | SA10 | 3 | 4 | 1048 |
| | | 5 | 6 | |
| | | LD | LD | |
| Int. Sp. Dial | SA11 | 2 | 3 | 1054 |
| | | 4 | 5 | |
| | | LD | LD | |
| Transfer | SA12 | HF | LD | 1060 |
| | | LD | LD | |
| Retr. | SA13 | LD | RS | 1066 |
| | SA13' | 8 | 7 | |
| | | 5 | 4 | |
| | | 3 | 2 | |
| | | LD | LD | |
| Reseize | SA14 | RS | LD | 1072 |
| | | LD | LD | |

TABLE VII-continued
EXEMPLARY RAM MAP FOR BASIC PHONE DIGIT SEQUENCES

| | | | |
|---|---|---|---|
| SA15 | x x / x x / LD LD | 1080 | |
| SA16 | x x / TP x / x x / x x / x x / LD LD | 1093 | |
| SA17 | | 1106 | |
| SA18 | | 1119 | DSS for ten numbers |
| SA19 | | 1132 | |
| SA20 | | 1145 | |
| SA21 | | 1158 | |
| SA22 | | 1171 | |
| SA23 | | 1184 | |
| SA24 | x x / TP x / x x / x x / x x / LD LD / LD LD | 1197 | |

TABLE VIIA
EXEMPLARY RAM MAP FOR MS PHONE DIGIT SEQUENCES
Identical to Table VII, except:

| | | | | | | |
|---|---|---|---|---|---|---|
| SEC. ANS. CALL SEC. | SA5 SA6 | LD LD / LD LD / s s / s s / LD LD | 1018 1024 | TRUNK ACC. EXEC. O.R. | SA10 SA11 | 8 8 / LD LD / 7 9 / LD LD | 1048 1054 |

TABLE VIIB
EXEMPLARY RAM MAP FOR SEC'Y PHONE DIGIT SEQUENCES
Identical To Table VII, except:

| | | | |
|---|---|---|---|
| "A" CALLS | SA20 SA20' SA20'' SA20''' | LD RS / 6 6 / LD RS / a a / a a / LD LD | 1145 1146 1147 1148 1149 1150 |

TABLE VIIB-continued
EXEMPLARY RAM MAP FOR SEC'Y PHONE DIGIT SEQUENCES
Identical To Table VII, except:

| | | | |
|---|---|---|---|
| "B" CALLS | SA21 SA21' SA21'' SA21''' | LD RS / 6 6 / LD RS / b b / b b / LD LD | 1158 |
| "C" CALLS | SA22 SA22' SA22'' SA22''' | LD RS / 6 8 / LD RS / c c / c c / LD LD | 1171 |
| "D" CALLS | SA23 SA23' SA23'' SA23''' | LD RS / 6 9 / LD RS / d d / d d / LD LD | |
| GRP. HOLD | SA24 | HF 7 / 1 TP / LD LD | 1197 |
| GRP. RETRIEVE | SA25 SA25' | LD RS / 8 7 / LD LD / LD LD | 2210 |

TABLE VIII
ARBITRARY & EXEMPLARY ASSIGNMENT OF REGISTERS IN CDP 1802 MICROPROCESSOR

| REGISTER NO. | |
|---|---|
| 0 | Reserved for DMA operations |
| 1 | Reserved for interrupt servicing |
| 2* | Hold Counter |
| 3 | Address Pointer for digit sequence data |
| 4 | Program Counter |
| 5* | Last Switch Closed ($R_s$) |
| 6* | Scratch Pad |
| 7 | Timer No. T |
| 8 | Saved Address for Resumption After Subroutine Execution |
| 9 | Data Pointer |
| 10 | |
| 11* | SS Flag (at least significant bit) |
| 12* | FC Flag (at least significant bit) |
| 13* | CF Flag (at least significant bit) |
| 14* | FHF Flag (at least significant bit) |
| 15* | SECAN Flag (at least significant bit) |

*In these registers, the lower order of the two bytes are employed.

TABLE IX
LISTING FOR OUTPUT SUBROUTINE OF FIG. 8
(This subroutine is started after address pointer, Register 3, has been written to contain starting address SA of a digit group to be outputted and is entered by jumping program counter to step 900)

| PROGRAM STEP (ROM Address) | OPERATION | COMMENT |
|---|---|---|
| 900 | Read Reg. 14 to Acc. | Test FHF Flag |
| 901 | If Acc. ≠ 0, jump to step 908, else proceed | Jmp if FHF is on |
| 902 | Read contents from RAM address signaled by Reg. 3 to Acc. | ACC = two digit byte |
| 903–906 | Shift Acc. right four places (put 0 in MSB's) | ACC = 1st half digit |
| 907 | Jump to step 918 | |

TABLE IX-continued

LISTING FOR OUTPUT SUBROUTINE OF FIG. 8
(This subroutine is started after address pointer, Register 3, has been written to contain starting address SA of a digit group to be outputted and is entered by jumping program counter to step 900)

| PROGRAM STEP (ROM Address) | | OPERATION | COMMENT |
|---|---|---|---|
| 908 | | Same as step 902 | ACC = two digit byte |
| 910–913 | | Shift Acc. left four places | |
| 914–917 | | Same as 903–906 (put 0 in MSB's) | ACC = 2nd half digit |
| 918 | | Write Acc. to scratch pad Reg. 6 | Reg. 6 = selected digit code |
| 919 | | Read constant 15 (LD code 1111) from ROM & subtract | |
| 920 | | If Acc. = 0, jump to step 951, else proceed | Jump if digit code is LD |
| 921 | | Read Reg. 6 to Acc. | |
| 922 | | Read constant 13 (HF code 1101) from ROM & subtract | |
| 923 | | If Acc. = 0, jump to step 936, else proceed | Jump if digit code is HF |
| 924 | | Read Reg. 6 to Acc. [Code for RS = 0000] | ACC = selected digit |
| 925 | | If Acc. = 0, jump to step 938, else proceed | Jump if digit code is RS |
| 926 | | Read constant 14 (TP Code 1110) from ROM and subtract | |
| 927 | | If Acc. = 0, jump to step 942, else proceed | Jump if digit code is TP |
| 928 | Look up | Read Reg. 6 to Acc. | ACC = selected digit code |
| 929 | Table | Read constant 850 and Add | |
| 930 | Action | Write sum to Reg. 6 | Reg. 6 = Addr. Col. and row code |
| 931 | | Read contents, from ROM address signaled by Reg. 6, and execute C1 output routine to BUF 3 (FIG. 3). The data bus will carry Col. & row code for digit & D7 will be high | ACC = Col. & row code of selected digit<br>Tone For Selected Digit Starts Out |
| 932 | | Read constant 600 (60 ms) from ROM & write at Reg. 7 | Set Timer = 60 ms |
| 933 | | Execute delay = T (for 60 ms) | |
| 934 | | Write zero to BUF 3 by executing C1 output routine | Clear BUF 3 and stop the tone |
| 935 | | Jump to step 943 | T still = 60 ms |
| 936 | | Read constant 6000 (600 ms) from ROM & write to Reg. 7 | Set Timer - 600 ms |
| 937 | | Jump to step 939 | |
| 938 | | Read constant 20,000 from ROM & write to Reg. 7 | Set Timer = 2 sec. |
| 939 | | Set Q = 1 | Start Loop Break |
| 940 | | Execute delay | T is 600 ms or 2.0 sec. |
| 941 | | Set Q = 0 | Stop loop break |
| 942 | | Read constant 12,000 from ROM & write to Reg. 7 | T set to 1.2 sec. |
| 943 | | Execute delay | T is 1.2 sec. or 60 ms. |
| 944 | | Read Reg. 14 to Acc. | Test FHF Flag |
| 945 | | If D ≠ 0, jump to step 948, else proceed | |
| 946 | | Write 1 to Reg. 14 | FHF was 0, so set it |
| 947 | | Jump to step 950 | |
| 948 | | Write 0 to Reg. 14 | Clear FHF Flag |
| 949 | | Increment Reg. 3, address pointer | Ready to take next digit |
| 950 | | Restore program counter to step 900 | Repeat the subroutine |
| 951 | | Write 0 to Reg. 14 | Clear FHF Flag |
| 952 | | Read Reg. 8 and write to Acc. | |
| 953 | | Write Acc. to Reg. 4 (Progm. Ctr.) | This exits from subroutine to main routine |

TABLE X

LISTING FOR MAIN ROUTINES OF FIGS. 9 AND 10

| STEP | OPERATION | COMMENT |
|---|---|---|
| [Power On Reset (Not Shown) Clears All FIG. 3 Buffers and the Program Counter] | | |
| 0000 | Write 0 to Reg. 2 | Clear Hold Counter |
| 1 | Write 0 to Reg. 5 | Clear $R_S$ Register |
| 2 | Write 0 to Reg. 10 | |
| 3 | Reg. 11 | |
| 4 | Reg. 12 | Clear all registers used |

TABLE X-continued

LISTING FOR MAIN ROUTINES OF FIGS. 9 AND 10

| STEP | OPERATION | COMMENT |
|---|---|---|
| 5 | Reg. 13 | as flags |
| 6 | Reg. 14 | (Table VIII) |
| 7 | Reg. 15 | |
| 8 | Test $\overline{EF1}$; if low jump to step 019, else proceed | |
| 9 | Write 0 to Reg. 11 | Clear SS Flag |
| 0010 & 11 | Read 0000 0101 to data bus and execute C6 output routine | Turn off LED 6 |
| 12 & 13 | Read 0000 0110 to data bus and execute C6 output routine | Turn off LED 7 |
| 14 & 15 | Read 0000 0111 to data bus and execute C6 output routine | Turn off LED 8 |
| 16 & 17 | For Basic Set: Read 0000 0100 to data bus and execute C6 output routine / for MS Set: NOP | Turn off LED 5 |
| 18 | Return Reg. 3 (Program Ctr.) to step 0008 | Iterate |
| 19 | TEST $\overline{EF2}$; if high jump to step 0222, else proceed | Any key sw. Closed? |
| 0020 | Write 1 to Reg. 11 | Set SS Flag |
| 21 | Return Reg. 4 (Program Ctr.) to step 0008 | |
| 22 | Test $\overline{EF3}$; if low, skip to step 0024, else proceed | |
| 23 | Return Reg. 4 to step 0008 | Iterate |
| 24 | Execute C2 Input Routine to transfer SW# from BUF 1 to Reg. 5. SW# remains in Acc | Store closed SW# in $R_5$ |
| 25 | Read constant 2 and subtract | |
| 26 | If D ≠ 0, jump to step 31, else proceed | Jmp. if not HOLD sw. |
| 27 | Increment Reg. 2 | Store HOLD closure |
| 28 | Read 1000 0001 to data bus; execute C6 output | Turn on HOLD LED 2 |
| 29 | Write constant 1000 (SA2) to Reg. 3 | SA for HOLD |
| 0030 | Jump to step 0205 | |
| 31 | Read Reg. 5 to Acc. | Acc = Last Sw. Closed |
| 32 | Read constant 13 and subtract | |
| 33 | If D ≠ 0, jump to step 0049, else proceed | Jmp. if $R_5$ is not RETR. |
| 34 | Read Reg. 2 to Acc. | Acc. = Hold Ctr. No. |
| 35 | If D ≠ 0, skip to step 0037, else proceed | |
| 36 | Return Reg. 4 (Pgm. ctr.) to step 0008 | Iterate |
| 37 | Decrement Reg. 2 | Decr. Hold Ctr. |
| 38 | Read Reg. 2 to Acc. | Test for Hold Ctr. = 0 |
| 39 | If D ≠ 0, jump to step 0042, else proceed | |
| 0040 & 41 | Read 0000 0001 to data bus; execute C6 output | Turn off Hold Led 2 |
| 42 | Read Reg. 11 to Acc. | Test SS Flag |
| 43 | If D = 0, jump to step 0047, else proceed | |
| 44 | Write 1 to Reg. 14 | Set FHF Flag |
| 45 | Write constant 1066 (SA13) to Reg. 3 | SA for RSZ & RETR. |
| 46 | Jump to step 0205 | |
| 47 | Write constant 1067 (SA13') to Reg. 3 | SA for RETR. |
| 48 | Jump to step 0205 | |
| 49 | Read Reg. 5 to Acc. | Acc = last SW# |
| 0050 | Read Constant 14 and subtract | Test for $R_5$ = RSZ |
| 51 | If D ≠ 0, jump to step 0064, else proceed | |
| 52 | Read Reg. 11 to Acc. | Test SS Flag |
| 53 | If D ≠ 0. skip to step 0055, else proceed | |
| 54 | Return program counter to step 0008 | Iterate |
| 55 & 56, 57 & 58, 59 & 60, 0060 & 61 | Same As Steps 10-17, supra | Turn off LED 5 thru LED 8 |
| 62 | Write constant 1072 (SA14) to Reg. 3 | SA for RESZ. |
| 63 | Jump to step 0205 | |
| 64 | Read Reg. 5 to Acc. | Acc = Last SW # |
| 65 | Read constant 3 and subtract | Test if SW # = CALL FWD. |
| 66 | If D ≠ 0, jump to step 0077, else proceed | |
| 67 | Read Reg. 13 to Acc. | Test CF Flag |
| 68 | If D ≠ 0, jump to step 0073, else proceed | |
| 69 | Read 1000 0010 to data bus & execute C6 output | Turn on LED 3 |
| 0070 | Write 1 to Reg. 13 | Set CF Flag |
| 71 | Write constant 1006 (SA3) to Reg. 3 | SA for Call Fwd. |

4,613,730

TABLE X-continued
LISTING FOR MAIN ROUTINES OF FIGS. 9 AND 10

| STEP | OPERATION | COMMENT |
|---|---|---|
| 72 | Jump to step 0205 | |
| 73 | Read 0000 0010 to data bus; exeucte C6 output | Turn off LED 3 |
| 74 | Write zero to Reg. 13 | Clear CF Flag |
| 75 | Write constant 1008 (SA3') to REg. 3 | SA for CF Erase |
| 76 | Jump to step 0205 | |
| 77 | Read Reg. 5 to Acc. | Acc = Last SW# |
| 78 | Read constant 4 and subtract | Test for SW # = FWD. CONT. |
| 79 | If D ≠ 0, jump to step 0090, else proceed | |
| 0080 | Read Reg. 12 to Acc. | Test FC Flag |
| 81 | if D ≠ 0, jump to step 0086, else proceed | |
| 82 | Read 1000 0011 to data bus; execute C6 output | Turn on LED 4 |
| 83 | Write 1 to Reg. 12 | Set FC Flag |
| 84 | Write constant 1012 (SA4) to Reg. 3 | SA for FWD. CONT. |
| 85 | Jump to step 0205 | |
| 86 | Read 0000 0011 to data bus; execute C6 output | Turn off LED 4 |
| 87 | Write zero to Reg. 12 | Clear FC Flag |
| 88 | Write constant 1014 (SA4') to Reg. 3 | SA for FC Erase |
| 89 | Jump to step 02025 | |
| 0090 | Read Reg. 5 to Acc. | Acc = Last SW# |
| 91 | Read constant 5 and subtract | Test for SW# = 5 |
| 92 | If D ≠ 0, jump to step 0100, else proceed | |
| | For BP: Jump to step 0097 | |
| 93 | | Test SECAMN FLAG |
| | For MS: Read Reg. 15 to Acc. | |
| 94 | (MS only) If D = 0, jump to step 0097, else proceed | |
| 95 | (MS only) Read 0000 0100 to data bus; C6 output routine | Turn off LED 5 |
| 96 | (MS only) Write zero to Reg. 15 | Clear SECAN FLAG |
| 96a | (MS only) Jump to step 99 | |
| 97 | Read 1000 0100 to data bus; execute C6 output routine | |
| | For BP: NOP | |
| 98 | | Set SECAN FLAG |
| | For MS: Write 1 to Reg. 15 | |
| | For BP: Jump to step 0114 | |
| 99 | | Iterate |
| | For MS: Return to step 08 | |
| 0100 | Write Reg. 5 to Acc. | |
| 101 | Read constant 6 and subtract | Test if SW# = 6 |
| 102 | If D ≠ 0, jump to step 105, else proceed | |
| 103 | Write 1000 0101 to data bus; execute C6 output | Turn on LED 6 |
| 104 | Jump to step 0114 | |
| 105 | Read Reg. 5 to Acc. | Test if SW# = 7 |
| 106 | Read constant 7 and subtract | |
| 107 | If D ≠ 0, jump to step 0//0, else proceed | |
| 108 | Read 1000 0110 on data bus; C6 output | Turn on Led 7 |
| 109 | Jump to step 0114 | |
| 0110 | Read Reg. 5 to Acc. | Test if SW# = 8 |
| | Read constant 8 and subtract | |
| | If D ≠ 0, jump to step 0114, else proceed | |
| 113 | Read 1000 0111 to data bus; C6 output | Turn on LED 8 |
| 114 | Read Reg. 5 to Acc. | Acc to $R_s$ |
| | For BP & MS: NOP | |
| 115 | For Sec'y Set: Jump to step 230 (Table XI) | |
| | NOTE: Steps 0115-0139 NOT USED FOR SECY'S SET | |
| 116 | Read constant 20 and subtract | Test for SW20 |
| 117 | If D ≠ 0, jump to step 120, else proceed | |
| 118 | Write constant 1145 (SA20) to Reg. 3 | SA for SW20 |
| 119 | Jump to step 0205 | |
| 0120 | Read Reg. 5 to Acc. | |
| 121 | Read constant 21 and subtract | Test for SW21 |
| 122 | If D ≠ 0, jump to step 125, else proceed | |
| 123 | Write constant 1158 (SA21) to Reg. 3 | SA for SW21 |
| 124 | Jump to step 0205 | |
| 125 | Read Reg. 5 to Acc. | |
| 126 | Read constant 22 and subtract | Test for SW22 |
| 127 | If D ≠ 0, jump to step 130, else proceed | |

TABLE X-continued

LISTING FOR MAIN ROUTINES OF FIGS. 9 AND 10

| STEP | OPERATION | COMMENT |
|---|---|---|
| 128 | Write constant 1171 (SA22) to Reg. 3 | SA for SW22 |
| 129 | Jump to step 0205 | |
| 0130–134 } | SIMILAR TO STEPS 125–129 | Test for SW23 |
| 135–139 } | SIMILAR TO STEPS 125–129 | Test for SW24 |
| 0140 | Read Reg. 5 to Acc. | |
| 141 | Read constant 5 and subtract | Test for SW5 |
| 142 | If D ≠ 0, jump to step 0205, else proceed | |
| 143 | Write constant 1018 (SA5) to Reg. 3 | SA for SW5 |
| 144 | Jump to step 0205 | |
| 145–149 } | SIMILAR TO STEPS 0140–144 | Test for SW6 |
| 0150–154 } | SIMILAR TO STEPS 0140–144 | Test for SW7 |
| 155–159 } | SIMILAR TO STEPS 0140–144 | Test for SW8 |
| 160–164 } | SIMILAR TO STEPS 0140–144 | Test for SW9 |
| 165–169 } | SIMILAR TO STEPS 0140–144 | Test for SW10 |
| 0170–174 } | SIMILAR TO STEPS 0140–144 | Test for SW11 |
| 175–179 } | SIMILAR TO STEPS 0140–144 | Test for SW12 |
| 0180–184 } | SIMILAR TO STEPS 0140–144 | Test for SW15 |
| 185–189 } | SIMILAR TO STEPS 0140–144 | Test for SW16 |
| 0190–194 } | SIMILAR TO STEPS 0140–144 | Test for SW17 |
| 195–199 } | SIMILAR TO STEPS 0140–144 | Test for SW18 |
| 0200 | Read Reg. 5 to Acc. | |
| 201 | Read constant 19 and subtract | Test for SW19 |
| 202 | If D = 0, jump to step 204, else proceed | |
| 203 | Return Program Ctr. to step 0008 | $R_s$ is an invalid no. |
| 204 | Write constant 1132 (SA19) to Reg. 3 | SA for SW19 |
| 205 | Write constant 207 to save Reg. 8 | |
| 206 | Jump Program Counter to step 900 | Enter OP subroutine |
| 207 | Read Reg. 5 to Acc. | |
| 208 | Read Constant 14 and subtract | Test for SW14 (RESZ) |
| 209 | If D ≠ 0, jump to step 212, else proceed | |
| 210 | Write zero to Reg. 11 | Clear SS Flag |
| 211 | Skip to step 213 | |
| 212 | Write 1 to Reg. 11 | Set SS Flag |
| 213 | Return program counter to 0008 | Iterate |

TABLE XI

LISTING FOR SS MAIN ROUTINE PORTION OF FIG. 11
NOTE: After steps 0114 and 0115 in Table X, Acc SW#, Prog. Ctr. - 250

| STEP | OPERATION | COMMENT |
|---|---|---|
| 0230 | Read constant 24 and subtract | Test for SW24 ($G_p$ Hld) |
| 231 | If D ≠ 0, skip to step 233, else proceed | |
| 232 | Return program counter to step 0008 | Iterate |
| 233 | Read Reg. 5 to Acc. | |
| 234 | Read constant 20 and subtract | Test for SW20 (Mr. A) |
| 235 | If D = 0, jump to step 360, else proceed | |
| 236 | Execute C7 input routine to transfer BUF 4A and 4B contents to Acc. | |
| 237 | Shift Acc. right | $RNG_a$ goes to DF |
| 238 | If DF = 0, jump to step 298, else proceed | |
| 239 | Read xxxx 1000 to data bus; C7 output routine | Set $Q_0$ of BUF 6; $PU_a = 1$ Begin PU BUNK |
| 0240 | Read Reg. 11 to Acc. | Test SS Flag |
| 241 | If D ≠ 0, jump to step 245, else proceed | |
| 242 | Write 1 to Reg. 14 | Set FHF Flag |
| 243 | Write constant 1145 (SA20) to Reg. 3 | SA for RESZ + P.U.A. |
| 244 | Skip to program step 246 | |
| 245 | Write constant 1146 (SA20') to Reg. 3 | SA for P.U.A. |
| 246 | Write constant 248 to save Reg. 8 | Save address |
| 247 | Jump program counter to Step 900 | Branch to OP subroutines |
| 248 | Test $\overline{EF3}$; if high jump to 279, else proceed | New switch ? |
| 249 | Execute C2 input routine to transfer new SW# from BUF 1 to Reg. 5 | $R_s$ = new SW# |
| 0250 | Read AGH status word from addr. 2301 to Acc. | |
| 251 | If DF ≠ 0, jump to step 255, else proceed | |
| 252 | Read Reg. 5 to Acc. | |
| 253 | Read constant 24 and subtract | Test if SW# = GP HLD |
| 254 | If D = 0, jump to step 290, else proceed | |
| 255 | Read Reg. 5 to Acc. | |
| 256 | Read constant 2 and subtract | Test if SW# = HOLD |
| 257 | If D = 0, jump to step 285, else proceed | |
| 258 | Read Reg. 5 to Acc. | Acc = last SW# |
| 259 | Read constant 20 and subtract | Test if SW# = 20 |
| 259a | If D ≠ 0, jump to step 276, else proceed | |
| 0260 | Execute a C7 input routine to Read | |

TABLE XI-continued

LISTING FOR SS MAIN ROUTINE PORTION OF FIG. 11
NOTE: After steps 0114 and 0115 in Table X, Acc SW#, Prog. Ctr. - 250

| STEP | OPERATION | COMMENT |
|---|---|---|
| 261-265 | BUF 4A and 4B Shift Acc. right five times | Now DF holds $BSY_a$ |
| 266 | If DF $\neq$ 0, jump to step 276, else procedd | |
| 267 | Write constant 1060 (SA12) to Reg. 3 | SA for transfer |
| 268 | Write constant 270 to save Reg. 8 | |
| 269 | Jump to step 0900 | OP subroutine |
| 0270 | Read xxxx 0001 and execute C4 output to set $EDR_a$ | Start distinctive ring at A phone |
| 271 | Read xxxx 0000 to data bus; execute C7 output to clear $PU_a$ to 0 | Stop PU Blink |
| 272 | Jump prog. ctr. Reg. 4 to step 332 | |
| 273-275 | NOP | |
| 276 | Read Reg. 5 to Acc. | |
| 277 | Read constant 14 and subtract | Test for RESZ SW |
| 278 | If D = 0, jump to step 283, else proceed | |
| 279 | Test $\overline{EFI}$; if high, jump to step 281, else proceed | |
| 0280 | Restore program counter to step 248 | |
| 281 | Read xxxx 0000 to data bus; execute C7 output to clear $PU_a$ to 0 | Clear $PU_a$ |
| 282 | Return program counter to step 0008 | Iterate |
| 283 | Same as step 281 | Clear $PU_a$ |
| 284 | Write constant 1072 (SA14) to Reg. 3 | SA for Reseize |
| 284a | Jump Prog. Ctr. to step 0205 | |
| 285 | Increment Reg. 2 | Incr. HOLD CTR. |
| 286 | Read 1000 0001 on data bus; execute C6 output | Turn on LED 2 |
| 287 | Same as step 281 | Clear $PU_a$ |
| 288 | Write constant 1000 (SA2) to Reg. 3 | SA for HOLD |
| 289 | Return program counter to step 0205 | |
| 0290 | Write constant 1 to memory address 2301 (AGH status) | Set AGH |
| 291 | Read xxxx 1100 and execute C7 output to BUF 6 | Start A Hold Blink Set $H_a = 1$ |
| 292 | Write constant 1197 (SA24) to Reg. 3 | SA for GP HLD |
| 293 | Write constant 295 to save Reg. 8 | |
| 294 | Jump program counter to step 0900 | Start OP subroutine |
| 295 | Same as step 281 | Clear $PU_a$ |
| 296 | Write constant 1148 (SA20''') to Reg. 3 | SA for A dir. no. |
| 297 | Restore Program Counter to step 0205 | |
| 298 | Read AGH status to Acc. | |
| 299 | If D = 0, jump to step 315, else proceed | |
| 0300 | Write zero to mem. addr. 2301 | Clear AGH status |
| 301 | Read xxxx 0100 and execute C7 output to BUF 6 | Make $H_a = 0$ Stop AHL Blink |
| 302 | Read xxxx 1000 and execute C7 output to BUF 6 | Set $PU_a = 1$ Start PU Blink |
| 303 | Read Reg. 11 to Acc. | Test SS Flag |
| 304 | If D = 0, jump to step 308, else proceed | |
| 305 | Write 1 to Reg. 14 | Set FHF Flag |
| 306 | Write constant 2210 (SA25) to Reg. 3 | SA for RESZ + GP. RETR. |
| 307 | Skip to step 309 | |
| 308 | Write constant 2211 (SA25') to Reg. 3 | SA for GP RETR. |
| 309 | Write constant 311 to save Reg. 8 | |
| 0310 | Jump prog. ctr. to step 0900 | O.P. subroutine - Gr. Retr. Code |
| 311 | Write constant 1148 (SA20''') to Reg. 3 | |
| 312 | Write constant 314 to save Reg. 8 | |
| 313 | Jump prog. ctr. to step 0900 | O.P. subroutine - A's dir. no |
| 314 | Restore program ctr. to step 248 | A's caller restored to PU |
| 315 | Read xxxx 0001 and execute C4 output to set $EDR_a$ ff | Start distinctive ring at A's phone |
| 316 | Execute a C7 input routine to read BUF 4A and 4B to Acc. | |
| 317-321 | Shift Acc. right five times | Now DF holds $BSY_a$ |
| 322 | If D = 0, jump to step 326, else proceed | |
| 323 | Write constant 20,000 to Reg. 7 | Set T = 2.0 sec. |
| 324 | Execute delay timing look, T = 2.0 sec. | |
| 325 | Jump program ctr. to step 349 | |
| 326 | Read Reg. 11 to Acc. | Test SS Flag |
| 327 | NOP | |
| 328 | If D = 0, jump to step 332, else proceed | |
| 329 | Write 1 to Reg. 14 | Set FHF Flag |

TABLE XI-continued

LISTING FOR SS MAIN ROUTINE PORTION OF FIG. 11
NOTE: After steps 0114 and 0115 in Table X, Acc SW#, Prog. Ctr. - 250

| STEP | OPERATION | COMMENT |
|---|---|---|
| 0330 | Write constant 1147 (SA20″) to Reg. 3 | SA for RSZ + aaaa |
| 331 | Skip to step 333 | |
| 332 | Write constant 1148 (SA20‴) to Reg. 3 | SA for aaaa |
| 333 | Write constant 335 to save Reg. 8 | |
| 334 | Jump to step 0900 | O/P. subroutine - to speed dial A |
| 335 | Test $\overline{EF1}$; if high jump to step 354, else proceed | On Hook? |
| 336-342 | Same as steps 316 through 321 | Put $BSY_a$ into DF |
| 343 | If DF $\neq$ 0, jump to step 352, else proceed | |
| 344 | Test $\overline{EF3}$; if low, skip to step 346, else proceed | Any SW closed? |
| 345 | Restore program Ctr. to step 335 | No; loop back |
| 346 | Execute C2 Input to Read BUF 1 to Acc. | Yes; put SW# in Acc |
| 347 | Read constant 14 and subtract | Test for SW# 14 |
| 348 | If D $\neq$ 0, restore pgm. ctr. to step 335; else proceed | |
| 349 | Write constant 14 to Reg. 5 | Make $R_5 = 14$ |
| 0350 | Read xxxx 0000 to data bus; execute C4 output | Clear all EDR ff's; sec'y has reseized |
| 351 | Jump Prog. Ctr. to step 284 | |
| 352 | Read xxxx 0000 to data bus execute C4 output | Clear all EDR ff's A has answered |
| 353 | Restore prog. ctr. to step 212 | |
| 354 | Same as step 350 | Clear all EDR ff's |
| 355 | Return Program Ctr. to 0008 | Iterate; sec'y has hung up |
| 0360 | Read Reg. 5 to Acc. | |
| 361 | Read constant 21 and subtract | Test for B's sw. (SW21) |
| 362 | If D $\neq$ 0, jump to step 462, else proceed | |
| 363 to 461 | Execute PPB, which is similar to PPA | |
| 462 | Read Reg. 5 to Acc. | |
| 463 | Read constant 22 and subtract | |
| 464 | If D $\neq$ 0, jump to step 563, else proceed | Test for C's sw. (SW22) |
| 465-562 | Execute PPC, which is similar to PPA | |
| 563 | Read Reg. 5 to Acc. | |
| 564 | Read constant 23 and subtract | |
| 565 | If D $\neq$ 0, jump to step 140, else proceed | Test for D's sw. (SW23) |
| 566-664 | Execute PPD, which is similar to PPA | |

We claim:

1. For use with a telephone switching system which carries out different special feature functions in response to a hook flash followed by respectively different dial digit combinations, a telephone set with tip and ring leads and having a plurality of special feature buttons individually assigned to the different special features, said telephone set comprising, in combination
   (a) means responsive to momentary actuation of one of said buttons for creating in said telephone set, for a first predetermined time period, a simulated on-hook condition despite the fact that the set is off hook, and
   (b) means activated at the completion of said first time period for applying to the tip and ring leads, during subsequent spaced time intervals, dial digit signals corresponding to the combination for the button which has been actuated.

2. The combination set forth in claim 1 wherein said means (a) includes
   (a1) means responsive to momentary actuation of one of said buttons for creating a control signal which endures for said first predetermined time period,
   (a2) a normally conductive switching device in series with the tip and ring leads, and
   (a3) means responsive to said control signal for placing said switching device in a non-conductive state.

3. The combination set forth in claim 2 wherein said switching device is a transistor and said control signal acts to place the transistor in a non-conductive or high resistance state.

4. The combination set forth in claim 1 wherein said means (b) includes
   (b1) means activated at the completion of said first time period for measuring off a pause interval,
   (b2) means operative after the pause interval for applying to the tip and ring leads, during subsequent time-spaced time intervals, a succession of dial digit signals corresponding to a combination for the button which has been actuated.

5. For use with a telephone switching system which carries out different special feature functions in response to a hook flash followed by different respective combinations of dial digits, a telephone set having a plurality of special feature buttons assigned individually and respectively to different special features, said telephone set comprising, in combination
   (a) means responsive to the momentary actuation of any one of said special feature buttons for creating control signals which measure off a plurality of successive time periods spaced apart in time, (b) means responsive to said control signals for creating in said telephone set a simulated on-hook condition during the first of said successive time periods, and (c) means responsive to said control signals for applying to the tip and ring leads of the telephone set, during the successive time periods subsequent to the first, dial signals which correspond to the combination of digits for the particular feature button whose actuation initiates the operation of said means (a), whereby a single pressing of any feature button sends to the switching system a hook flash followed by one or more dial digit signals which represent the code assigned to the actuated button.

6. The invention as defined in claim 5 wherein said means (b) and (c) include a memory having a plurality of stored word groups each corresponding to one of said features,
    each word within a group representing one of several codes and digits,
    the first word within a group representing a code for a hook flash HF,
    the second and subsequent words within a group representing dial digits in the combination for the feature corresponding to the button which corresponds to that group, means responsive to actuation of a given feature button for reading from said memory and signaling successively the words of the group corresponding to that button, means responsive to signaling of a word representing an HF code for creating in said telephone set, for a predetermined interval, a simulated on-hook condition despite the fact that the set is off hook, and means responsive to signaling of a word representing a dial digit for applying to the tip and ring leads of the telephone set, for a predetermined time period, a DTMF signal corresponding to a digit represented by such word.

7. The invention defined by claim 6 wherein said memory reading means includes means for starting said predetermined interval when the first word is read and signaled, and for terminating said simulated condition when the interval expires, means for starting the reading of the second word after a predetermined delay from the instant said interval expires, means for starting said predetermined period when the second and any subsequent words are read, and for terminating said application of the corresponding DTMF signal when the period expires, and means for starting the reading of the next word after a preselected delay from the instant said period expires.

8. For use with a telephone switching system which carries out different ones of a plurality of special feature functions in response to a hook flash followed by signals representing different respective predetermined codes of dialed digits, a telephone set having a plurality of feature buttons respectively assigned to the special features, said telephone set comprising, in combination (a) means responsive to the momentary actuation of any special feature button for producing n signals in time sequence, where n is any integer greater than 1; said first through n signals each being of predetermined time duration and spaced apart in time, (b) means responsive to the first of said n signals for placing the telephone set in a resistance condition tantamount to on-hook despite the conventional hook switch being off-hook, and (c) means responsive to respective ones of n signals subsequent to the first for placing on the lines of the telephone set signal dial signals representing the code of the particular feature button actuated to initiate the operation of said means (a).

9. For use with a telephone switching system which carries out different special feature functions in response to respectively different dial digit combinations, at least one of said functions being carried out in response to a hook flash followed by a specified dial digit sequence, a telephone set with tip and ring leads and having a plurality of special feature buttons individually assigned to the different special features, said telephone set comprising, in combination (a) a digital memory having a stored word group for each of said feature buttons, each word representing a character in the digit combination for the corresponding button, and in the case of those buttons relating to functions carried out in response to a leading hook flash, the first word representing a hook flash code HF, (b) means responsive to momentary actuation of one of said buttons for causing successive read-out from said memory of signals corresponding to the successive words of the group for that button, (c) means responsive to the read-out of memory signals representing a hook flash code HF for creating in said telephone set, for a predetermined first time interval, a simulated on-hook condition despite the fact that the set is off hook, and (d) means responsive to read-out of memory signals representing a dial digit character for applying to the tip and ring leads a DTMF signal corresponding to the character.

10. In a telephone having a hook switch and tip and ring terminals adapted for two wire connection to a control system (e.g., CO or PABX) which responds to dial digit signal combinations, the response to a first class of signal combinations transpiring only if the telephone is in freshly off-hook status and has seized a central system register, and the response to a second class of signal combinations transpiring if the telephone is then already in a call connection, the combination comprising (a) a plurality of switches selectively actuatable one at a time by a human user, (b) means responsive to actuation of each switch for producing a consequential event such, for example, as outputting a single dial digit signal (key pad dialing), outputting a directory number sequence of dial digit signals (speed dialing), or outputting a feature or access sequence of dial digit signals (feature speed dialing), (c) means responsive to actuation of any of said switches for establishing a control signal unless that control signal is present in which case the control signal remains, (d) means responsive to the telephone going on-hook for terminating said control signal, (e) at least one of said switches being assigned to the function of causing the outputting of a dial signal sequence of said first class, said means (b) including (b1) means responsive to actuation of said one switch at a time when said control signal is absent for outputting a preestablished sequence of dial digit signals to the central system, and (b2) means responsive to the existence of said control signal, at a time when said one switch is actuated, for modifying the operation of said means (b1) so as to (i) create a simulated on-hook condition (despite the telephone remaining off hook) for a predetermined time interval of sufficient duration to be recognized by the central system as "on-hook", and (ii) thereafter outputting said preestablished sequence of dial digit signals.

11. The invention defined by claim 10 wherein another switch is assigned to a RESEIZE function, and further including (f) means responsive to actuation of said another switch for creating a simulated on-hook condition for said predetermined time interval.

12. The invention defined in claim 11 wherein said means (d) includes (d') means actuated as an incident to the operation of said means (f) for terminating said control signal.

13. The invention defined by claim 10 or claim 12 wherein said means (b2) includes (b2') a normally conductive switching device in series with the telephone hook switch in the two wire connection, and (b2") means responsive to actuation of said at least one switch at an instant when said control signal exists for placing said switching device in its non-conductive or high resistance condition for a predetermined time interval.

14. For use with a telephone switching system which responds to dial digit signal combinations of a first class and a second class, the first class being dial digit combinations arriving from a given telephone when the latter is freshly off-hook, and the second class being dial digit combinations arriving from the given telephone when the latter is participating in a connected call, a telephone set having a hook switch and connectable via tip and ring terminals and a two wire line to the central system, said telephone set comprising, in combination (a) a plurality of manually actuatable, momentary-contact switches, (b) means responsive to actuation of any of said switches for outputting on said line a preassigned combination of one or more sequential dial digit signals, (c) the preassigned combination for certain ones of said switches being a dial digit combination of said first class, (d) means responsive to actuation of any of said switches for creating a control signal, (e) means responsive to closure of said hook switch for terminating said control signal, (f) means responsive to actuation of a certain one of said switches (i) for outputting the combination preassigned to that switch if said control signal is absent at the time when said one switch is actuated, and (ii) for creating a simulated on-hook condition for a predetermined time interval (despite the telephone remaining off-hook) and thereafter outputting the combination preassigned to that switch if said control signal is already present at the time that switch is actuated.

15. The invention defined by claim 14 wherein said means (f) includes (f1) an addressable, readable multi-word memory section assigned to said certain one of said switches, a first starting address containing a bit code corresponding to "reseize" with the next or second and subsequent addresses containing bit codes representing the successive digits of said preassigned sequence, (f2) means operable, when initiated, for reading the successive addresses of said memory, (f3) means responsive to read-out of a "reseize" bit code for creating said simulated on-hook condition for said predetermined time interval, and thereafter causing said means (f2) to read the next address, (f4) means responsive to read-out of any digit bit code for outputting a dial signal corresponding to that code, and thereafter to read the next address—until all the digit bit codes of said memory section have been read, (f5) means responsive to actuation of said certain one of said switches (i) for initiating operation of said means (f2) at said second address if said control signal is absent, and (ii) for initiating operation of said means (f2) at said first address if said control signal is present.

* * * * *